United States Patent
Shin et al.

(10) Patent No.: US 11,800,531 B2
(45) Date of Patent: Oct. 24, 2023

(54) METHOD FOR TRANSMITTING AND RECEIVING DATA IN WIRELESS COMMUNICATION SYSTEM AND APPARATUS THEREFOR

(71) Applicant: LG Electronics Inc., Seoul (KR)

(72) Inventors: Seokmin Shin, Seoul (KR); Hanjun Park, Seoul (KR); Seonwook Kim, Seoul (KR); Changhwan Park, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 17/258,372

(22) PCT Filed: Apr. 26, 2019

(86) PCT No.: PCT/KR2019/005107
§ 371 (c)(1),
(2) Date: Jan. 6, 2021

(87) PCT Pub. No.: WO2020/009321
PCT Pub. Date: Jan. 9, 2020

(65) Prior Publication Data
US 2021/0274536 A1    Sep. 2, 2021

(30) Foreign Application Priority Data
Jul. 6, 2018   (KR) .................. 10-2018-0078465

(51) Int. Cl.
*H04W 72/23*  (2023.01)
*H04W 72/0446*  (2023.01)
(Continued)

(52) U.S. Cl.
CPC ....... *H04W 72/23* (2023.01); *H04W 72/0446* (2013.01); *H04W 72/1263* (2013.01); *H04W 72/535* (2023.01)

(58) Field of Classification Search
CPC ......... H04W 72/1289; H04W 72/0446; H04W 72/1257; H04W 72/1263
See application file for complete search history.

(56) References Cited

U.S. PATENT DOCUMENTS

2011/0110316 A1*   5/2011   Chen ................... H04W 72/042
370/329
2013/0058240 A1*   3/2013   Kim ...................... H04L 5/0053
370/252
(Continued)

FOREIGN PATENT DOCUMENTS

KR   10-2012-0004543        1/2012
WO   WO-2018064583 A1  *   4/2018   ........... H04L 1/1607

OTHER PUBLICATIONS

3GPP TSG RAN WG1 Meeting #88bis, R1-1704616, "Impact on common channel reception to PDCCH design," Spokane, WA, USA Apr. 3-7, 2017, 5 pages.
(Continued)

*Primary Examiner* — Chae S Lee
(74) *Attorney, Agent, or Firm* — Fish & Richardson P.C.

(57) ABSTRACT

The present specification provides a method for transmitting and receiving downlink control information (DCI) in a wireless communication system supporting narrow band-Internet of things (NB-IoT). Specifically, a terminal monitors at least one first candidate PDCCH in a first search space and at least one second candidate PDCCH in a second search space, wherein the first search space and the second search space may partially or entirely overlap each other on a time axis. Thereafter, the terminal may search for a first DCI in the at least one first candidate PDCCH and a second DCI in
(Continued)

the at least one second candidate PDCCH, wherein the sum of the number of the at least one first candidate PDCCH and the number of the at least one second candidate PDCCH may be less than or equal to a specific number.

8 Claims, 24 Drawing Sheets

(51) Int. Cl.
*H04W 72/1263* (2023.01)
*H04W 72/50* (2023.01)

(56) References Cited

U.S. PATENT DOCUMENTS

| | | |
|---|---|---|
| 2013/0088973 A1 | 4/2013 | Yang et al. |
| 2019/0045525 A1* | 2/2019 | Shi ..................... H04W 72/042 |
| 2019/0349180 A1* | 11/2019 | Lu ....................... H04L 27/2607 |
| 2020/0021419 A1* | 1/2020 | Taherzadeh Boroujeni ................ H04L 5/0091 |
| 2020/0178344 A1* | 6/2020 | Shan .................... H04L 1/0003 |

OTHER PUBLICATIONS

3GPP TSG RAN WG1 Meeting #89, R1-1709145, "Considerations on NR PDCCH structure," Hangzhou, P.R. China, May 15-19, 2017, 3 pages.
3GPP TSG RAN WG1 Meeting #92bis, R1-1804020, "Discussion on Resource Pool Sharing between Mode 3 and Mode 4 in V2X communication," Sanya, China, Apr. 16-20, 2018, 2 pages.

* cited by examiner (a)

(b)

METHOD FOR TRANSMITTING AND RECEIVING DATA IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2019/005107, filed on Apr. 26, 2019, which claims the benefit of Korean Application No. 10-2018-0078465, filed on Jul. 6, 2018. The disclosures of the prior applications are incorporated by reference in their entirety.

TECHNICAL FIELD

The present disclosure relates to a method of transmitting and receiving data in a radio communication system, and in more detail relates to a method for scheduling multi transport blocks (TBs) by transmitting and receiving downlink control information (DCI) in a radio communication system which supports NarrowBand-Internet of Things (NB-IoT) and an apparatus therefor.

BACKGROUND ART

A mobile communication system has been developed to provide a voice service while guaranteeing the activity of users. But, a mobile communication system has extended a field up to a data service as well as a voice service, and in these days, as a traffic explosion causes a scarcity of resources and users require a higher speed service, a more developed mobile communication system is required.

Requirements for a next-generation mobile communication system may largely support the acceptance of explosive data traffic, a remarkable increase in a transmission rate per user, the acceptance of the significantly increased number of connected devices, a very low end-to-end latency and high energy efficiency. For it, a variety of technologies such as Dual Connectivity, Massive Multiple Input Multiple Output (Massive MIMO), In-band Full Duplex, Non-Orthogonal Multiple Access (NOMA), Super Wideband support, Device Networking, etc. have been studied.

DISCLOSURE

Technical Problem

The present disclosure proposes a method of transmitting and receiving data in a radio communication system which supports NarrowBand-Internet of Things (NB-IoT).

In addition, the present disclosure proposes a method of transmitting and receiving data by scheduling multi transport blocks in a radio communication system which supports NB-IoT.

In addition, the present disclosure proposes a method of transmitting and receiving a plurality of data based on one DCI by transmitting scheduling information related to whether to schedule multi transport blocks.

In addition, the present disclosure proposes a method for individually configuring a search space for monitoring DCI for the scheduling of multi transport blocks and a search space for monitoring DCI for the scheduling of a single transport block.

In addition, the present disclosure proposes a method for monitoring a physical downlink control channel (PDCCH) in each search space according to the capability of a terminal when a search space for monitoring DCI for the scheduling of multi transport blocks and a search space for monitoring DCI for the scheduling of a single transport block are configured, respectively.

Technical problems which are to be achieved in the present disclosure is not limited to technical problems mentioned above and other technical problems which are not mentioned will be clearly understood by a person with ordinary skill in the art to which the present disclosure pertains.

Technical Solution

In the present disclosure, a method of receiving, by a terminal, downlink control information (DCI) in a radio communication system which supports Narrow Band-Internet of Things (NB-IoT), a method performed by the terminal includes monitoring at least one first candidate PDCCH in a first search space and at least one second candidate PDCCH in a second search space, wherein the first search space and the second search space are overlapped in whole or in part on a time axis; and searching a first DCI in the at least one first candidate PDCCH and a second DCI in the at least one second candidate PDCCH, wherein a sum of the number of the at least one first candidate PDCCH and the number of the at least one second candidate PDCCH is the same as or smaller than a specific number.

In addition, in the present disclosure, the specific number is the maximum number of PDCCHs which can be monitored by the terminal through blind decoding in a search space.

In addition, in the present disclosure, the first DCI is control information for the scheduling of a single transport block and the second DCI is control information for the scheduling of multi transport blocks.

In addition, in the present disclosure, the second DCI includes indication information related to whether to schedule multi transport blocks.

In addition, in the present disclosure, when the indication information is V, it represents that multi transport blocks are not scheduled and when the indication information is T, it represents that multi transport blocks are not scheduled.

In addition, in the present disclosure, when the indication information represents that the scheduling of multi TBs and the plurality of data are individually transmitted in a different transmission direction, a payload size of the second DCI is greater than that of the first DCI.

In addition, the present disclosure includes receiving configuration information related to whether the scheduling of the multi transport blocks is supported, wherein the indication information is included in the second DCI when the terminal supports the scheduling of the multi transport blocks based on the configuration information.

In addition, in the present disclosure, the first search space and the second search space are monitored by the terminal based on a priority.

In addition, in the present disclosure, the last resource of resources in which the at least one first candidate PDCCH and the at least one second candidate PDCCH are transmitted is the same.

In addition, the present disclosure includes transmitting a first DCI through at least one first candidate PDCCH in a first search space and a second DCI through at least one second candidate PDCCH in a second search space; and transmitting a physical downlink shared channel (PDSCH) or receiving a physical uplink shared channel (PUSCH)

based on the first DCI and the second DCI, wherein the first search space and the second search space are overlapped in whole or in part on a time axis, wherein the terminal monitors candidates PDCCH equal to or less than a specific number among the at least one candidate PDCCH and the at least one second candidate PDCCH.

In addition, the present disclosure provides a terminal comprising a radio frequency (RF) module for transmitting and receiving a radio signal; and a processor functionally connected to the RF module, wherein the processor monitors at least one first candidate PDCCH in a first search space and at least one second candidate PDCCH in a second search space, wherein the first search space and the second search space are overlapped in whole or in part on a time axis, and searches a first DCI in the at least one first candidate PDCCH and a second DCI in the at least one second candidate PDCCH, wherein a sum of the number of the at least one first candidate PDCCH and the number of at least one second candidate PDCCH is the same as or smaller than a specific number.

Advantageous Effects

According to an embodiment of the present disclosure, a plurality of physical downlink shared channels (PDSCH) or a plurality of physical uplink shared channels (PUSCH) may be transmitted and received using one DCI by transmitting information related to whether to schedule multi transport blocks and scheduling information.

In addition, according to an embodiment of the present disclosure, when downlink control information (DCI) for the scheduling of multi transport blocks is not received, a plurality of physical downlink shared channels or a plurality of physical uplink shared channels may be transmitted and received using DCI which is subsequently transmitted.

In addition, according to an embodiment of the present disclosure, a terminal may perform monitoring and blind decoding for all candidate PDCCHs which exist in a different search space.

In addition, according to an embodiment of the present disclosure, the scheduling flexibility of a base station may be improved because a terminal may perform monitoring and blind decoding for all candidate PDCCHs which exist in a different search space.

The effects which can be achieved in the present disclosure are not limited to the above-mentioned effects and other effects which are not mentioned will be clearly understood by a person with ordinary skill in the art to which the present disclosure pertains.

DESCRIPTION OF DIAGRAMS

The accompanying drawings, which are included herein as a part of the description for help understanding the present invention, provide embodiments of the present invention, and describe the technical features of the present invention with the description below.

BEST MODE

Figure 1:
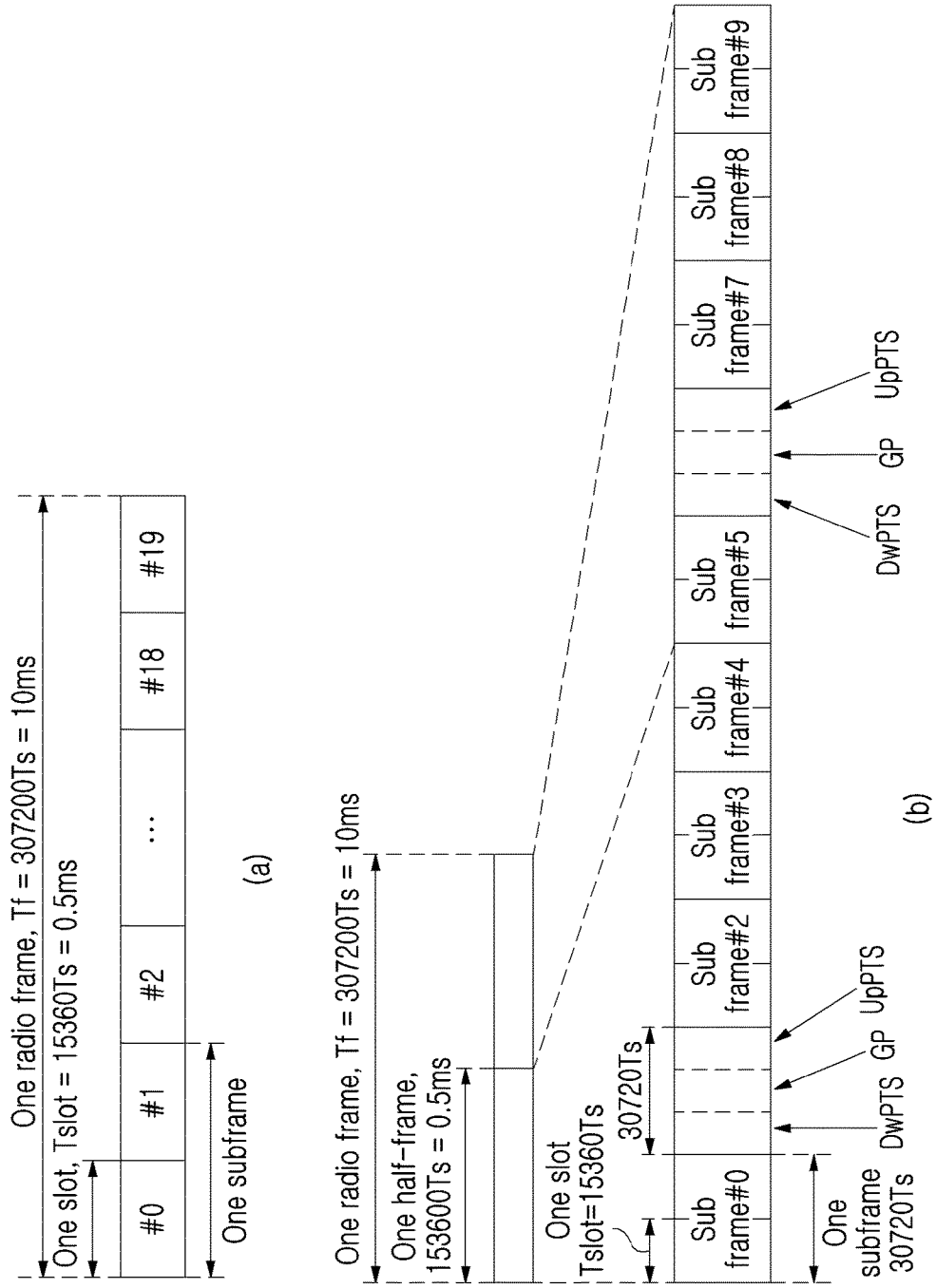
FIG. 1 shows a radio frame structure in a radio communication system to which the present disclosure may be applied.

Hereinafter, a preferred embodiment according to the present disclosure will be described in detail with reference to an attached diagram. A detailed description which will be mentioned below with an attached diagram is intended to describe an exemplary embodiment of the present disclosure and is not intended to represent the only embodiment of the present disclosure. The following detailed description includes specific details to provide the thorough understanding of the present disclosure. However, a person skilled in the art knows that the present disclosure can be practiced without these specific details.

In some cases, in order to avoid obscuring the concept of the present disclosure, a publicly known structure and device may be omitted or shown in a shape of a diagram based on the key functions of each structure and device.

In this description, a base station has meaning as a terminal node of a network which directly communicates with a terminal. Herein, a specific operation described as being performed by a base station may be performed by an upper node of a base station in some cases. In other words, it is obvious that various operations performed for communications with a terminal in a network composed of a plurality of network nodes including a base station may be performed by a base station or other network nodes except for a base station. A base station (BS) may be substituted with a term such as a fixed station, Node B, eNB (evolved-NodeB), BTS (base transceiver system), Access Point (AP), gNB (next generation NB, general NB, gNodeB), etc. In addition, a terminal may be fixed or mobile and may be substituted with a term such as UE (User Equipment), MS (Mobile Station), UT (user terminal), MSS (Mobile Subscriber Station), SS (Subscriber Station), AMS (Advanced Mobile Station), WT (Radio terminal), MTC (Machine-Type Communication) device, M2M (Machine-to-Machine) device, D2D (Device-to-Device) device, etc.

Hereinafter, a downlink (DL) means communications from a base station to a terminal and an uplink (UL) means communications from a terminal to a base station. In a downlink, a transmitter is part of a base station and a receiver is part of a terminal. In an uplink, a transmitter is part of a terminal and a receiver is part of a base station.

The specific terms used in the following description are provided for helping the understanding the present disclosure and using such specific terms may be changed into other shapes within the technical ideas of the present disclosure.

The technology described below may be used in various radio access systems such as a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a non-orthogonal multiple access (NOMA) system, etc. CDMA may be implemented by a radio technology such as universal terrestrial radio access (UTRA) or CDMA2000. TDMA may be implemented by a radio technology such as GSM (global system for mobile communications)/GPRS (general packet radio service)/EDGE (enhanced data rates for GSM evolution). OFDMA may be implemented by a radio technology such as IEEE 802.11 (Wi-Fi), IEEE 802.16 (WiMAX), IEEE 802-20, E-UTRA (evolved UTRA), etc. UTRA is part of a universal mobile telecommunications system (UMTS). As part of E-UMTS (evolved UMTS) using E-UTRA, 3GPP (3rd generation partnership project) LTE (long term evolution) adopts OFDMA in a downlink and SC-FDMA in an uplink. LTE-A (advanced) is an upgraded version of 3GPP LTE.

In addition, 5G NR (new radio) defines eMBB (enhanced Mobile Broadband), mMTC (massive Machine Type Communications), URLLC (Ultra-Reliable and Low Latency Communications), V2X (vehicle-to-everything) according to a usage scenario.

In addition, a 5G NR standard is divided into standalone (SA) and non-standalone (NSA) according to co-existence between a NR system and a LTE system.

In addition, 5G NR supports a variety of subcarrier spacing, and supports CP-OFDM in a downlink and CP-OFDM and DFT-s-OFDM (SC-OFDM) in an uplink.

Embodiments of the present disclosure may be supported by standard documents disclosed in at least one of radio access systems, IEEE 802, 3GPP and 3GPP2. In other words, steps or parts which are not described to clarify the technical ideas of the present disclosure among embodiments of the present disclosure may be supported by the documents. In addition, all terms disclosed herein may be described by the standard documents.

To clarify description, 3GPP LTE/LTE-A/NR (New RAT) are mainly described, but technical features of the present disclosure are not limited thereto.

Definition eLTE eNB: eLTE eNB is evolution of eNB which supports a connection for EPC and NGC.

gNB: A node which supports not only a connection with NGC, but also NR.

New RAN: A radio access network which supports NR or E-UTRA or interacts with NGC.

Network Slice: A network defined by an operator to provide a solution optimized for a specific market scenario which requires a specific requirement with an end-to-end range.

Network Function: A logical node in a network infrastructure with a well-defined external interface and a well-defined functional operation.

NG-C: A control plane interface used for a NG2 reference point between a new RAN and NGC.

NG-U: A user plane interface used for a NG3 reference point between a new RAN and NGC.

Non-standalone NR: Configuration that gNB requires LTE eNB as an anchor for control plane connection with EPC or requires eLTE eNB as an anchor for control plane connection with NGC.

Non-standalone E-UTRA: Configuration that eLTE eNB requires gNB as an anchor for control plane connection with NGC.

User plane gateway: A terminal point of a NG-U interface.

Numerology: Corresponding to one subcarrier spacing in a frequency domain. A different numerology may be defined by scaling reference subcarrier spacing with an integer N.

NR: NR Radio Access or New Radio.

General System

FIG. 1 shows a radio frame structure in a radio communication system to which the present disclosure may be applied.

3GPP LTE/LTE-A supports a radio frame structure type 1 applicable to FDD (Frequency Division Duplex) and a radio frame structure type 2 applicable to TDD (Time Division Duplex).

In FIG. 1, a size of a radio frame in a time domain is represented by a multiple of a time unit of $T\_s=1/(15000*2048)$.

The transmission of a downlink and an uplink is composed of radio frames with a period of $T\_f=307200*T\_s=10$ ms.

The FIG. 1(a) illustrates a radio frame structure type 1. A radio frame type 1 may be applied both to full duplex and half duplex FDD.

A radio frame is composed of 10 subframes. One radio frame is composed of 20 slots with a length of $T\_slot=15360*T\_s=0.5$ ms and an index from 0 to 19 is given to each slot. One subframe is composed of 2 consecutive slots in a time domain and a subframe i is composed of a slot 2i and a slot 2i+1. Time for transmitting one subframe is referred to as TTI (transmission time interval). For example, a length of one subframe may be 1 ms and a length of one slot may be 0.5 ms.

The transmission of an uplink and a downlink in FDD is divided in a frequency domain. While there is no limitation in full duplex FDD, a terminal may not perform transmission and reception simultaneously in a half duplex FDD operation.

One slot includes a plurality of OFDM (orthogonal frequency division multiplexing) symbols in a time domain and includes a plurality of resource blocks (RB) in a frequency domain. As 3GPP LTE uses OFDMA in a downlink, an OFDM symbol is to represent one symbol period. An OFDM symbol may be referred to as one SC-FDMA symbol or one symbol period. A resource block is a unit of resource allocation and includes a plurality of consecutive subcarriers in one slot.

The FIG. 1(b) shows a frame structure type 2.

A radio frame type 2 is composed of 2 half frames with a length of $153600*T\_s=5$ ms. Each half frame is composed of 5 subframes with a length of $30720*T\_s=1$ ms.

In a frame structure type 2 of a TDD system, uplink-downlink configuration is a rule representing whether an uplink and a downlink are allocated (or reserved) for all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In reference to Table 1, per subframe of a radio frame, 'D' represents a subframe for downlink transmission, 'U' represents a subframe for uplink transmission and 'S' represents a special subframe composed of 3 fields, DwPTS (Downlink Pilot Time Slot), Guard Period (GP) and UpPTS (Uplink Pilot Time Slot).

DwPTS is used for initial cell search, synchronization or channel estimation in a terminal. UpPTS is used for channel estimation in a base station and for synchronization of unlink transmission in a terminal. GP is a period for removing interference generated in an uplink by a multipath delay of a downlink signal between an uplink and a downlink.

Each subframe i is composed of a slot 2i and a slot 2i+1 with a length of $T\_slot=15360*T\_s=0.5$ ms, respectively.

An uplink-downlink configuration may be divided into seven and the position and/or number of a downlink subframe, a special subframe and an uplink subframe vary per each configuration.

A point changing from a downlink to an uplink or a point changing from an uplink to a downlink is referred to as a switching point. Switch-point periodicity of the switching point means a period in which an aspect that an uplink subframe and a downlink subframe are switched is repeated in the same manner and 5 ms or 10 ms is entirely supported. For a period of a 5 ms downlink-uplink switching point, a special subframe(s) exists per half-frame and for a period of a 5 ms downlink-uplink switching point, a special subframe (s) exists only in the first half-frame.

For every configuration, 0 and 5 subframes and DwPTS are a period only for downlink transmission. UpPTS, a subframe and a subframe directly subsequent to a subframe are a period for uplink transmission all the time.

Both a base station and a terminal may know such uplink-downlink configuration as system information. A base station may inform a terminal of a change in a unlink-downlink allocation state of a radio frame by transmitting only an index of configuration information whenever uplink-downlink configuration information is changed. In addition, configuration information may be transmitted through a PDCCH (Physical Downlink Control Channel) like other scheduling information as a kind of downlink control information and may be commonly transmitted to all terminals in a cell through a broadcast channel as broadcasting information.

Table 2 represents a special subframe configuration (a length of DwPTS/GP/UpPTS).

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DWPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

A structure of a radio frame according to an example in FIG. 1 is just one example and the number of subcarriers included in a radio frame, the number of slots included in a subframe or the number of OFDM symbols included in a slot may be variably changed.

Figure 2:
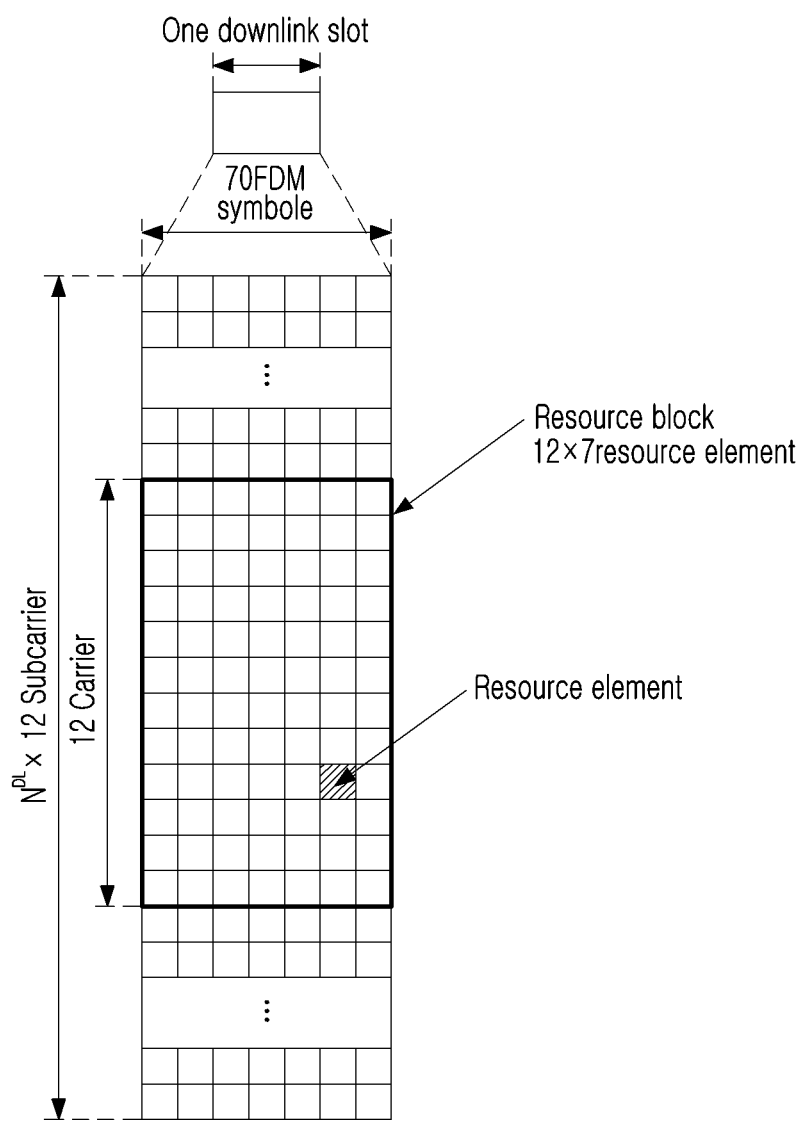
FIG. 2 is a diagram illustrating a resource grid on one downlink slot in a radio communication system to which the present disclosure may be applied.

FIG. 2 is a diagram illustrating a resource grid on one downlink slot in a radio communication system to which the present disclosure may be applied.

In reference to FIG. 2, one downlink slot includes a plurality of OFDM symbols in a time domain. In this case, it is described by giving an example that one downlink slot includes a 7OFDM symbol and one resource block includes 12 subcarriers in a frequency domain, but it is not limited thereto.

In a resource grid, each element is a resource element and one resource block (RB) includes 12×7 resource elements. N^DL, the number of resource blocks included in a downlink slot, depends on downlink transmission bandwidth.

A structure of an uplink slot may be the same as that of a downlink slot.

Figure 3:
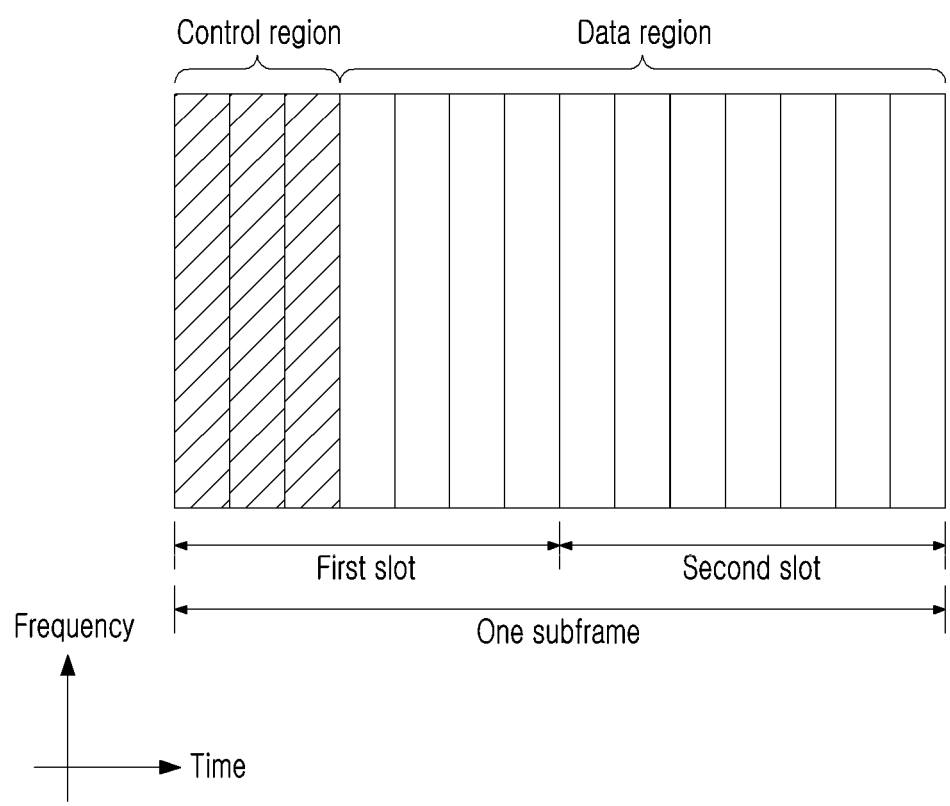
FIG. 3 shows a downlink subframe structure in a radio communication system to which the present disclosure may be applied.

FIG. 3 shows a downlink subframe structure in a radio communication system to which the present disclosure may be applied.

In reference to FIG. 3, in the first slot in a subframe, the maximum 3 front OFDM symbols are a control region to which control channels are allocated and other OFDM symbols are a data region to which a PDSCH (Physical Downlink Shared Channel) is allocated. As an example of a physical downlink control channel used in 3GPP LTE, there are a PCFICH (Physical Control Format Indicator Channel), a PDCCH (Physical Downlink Control Channel), a PHICH (Physical Hybrid-ARQ Indicator Channel), etc.

A PCFICH is transmitted in the first OFDM symbol of a subframe and carries information on the number of OFDM symbols used to transmit control channels in a subframe (e.g., a size of a control region). A PHICH is a response channel to an uplink and carries a ACK (Acknowledgement)/NACK (Not-Acknowledgement) signal for a HARQ (Hybrid Automatic Repeat Request). Control information carried by a PDCCH is referred to as downlink control information (DCI). Downlink control information includes uplink resource allocation information, downlink resource allocation information or an uplink transmission (Tx) power control command for an arbitrary terminal group.

A PDCCH may carry a resource allocation and transmission format of a DL-SCH (Downlink Shared Channel) (also referred to as a downlink grant), resource allocation information of a UL-SCH (Uplink Shared Channel) (also referred to as an uplink grant), paging information in a PCH (Paging Channel), system information in a DL-SCH, resource allocation for an upper-layer control message such as a random access response transmitted in a PDSCH, a set of transmission power control commands on individual terminals in an arbitrary terminal group, activation of VoIP (Voice over IP), etc. A plurality of PDCCHs may be transmitted in a control region and a terminal may monitor a plurality of PDCCHs. A PDCCH is composed of a set of one or a plurality of consecutive CCEs (control channel elements). A CCE is a logical allocation unit used to provide a coding rate according to a radio channel state to a PDCCH. A CCE corresponds to a plurality of resource element groups. The number of PDCCH formats and available PDCCH bits is determined according to a correlation between the number of CCEs and a coding rate provided by CCEs.

A base station determines a PDCCH format according to DCI to be transmitted to a terminal and attaches CRC (Cyclic Redundancy Check) to control information. CRC is masked with a unique identifier (it is referred to as RNTI (Radio Network Temporary Identifier)) according to an owner or usage of a PDCCH. For a PDCCH for a specific terminal, a unique identifier of a terminal, e.g., C-RNTI (Cell-RNTI), may be masked to CRC. Alternatively, for a PDCCH for a paging message, a paging indication identifier, e.g., P-RNTI (Paging-RNTI), may be masked to CRC. For a PDCCH for system information, more specifically, a system information block (SIB), a system information identifier, SI-RNTI (system information RNTI), may be masked to CRC. To indicate a random access response, a response to the transmission of a random access preamble of a terminal, RA-RNTI (random access-RNTI) may be masked to CRC.

An EPDCCH (enhanced PDCCH) carries terminal specific (UE-specific) signaling. An EPDCCH is positioned at a physical resource block (PRB) which is specifically configured in a terminal. In other words, as described above, a PDCCH may be transmitted in the maximum 3 front OFDM symbols in the first slot in a subframe, but an EPDCCH may be transmitted in a resource region except for a PDCCH. A point (e.g., a symbol) when an EPDCCH starts in a subframe may be configured in a terminal through higher layer signaling (e.g., RRC signaling, etc.)

An EPDCCH may carry transmission format, resource allocation and HARQ information related to DL-SCH, transmission format, resource allocation and HARQ information related to UL-SCH, resource allocation information related to SL-SCH (Sidelink Shared Channel) and PSCCH (Physical Sidelink Control Channel), etc. A plurality of EPDCCHs may be supported and a terminal may monitor an EPCCH set.

An EPDCCH may be transmitted by using one or more consecutive enhanced CCEs (ECCE) and the number of ECCEs per single EPDCCH may be determined per each EPDCCH format.

Each ECCE may be composed of a plurality of enhanced resource element groups (EREG). An EREG is used to define mapping from an ECCE to a RE. 16 EREGs exist per PRB pair. Except for a RE carrying DMRS in each PRB pair, all REs are given numbers from 0 to 15 in the order that a frequency increases, then in the order that time increases.

A terminal may monitor a plurality of EPDCCHs. For example, one or two EPDCCH sets may be configured in one PRB pair in which a terminal monitors EPDCCH transmission.

As the different number of ECCEs are aggregated, a different coding rate for an EPDCCH may be realized. An EPCCH may use localized transmission or distributed transmission and accordingly, mapping from an ECCE to a RE in PRB may be changed.

Figure 4:
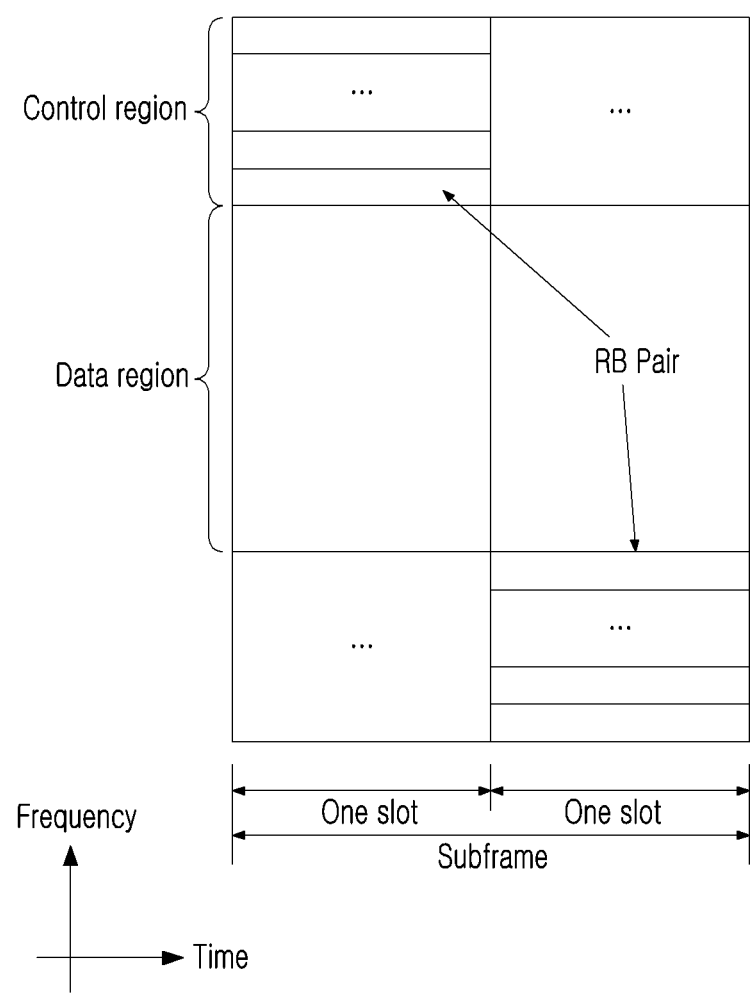
FIG. 4 shows an uplink subframe structure in a radio communication system to which the present disclosure may be applied.

FIG. 4 shows an uplink subframe structure in a radio communication system to which the present disclosure may be applied.

In reference to FIG. 4, an uplink subframe may be divided into a control region and a data region in a frequency domain. A PUCCH (Physical Uplink Control Channel) which carries uplink control information is allocated to a control region. A PUSCH (Physical Uplink Shared Channel) which carries user data is allocated to a data region. To keep single carrier properties, one terminal does not transmit a PUCCH and a PUSCH at the same time.

A resource block (RB) pair in a subframe is allocated to a PUCCH for one terminal. RBs belonging to an RB pair occupy a different subcarrier per each of 2 slots. It is said that an RB pair allocated to a PUCCH is frequency-hopped at a slot boundary.

Carrier Aggregation

A communication environment considered in embodiments of the present disclosure includes all multi-carrier support environments. In other words, a multi-carrier system or a carrier aggregation (CA) system used in the present disclosure refers to a system which is used by aggregating one or more component carriers (CC) with bandwidth smaller than a target band when composing a target broadband to support a broadband.

In the present disclosure, a multi-carrier means carrier aggregation and in this case, carrier aggregation means both aggregation between contiguous carriers and aggregation between non-contiguous carriers. In addition, the number of component carriers aggregated between a downlink and an uplink may be configured differently. When the number of downlink component carriers (hereinafter referred to as 'DL CC') and the number of uplink component carriers (hereinafter referred to as 'UL CC') are the same, it is referred to as symmetric aggregation and when those numbers are different, it is referred to as asymmetric aggregation. Such carrier aggregation may be used by being mixed with a term such as subcarrier aggregation, bandwidth aggregation, spectrum aggregation, etc.

Carrier aggregation composed by combining two or more component carriers is aimed at supporting up to 100 MHz bandwidth in a LTE-A system. When one or more carriers with bandwidth smaller than a target band are combined, the bandwidth of a carrier to be combined may be limited to bandwidth which is used in the existing system to maintain backward compatibility with the existing IMT system. For example, it may be configured to support {1.4, 3, 5, 10, 15, 20}MHz bandwidth in the existing 3GPP LTE system and support bandwidth greater than 20 MHz by using only the bandwidth for compatibility with the existing system in a 3GPP LTE-advanced system (i.e., LTE-A). In addition, a carrier aggregation system used in the present disclosure may be configured to support carrier aggregation by defining new bandwidth regardless of bandwidth used in the existing system.

A LTE-A system uses a concept of a cell to manage a radio resource.

The above-mentioned carrier aggregation environment may be called a multiple sells environment. A cell is defined as a combination of one pair of a downlink resource (DL CC) and an uplink resource (UL CC), but an uplink resource is not essential. Accordingly, a cell may be composed of a downlink resource alone or a downlink resource and an uplink resource. When a specific terminal has only one configured serving cell, it may have one DL CC and one UL CC, but when a specific terminal has two or more configured serving cells, it has as many DL CCs as the number of cells and the number of UL CCs may be the same as or smaller than it.

Alternatively, a DL CC and an UL CC may be configured, vice versa. In other words, when a specific terminal has a plurality of configured serving cells, a carrier aggregation environment with more UL CCs than the number of DL CCs may be also supported. In other words, carrier aggregation may be understood as aggregation of two or more cells with a different carrier frequency (a center frequency of a cell). In this case, a 'cell' described herein should be distinguished from a 'cell' as a region which is generally used and covered by a base station.

A cell used in a LTE-A system includes a primary cell (PCell) and a secondary cell (SCell). A PCell and a SCell may be used as a serving cell. For a terminal which is in RRC_CONNECTED state, but does not configure carrier aggregation or does not support carrier aggregation, there is only one serving cell configured with a PCell alone. On the other hand, for a terminal which is in RRC_CONNECTED state and configures carrier aggregation, there may be one or more serving cells and a PCell and one or more SCells are included in all serving cells.

A serving cell (a PCell and a SCell) may be configured by a RRC parameter. As a physical layer identifier of a cell, PhysCellId has an integer value from 0 to 503. As a short identifier used to identify a SCell, SCellIndex has an integer value from 1 to 7. As a short identifier used to identify a serving cell (a PCell or a SCell), ServCellIndex has an integer value from 0 to 7. A value of 0 is applied to a PCell and SCellIndex is given in advance to apply to a SCell. In other words, a cell having the smallest cell ID (or a cell index) in ServCellIndex becomes a PCell.

A Pcell means a cell which operates in a primary frequency (or, primary CC). It may be used for a terminal to perform an initial connection establishment process or perform a connection re-establishment process and may refer to a cell indicated in a handover process. In addition, a PCell means a cell which is a center of control-related communications among configured serving cells in a carrier aggregation environment. In other words, a terminal may receive and transmit a PUCCH only in its own PCell and may use a PCell alone to obtain system information or change a monitoring procedure. E-UTRAN (Evolved Universal Terrestrial Radio Access) may change a PCell alone of a terminal supporting a carrier aggregation environment for a handover procedure by using a RRC connection reconfiguration message of an upper layer including mobility control information.

A SCell may mean a cell which operates in a secondary frequency (or, secondary CC). Only one PCell is allocated to a specific terminal and one or more SCells may be allotted. A SCell may be configured after RRC connection configuration and may be used to provide an additional radio resource. There is no PUCCH in the remaining cells excluding a PCell among configured serving cells in a carrier aggregation environment, i.e., in a SCell. E-UTRAN may provide every system information related to an operation of a related cell in RRC_CONNECTED state through a dedicated signal when a SCell is added to a terminal supporting a carrier aggregation environment. A change in system information may be controlled by releasing and adding a related SCell and in this case, a RRC connection reconfiguration message of an upper layer may be used. E-UTRAN may perform dedicated signaling with a different parameter per terminal instead of broadcasting in a related SCell.

After an initial security activation process starts, E-UTRAN may configure a network which includes one or more SCells by being added to a PCell which is configured initially in a connection configuration process. In a carrier aggregation environment, a PCell and a SCell may operate as a respective component carrier. In the following embodiment, a primary component carrier (PCC) may be used in the same meaning as a PCell and a secondary component carrier (SCC) may be used in the same meaning as a SCell.

Figure 5:
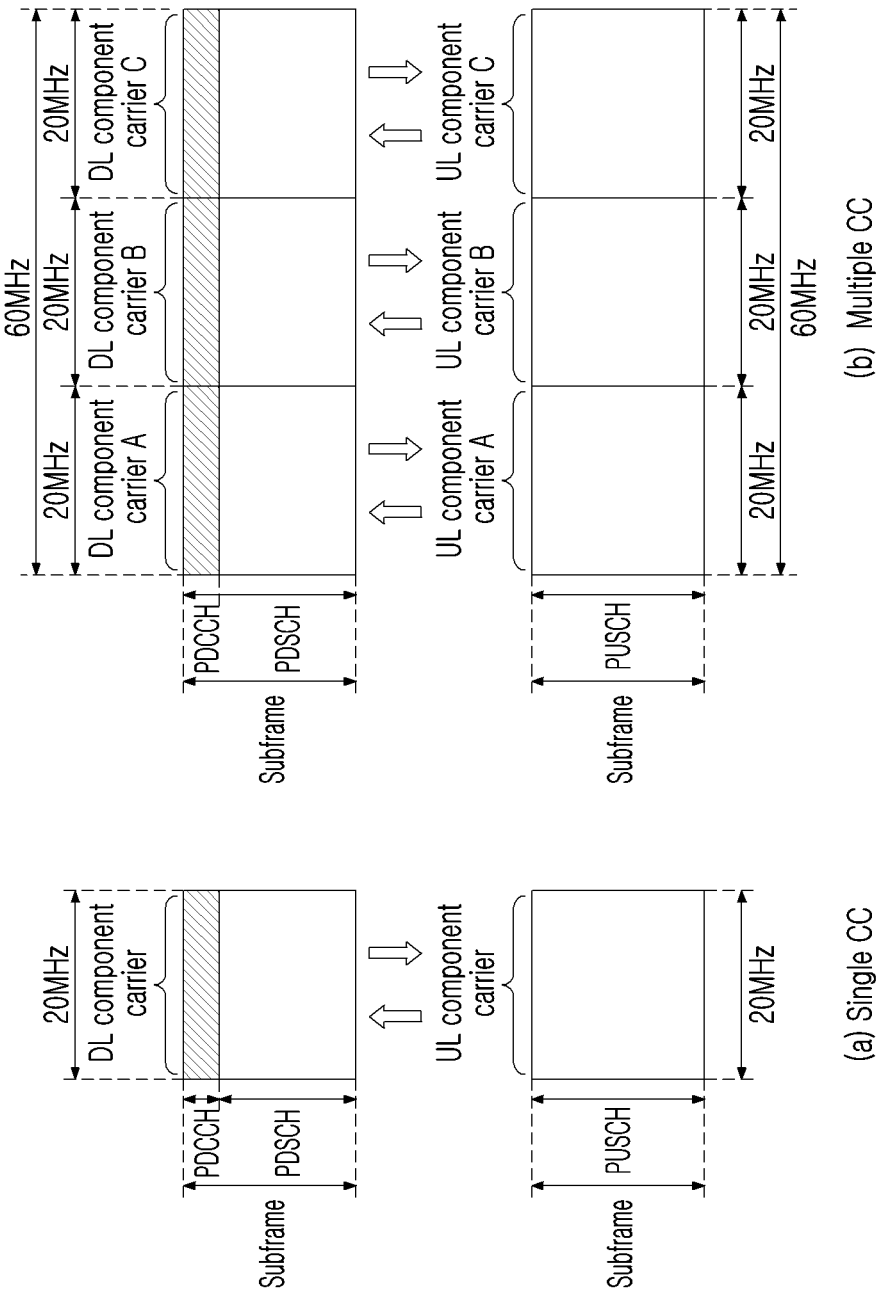
FIG. 5 shows an example of a component carrier and carrier aggregation in a radio communication system to which the present disclosure may be applied.

FIG. 5 shows an example of a component carrier and carrier aggregation in a radio communication system to which the present disclosure may be applied.

The FIG. 5(a) shows a single carrier structure used in a LTE system. In a component carrier, there are a DL CC and an UL CC. One component carrier may have a frequency range of 20 MHz.

The FIG. 5(b) shows a carrier aggregation structure used in a LTE A system. The FIG. 5(b) shows a case in which 3 component carriers with a frequency size of 20 MHz are aggregated. There are 3 DL CCs and 3 UL CCs, respectively, but there is no limit to the number of DL CCs and UL CCs. For carrier aggregation, a terminal may monitor 3 CCs simultaneously, receive downlink signal/data and transmit uplink signal/data.

When N DL CCs are managed in a specific cell, a network may allocate M (M≤N) DL CCs to a terminal. In this case, a terminal may monitor only M limited DL CCs and receive a DL signal. In addition, a network may allocate a main DL CC to a terminal by giving a priority to L (L≤M≤N) DL CCs and in this case, a UE should monitor L DL CCs. Such a method may be applied to uplink transmission in the same manner.

Linkage between a carrier frequency of a downlink resource (or DL CC) and a carrier frequency of an uplink resource (or UL CC) may be indicated by system information or an upper layer message like a RRC message. For example, a combination of a DL resource and a UL resource may be configured by linkage defined by SIB2 (System Information Block Type2). Concretely, linkage may mean a mapping relation between a DL CC that a PDCCH carrying a UL grant is transmitted and a UL CC which uses the UL grant and may mean a mapping relation between a DL CC (or a UL CC) that data for HARQ is transmitted and a UL CC (or a DL CC) that a HARQ ACK/NACK signal is transmitted.

Figure 6:
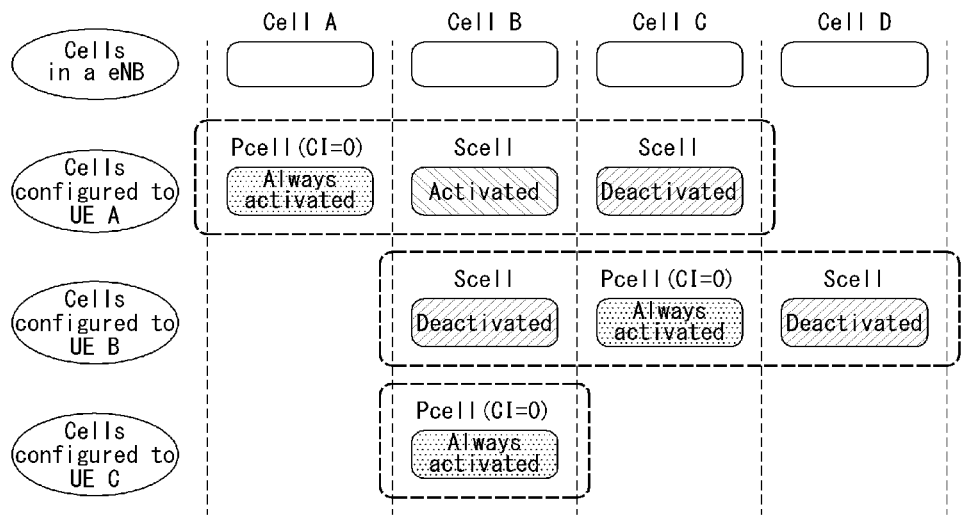
FIG. 6 is a diagram illustrating the classification of cells in a system which supports carrier aggregation.

FIG. 6 is a diagram illustrating the classification of cells in a system which supports carrier aggregation.

In reference to FIG. 6, a configured cell may be configured per terminal as a cell which is made available for carrier aggregation based on a measurement report among cells in a base station as in FIG. 5. A configured cell may reserve a resource in advance for ack/nack transmission on PDSCH transmission. An activated cell performs CSI (Channel State Information) report for PDSCH/PUSCH transmission and SRS (Sounding Reference Signal) transmission as a cell configured to actually transmit a PDSCH/PUSCH among configured cells. A de-activated cell may stop CSI report and SRS transmission as a cell configured not to transmit a PDSCH/PUSCH by a command of a base station or a timer operation.

Procedure Related to a Downlink Control Cannel in NB-IoT

A procedure related to a NPDCCH (Narrowband Physical Downlink Control Channel) used in NB-IoT will be described.

A terminal needs to monitor NPDCCH candidates (i.e., a set of NPDCCH candidates) as configured by higher layer signaling for control information. In this case, the monitoring may mean an attempt to decode each NPDCCH in the set according to all DCI formats which are monitored. The set of NPDCCH candidates for monitoring may be defined as a NPDCCH search space. In this case, a terminal may perform monitoring by using an identifier (e.g., C-RNTI, P-RNTI, SC-RNTI, G-RNTI) corresponding to the corresponding NPDCCH search space.

In this case, a terminal needs to monitor one or more of a) a Type1-NPDCCH common search space, b) a Type1A-NPDCCH common search space, c) a Type2-NPDCCH common search space, d) a Type2A-NPDCCH common search space and e) a NPDCCH UE-specific search space.

In this case, a terminal does not need to monitor a NPDCCH UE-specific search space and a Type1-NPDCCH common search space at the same time. In addition, a terminal does not need to monitor a NPDCCH UE-specific search space and a Type2-NPDCCH common search space at the same time. In addition, a terminal does not need to monitor a Type1-NPDCCH common search space and a Type2-NPDCCH common search space at the same time.

A terminal does not need to monitor a Type1A-NPDCCH common search space or a Type2A-NPDCCH common search space of a subframe in a Type1-NPDCCH common search space monitored by a terminal or a subframe which receives a NPDSCH allocated by a NPDCCH for DCI CRC scrambled by P-RNTI.

In addition, a terminal does not need to monitor a Type1A-NPDCCH common search space or a Type2A-NPDCCH common search space of a subframe in a Type2-NPDCCH common search space monitored by a terminal or a subframe which receives a NPDSCH allocated by a NPDCCH for DCI CRC scrambled by C-RNTI (or temporary C-RNTI).

In addition, a terminal does not need to monitor a Type2A-NPDCCH common search space in the same subframe monitoring a Type1A-NPDCCH common search space.

In addition, a terminal does not need to monitor a Type1A-NPDCCH common search space in a subframe that UE receives a NPDSCH allocated by a NPDCCH for DCI CRC scrambled by SC-RNTI.

In addition, a terminal does not need to monitor a Type2A-NPDCCH common search space in a subframe that UE receives a NPDSCH allocated by a NPDCCH for DCI CRC scrambled by G-RNTI or SC-RNTI.

A NPDCCH research space in an aggregation level and a repetition level is defined by a set of NPDCCH candidates.

For a NPDCCH UE-specific search space, an aggregation and repetition level defining the corresponding search space and the corresponding monitored NPDCCH candidates may be enumerated as in Table 3 as a value of R is substituted with a parameter npdcch-NumRepetitions configured by an upper layer.

TABLE 3

| $R_{max}$ | R | DCI subframe repetition number | NCCE indices of monitored NPDCCH candidates L' = 1 | L' = 2 |
|---|---|---|---|---|
| 1 | 1 | 00 | {0}, {1} | {0, 1} |
| 2 | 1 | 00 | {0}, {1} | {0, 1} |
|   | 2 | 01 | — | {0, 1} |
| 4 | 1 | 00 | — | {0, 1} |
|   | 2 | 01 | — | {0, 1} |
|   | 4 | 10 | — | {0, 1} |
| >=8 | $R_{max}/8$ | 00 | — | {0, 1} |
|   | $R_{max}/4$ | 01 | — | {0, 1} |
|   | $R_{max}/2$ | 10 | — | {0, 1} |
|   | $R_{max}$ | 11 | — | {0, 1} |

Note 1:
{x}, {y} denotes NPDCCH Format 0 candidate with NCCE index 'x', and NPDCCH Format 0 candidate with NCCE index 'y' are monitored
Note 2:
{x, y} denotes NPDCCH Format1 candidate corresponding to NCCEs 'x' and 'y' is monitored.

For a Type1-NPDCCH common search space, an aggregation and repetition level defining the corresponding search space and the corresponding monitored NPDCCH candidates are enumerated as in Table 4 as a value of R is substituted with a parameter npdcch-NumRepetitionPaging for a Type1-NPDCCH common search space configured by an upper layer or a parameter npdcch-NumRepetitions-SC-MCCH for a Type1A-NPDCCH common search space.

TABLE 4

| $R_{max}$ | R | | | | | | | | NCCE indices of monitored NPDCCH candidates L' = 1 | L' = 2 |
|---|---|---|---|---|---|---|---|---|---|---|
| 1 | 1 | — | — | — | — | — | — | — | — | {0, 1} |
| 2 | 1 | 2 | — | — | — | — | — | — | — | {0, 1} |
| 4 | 1 | 2 | 4 | — | — | — | — | — | — | {0, 1} |
| 8 | 1 | 2 | 4 | 8 | — | — | — | — | — | {0, 1} |
| 16 | 1 | 2 | 4 | 8 | 16 | — | — | — | — | {0, 1} |
| 32 | 1 | 2 | 4 | 8 | 16 | 32 | — | — | — | {0, 1} |
| 64 | 1 | 2 | 4 | 8 | 16 | 32 | 64 | — | — | {0, 1} |
| 128 | 1 | 2 | 4 | 8 | 16 | 32 | 64 | 128 | — | {0, 1} |
| 256 | 1 | 4 | 8 | 16 | 32 | 64 | 128 | 256 | — | {0, 1} |
| 512 | 1 | 4 | 16 | 32 | 64 | 128 | 256 | 512 | — | {0, 1} |
| 1024 | 1 | 8 | 32 | 64 | 128 | 256 | 512 | 1024 | — | {0, 1} |
| 2048 | 1 | 8 | 64 | 128 | 256 | 512 | 1024 | 2048 | — | {0, 1} |
| DCI subframe repetition number | 000 | 001 | 010 | 011 | 100 | 101 | 110 | 111 | | |

{x, y} denotes NPDCCH Format1 candidate corresponding to NCCEs 'x' and 'y' is monitored.

For a Type2-NPDCCH common search space and a Type2A-NPDCCH common search space, an aggregation and repetition level defining the corresponding search space and the corresponding monitored NPDCCH candidates are enumerated as in Table 5 as a value of R is substituted with a parameter npdcch-NumRepetitions-RA for a Type2-NPDCCH common search space configured by an upper layer or a parameter npdcch-NumRepetitions-SC-MTCH for a Type2A-NPDCCH common search space.

TABLE 5

| $R_{max}$ | R | DCI subframe repetition number | NCCE indices of monitored NPDCCH candidates L' = 1 | L' = 2 |
|---|---|---|---|---|
| 1 | 1 | 00 | — | {0, 1} |
| 2 | 1 | 00 | — | {0, 1} |
|   | 2 | 01 | — | {0, 1} |
| 4 | 1 | 00 | — | {0, 1} |
|   | 2 | 01 | — | {0, 1} |
|   | 4 | 10 | — | {0, 1} |
| >=8 | $R_{max}/8$ | 00 | — | {0, 1} |
|   | $R_{max}/4$ | 01 | — | {0, 1} |
|   | $R_{max}/2$ | 10 | — | {0, 1} |
|   | $R_{max}$ | 11 | — | {0, 1} |

{x, y} denotes NPDCCH Format1 candidate corresponding to NCCEs 'x' and 'y' is monitored.

In this case, a position of the starting subframe k is given by $k=k_b$. In this case, $k_b$ means a b-th consecutive NB-IoT downlink subframe from a subframe k0 excluding a subframe used to transmit a SI message, and the b is u×R and the u means 0, 1, ... ($R_{MAX}/R$)−1. In addition, the subframe k0 means a subframe which satisfies Equation 1.

$$(10n_f + \lfloor n_s/2 \rfloor) \bmod T = \|\alpha_{offset} \cdot T\|, \text{ where } T = R_{max} \cdot G, T \geq 4 \quad \text{[Equation 1]}$$

For a NPDCCH UE-specific search space, G shown in Equation 1 is given by an upper layer parameter nPDCCH-startSF-UESS and $\alpha_{offset}$, is given by an upper layer parameter nPDCCH-startSFoffset-UESS. In addition, for a NPDCCH Type2-NPDCCH common search space, G shown in Equation 1 is given by an upper layer parameter npdcch-StartSF-CSS-RA and $\alpha_{offset}$ is given by an upper layer parameter npdcch-Offset-RA.

For a NPDCCH Type2-NPDCCH common search space, G shown in Equation 1 is given by an upper layer parameter npdcch-startSF-SC-MTCH and $\alpha_{offset}$ is given by an upper layer parameter npdcch-Offset-SC-MTCH.

For a Type1-NPDCCH common search space, k is k0 and is determined at a position of a NB-IoT paging opportunity subframe.

For a Type1-NPDCCH common search space, k is k0 and k0 is a subframe which satisfies a condition of the following Equation 2.

$$(10n_f + \lfloor n_s/2 \rfloor) \bmod T = \lfloor \alpha_{offset} \cdot T \rfloor, \text{ where } T = R_{max} \cdot G, T \geq 4 \quad \text{[Equation 2]}$$

In Equation 2, G is given by an upper layer parameter npdcch-StartSF-SC-MCCH and $\alpha_{offset}$ is given by an upper layer parameter npdcch-Offset-SC-MCCH.

When a terminal is configured by an upper layer as PRB for monitoring a NPDCCH UE-specific search space, a terminal should monitor a NPDCCH UE-specific search space in a NB-IoT carrier configured by an upper layer. In this case, a terminal does not expect to receive NPSS, NSSS and NPBCH in the corresponding NB-IoT carrier. On the other hand, when the PRB is not configured by an upper layer, a terminal should monitor a NPDCCH UE-specific search space in the same NB-IoT carrier as NPSS/NSSS/NPBCH is detected.

When a NB-IoT terminal is configured by an upper layer parameter twoHARQ-ProcessesConfig, and when a NB-IoT terminal detects a NPDCCH having a DCI format N0 which ends at a subframe n and transmission of the corresponding NPUSCH format 1 starts at a subframe n+k, a terminal does not need to monitor a NPDCCH of an arbitrary subframe which starts in a range from a subframe n+1 to a subframe n+k−1.

When a NB-IoT terminal is not configured by an upper layer parameter twoHARQ-ProcessesConfig, and when a NB-IoT terminal detects a NPDCCH having a DCI format N0 which ends at a subframe n or receives a NPDSCH carrying a random access response grant which ends at a subframe n and transmission of the corresponding NPUSCH format 1 starts at a subframe n+k, a terminal does not need to monitor a NPDCCH of an arbitrary subframe which starts in a range from a subframe n+1 to a subframe n+k−1.

In a NPDCCH UE-specific search space, when a NB-IoT terminal is configured by an upper layer parameter two-HARQ-ProcessesConfig, when a NB-IoT terminal detects a NPDCCH having a DCI format N1 or N2 which ends at a subframe n and NPDSCH transmission starts at a subframe n+k, a terminal does not need to monitor a NPDCCH of an arbitrary subframe which starts in a range from a subframe n+k−2 to a subframe n+k−1.

In a NPDCCH UE-specific search space, when a NB-IoT terminal is not configured by an upper layer parameter twoHARQ-ProcessesConfig, when a NB-IoT terminal detects a NPDCCH having a DCI format N1 or N2 which ends at a subframe n and NPDSCH transmission starts at a subframe n+k, a terminal does not need to monitor a NPDCCH of an arbitrary subframe which starts in a range from a subframe n+1 to a subframe n+k−1.

When a NB-IoT terminal detects a NPDCCH having a DCI format N1 which ends at a subframe n and the corresponding NPDSCH transmission starts at a subframe n+k, and when the corresponding NPUSCH format 2 transmission starts at a subframe n+m, a terminal does not need to monitor a NPDCCH of an arbitrary subframe which starts in a range from a subframe n+k to a subframe n+k−1.

When a NB-IoT terminal detects a NPDCCH having a DCI format N1 for the "PDCCH order" which ends at a subframe n and the corresponding NPRACH transmission starts at a subframe n+k, a terminal does not need to monitor a NPDCCH of an arbitrary subframe which starts in a range from a subframe n+1 to a subframe n+k−1.

When a NB-IoT terminal is configured by an upper layer parameter twoHARQ-ProcessesConfig and a terminal has NPUSCH transmission which ends at a subframe n, a terminal does not need to receive any transmission at a subframe n+1.

When a NB-IoT terminal is not configured by an upper layer parameter twoHARQ-ProcessesConfig and a terminal has NPUSCH transmission which ends at a subframe n, a terminal does not need to monitor a NPDCCH of any subframe which starts in a range from a subframe n+1 to a subframe n+3.

When a NB-IoT terminal receives a NPDSCH which ends at a subframe n and does not need to monitor the corresponding NPUSCH format 2, a terminal does not need to monitor a NPDCCH of any subframe which starts in a range from a subframe n+1 to a subframe n+12.

When a NB-IoT terminal is configured by an upper layer parameter twoHARQ-ProcessesConfig, a terminal ends a candidate at a subframe n, and when a terminal is configured to monitor a NPDCCH candidate in other NPDCCH search spaces having a starting subframe k0 before a subframe n+5, there is no need to monitor a NPDCCH candidate in a NPDCCH search space.

When a NB-IoT terminal is not configured by an upper layer parameter twoHARQ-ProcessesConfig, and when a NPDCCH candidate in a NPDCCH search space ends at a subframe n, and a terminal is configured to monitor NPDCCH candidates in another NPDCCH search space having a starting subframe k0 before a subframe n+5, the terminal does not need to monitor a NPDCCH candidate in a NPDCCH search space.

A terminal does not need to monitor NPDCCH candidates in a NPDCCH search space during a NPUSCH UL gap.

Regarding a NPDCCH starting position, a starting OFDM symbol for a NPDCCH is given by an index $l_{NPDCCHStart}$ in the first slot of a subframe k.

When an upper layer parameter eutraControlRegionSize exists, the index $l_{NPDCCHStart}$ is given by an upper layer parameter eutaControlRegionSize. Contrary to it, when an upper layer parameter eutraControlRegionSize does not exist, the index $l_{NPDCCHStart}$ is 0.

A terminal discards a NPDCCH when consistent control information is not searched.

Downlink Control Information Format (DCI Format)

Format 0B

A DCI format 0B may be used for scheduling of a PUSCH at each of a plurality of subframes in an LLA (Licensed-Assisted Access) SCell and may transmit the following information.

Carrier indicator (e.g.: 0 or 3 bits)

PUSCH Trigger A: A value of 0 indicates non-triggered scheduling and a value of 1 indicates triggered scheduling. (e.g.: 1-bit)

Timing Offset (e.g.: 4-bits): When PUSCH trigger A is 0, a timing offset field indicates an absolute timing offset for PUSCH transmission and otherwise, the first two bits in this field indicate a timing offset for an UL offset 1 and the last two bits indicate a time window or validity of PUSCH scheduling through triggered scheduling.

Number of Scheduled Subframes (e.g.: 1 bit or 2 bits): When maxNumberOfSchedSubframes-Format0B-r14 is composed of two by an upper layer, a 1-bit field is applied and otherwise, a 2-bit field is applied.

The following Table 6 shows an example in which a bit value of a field for the number of scheduled subframes is determined.

TABLE 6 maxNumberOfSchedSubframes-Format0B-r14
ENUMERATED {sf2, sf3, sf4}
Max SF2 → 1bit (SF1 or SF2)
Max SF3 → 2bits (SF1 or SF2 or SF3 or reserved)
Max SF4 → 2bits (SF1 or SF2 or SF3 or SF4)

Resource block assignment: 5 or 6 bits provide resource allocation in an UL subframe.

Modulation and Coding Scheme (e.g.: 5-bits)

HARQ Process Number (e.g.: 4-bits): 4-bits are applied to the first scheduled subframe.

The following Table 7 shows an example of a HARQ process number.

TABLE 7

HARQ process ID $^{mod}$ ($n_{HARQ\_ID}$ + i, $N_{HARQ}$), i = 0, 1, ..., N−1, N from Number of scheduled subframes, $N_{HARQ}$ = 16;

New Data Indicator: A maxNumberOfSchedSubframes-Format0B-r14 bit. Each scheduled PUSCH corresponds to 1-bit.

Redundancy Version: A maxNumberOfSchedSubframes-Format0B-r14 bit. Each scheduled PUSCH corresponds to 1-bit.

The following Table 8 shows an example of a redundancy version.

TABLE 8

For a LAA SCell and DCI format 0B/4B, the redundancy version ($rv_{idx}$) to use in the physical uplink shared channel is given by $rv_{idx} = 2 \cdot rv$. → $rv_{idx}$ is 0 or 2

TPC Command for Scheduled PUSCH (e.g.: 2-bits)

Cyclic shift for DM RS and OCC Index (e.g.: 3-bits)

CSI Request: 1, 2, or 3 bits. A 2-bit field is applied to terminals configured with five or less DL cells, terminals which are configured for one or more DL cells and are mapped to a terminal specific search space where the corresponding DCI format is given by C-RNTI, terminals which are configured by upper layers with one or more CSI processes and are mapped to a terminal specific search space where the corresponding DCI format is given by C-RNTI and terminals which are configured with 2 CSI measurement sets by an upper layer with a parameter csi-MeasSubframeSet and are mapped to a terminal specific search space where the corresponding DCI format is given by C-RNTI.

A 3-bit field is applied to terminals which are configured for five or more DL cells and are mapped to a terminal specific search space where a DCI format therefor is given by C-RNTI.

Otherwise, a 1-bit field is applied.

SRS Request (e.g.: 2-bits)

PUSCH Starting Position (e.g.: 2-bits)

PUSCH Ending Symbol (e.g.: 1-bit): A value of 0 indicates the last symbol of the last scheduled subframe and a value of 1 indicates the last second symbol of the last scheduled subframe.

Channel Access type (e.g.: 1-bit)

Channel Access Priority Class (e.g.: 2-bits)

When the number of information bits of a format 0B is the same as a payload size of a DCI format 1, 2, 2A, 2B, 2C or 2D connected to a DL transmission mode configured in the same serving cell, one 0-bit is added to a format 0B.

RNTI Values

Table 9 shows an example of RNTI values and Table 10 shows an example of the usage of RNTI values and a related transport channel and logical channel.

TABLE 9

| Value (hexadecimal) | RNTI |
|---|---|
| 0000 | N/A |
| 0001-0960 | RA-RNTI, C-RNTI, Semi-Persistent Scheduling C-RNTI, Temporary C-RNTI, eIMTA-RNTI, TPC-PUCCH-RNTI, TPC-PUSCH-RNTI, SL-RNTI (see note), G-RNTI, SL-V-RNTI, UL Semi-Persistent Scheduling V-RNTI, SL Semi-Persistent Scheduling V-RNTI, and SRS-TPC-RNTI |
| 0961-FFF3 | C-RNTI, Semi-Persistent Scheduling C-RNTI, eIMTA-RNTI, Temporary C-RNTI, TPC-PUCCH-RNTI, TPC-PUSCH-RNTI, SL-RNTI, G-RNTI, SL-V-RNTI, UL Semi-Persistent Scheduling V-RNTI, SL Semi-Persistent Scheduling V-RNTI, and SRS-TPC-RNTI |
| FFF4-FFF8 | Reserved for future use |
| FFF9 | SI-RNTI |
| FFFA | SC-N-RNTI |
| FFFB | SC-RNTI |
| FFFC | CC-RNTI |
| FFFD | M-RNTI |
| FFFE | P-RNTI |
| FFFF | SI-RNTI |

TABLE 10

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH, BR-BCCH |
| M-RNTI | MCCH Information change notification | N/A | N/A |
| RA-RNTI | Random Access Response | DL-SCH | N/A |
| eIMTA-RNTI | eIMTA TDD UL/DL configuration notification | N/A | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |

TABLE 10-continued

| RNTI | Usage | Transport Channel | Logical Channel |
|---|---|---|---|
| TPC-PUCCH-RNTI | Physical layer Uplink power control | N/A | N/A |
| TPC-PUSCH-RNTI | Physical layer Uplink power control | N/A | N/A |
| SL-RNTI | Dynamically scheduled sidelink transmission for sidelink communication | SL-SCH | STCH |
| SC-RNTI | Dynamically scheduled SC-PTM control information | DL-SCH | SC-MCCH |
| G-RNTI | Dynamically scheduled SC-PTM transmission | DL-SCH | SC-MTCH |
| SC-N-RNTI | SC-MCCH Information change notification | N/A | N/A |
| CC-RNTI | Providing common control PDCCH information | N/A | N/A |
| SL-V-RNTI | Dynamically scheduled sidelink transmission for V2X sidelink communication | SL-SCH | STCH |
| UL Semi-Persistent Scheduling V-RNTI | Semi-Persistently scheduled uplink transmission for V2X communication (activation, reactivation and retransmission) | UL-SCH | DCCH, DTCH |
| SL Semi-Persistent Scheduling V-RNTI | Semi-Persistently scheduled sidelink transmission for V2X sidelink communication (activation, reactivation and retransmission) | SL-SCH | STCH |
| SRS-TPC-RNTI | SRS and TPC for the PUSCH-less SCells | N/A | N/A |

As described above, Narrowband (NB)-LTE refers to a system for supporting low complexity and low power consumption with system bandwidth (system BW) corresponding to 1 PRB (Physical Resource Block) of a LTE system.

In other words, a NB-LTE system may be largely used as a communication method for implementing IoT by supporting a device (or a terminal) such as a machine-type communication (MTC) in a cellular system. In other words, a NB-LTE system may be referred to as NB-IoT.

In addition, a NB-IoT system does not need to allocate an additional band for a NB-IoT system by using the same OFDM parameters of subcarrier spacing, etc. used in the existing LTE system as the LTE system. In this case, there is an advantage of using frequency effectively by allocating 1 PRB of a legacy LTE system band for NB-IoT.

For a downlink, a physical channel of a NB-IoT system may be defined as N-PSS (N-Primary Synchronization Signal)/N-SSS (N-Secondary Synchronization Signal), N-PBCH (N-Physical Broadcast Channel), N-PDCCH/N-EPDCCH, N-PDSCH, etc. In this case, 'N-' may be used to distinguish from a legacy LTE.

In addition, a control channel used in (e) MTC may be defined as a MPDCCH, etc.

In the present disclosure, a legacy terminal (legacy UE) and an enhanced terminal (enhanced UE) may be defined as follows.

Legacy Terminal: One transport block (TB) may be scheduled by one DCI. The legacy terminal cannot recognize a DCI format for scheduling multi transport blocks (Multi-TBs).

Enhanced Terminal: Multi transport blocks may be scheduled by One DCI and the enhanced terminal can recognize a DCI format for scheduling multi transport blocks.

In this description, monitoring a search space may mean a process of confirming whether to match a desired value by scrambling the corresponding CRC with a pre-promised specific RNTI value after decoding as many N-PDCCHs as specific regions according to a DCI format to be received through the corresponding search space.

In addition, for a NB-IoT system, each terminal recognizes a single PRB as each carrier, so a PRB mentioned in the present disclosure may be interpreted as the same meaning as a carrier.

In addition, a DCI format N0, a DCI format N1 and a DCI format N2 mentioned in the present disclosure may mean the above-described (e.g.: defined by 3GPP standards) DCI format N0, DCI format N1 and DCI format N2.

In addition, embodiments suggested in this description are described based on a relation between a radio frame and a subframe, but it may be also equally applied to a relation between a frame and a subframe in a next-generation radio communication system (e.g.: a NR system). In other words, a radio frame in this description may mean a frame.

In addition, in embodiments suggested in this description, mapping into a resource of data and/or information (or resource allocation for data and/or information) may be configured in a unit of a slot configuring a subframe as well as in a unit of a subframe. In an example, SIB1-NB may be mapped in a unit of a slot in a subframe. In this case, the number of OFDM symbols configuring a slot and the number of slots per frame and/or subframe may be differently configured according to numerology and/or cyclic prefix (CP) length.

In the LTE LAA of the existing NB-IoT system (e.g.: a NB-IoT system of Release 14) only multi subframe scheduling for PUSCH transmission was introduced. In reference to a DCI format 0B, a base station may indicate a total number of subframes to be scheduled through the corresponding DCI and it may be determined based on a value of a parameter maxNumberOfSchedSubframes-Format0B-r14 transmitted by RRC signaling.

In addition, 1 HARQ process number may be informed by a HARQ process number field and a HARQ process number may be determined in the ascending order according to a total number of subframes to be scheduled.

A new data indicator and a redundancy version may be transmitted by using a 1-bit per subframe and MCS/resource allocation/timing offset, etc. may be commonly applied.

At first, the existing NB-IoT system used only a single HARQ process, but after that, two HARQ processes were introduced. In this case, a HARQ process number may represent how many different pieces of information a terminal may store in a terminal buffer until transmission and reception are completed again from initial transmission and reception.

In other words, once a single HARQ process terminal receives a DL grant or a UL grant after receiving DCI, it may not perform an operation for a subsequent DL grant or UL grant until all retransmissions for the corresponding HARQ process ID are completed.

Accordingly, a terminal does not perform a terminal specific search space monitoring operation until all transmissions for the corresponding HARQ process ID are completed. But, two HARQ process terminals may process two different DL grants or UL grants.

Hereinafter, the present disclosure gives an explanation by dividing a single HARQ and a two HARQ and based on multi subframe scheduling introduced in LTE LAA.

As the existing NB-IoT system is designed to repeatedly transmit a single TB to a multi subframe, a method described in the present disclosure uses an expression of multi-TB scheduling.

Figure 7:
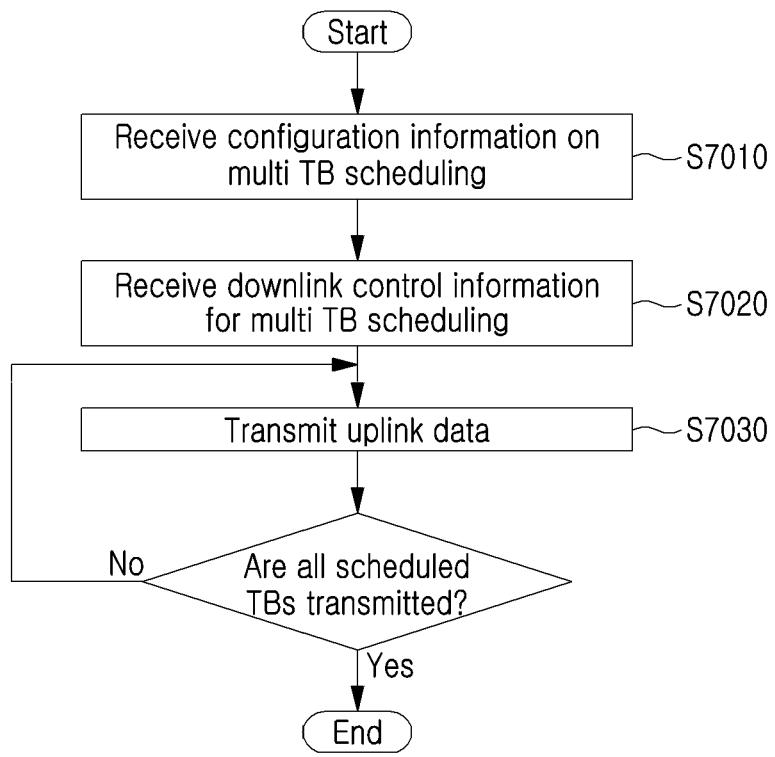
FIG. 7 and FIG. 8 are a flow chart showing an example of a terminal operation which performs the multi-TB scheduling of one or more physical channels/signals to which a method suggested in the present disclosure may be applied.
Figure 8:
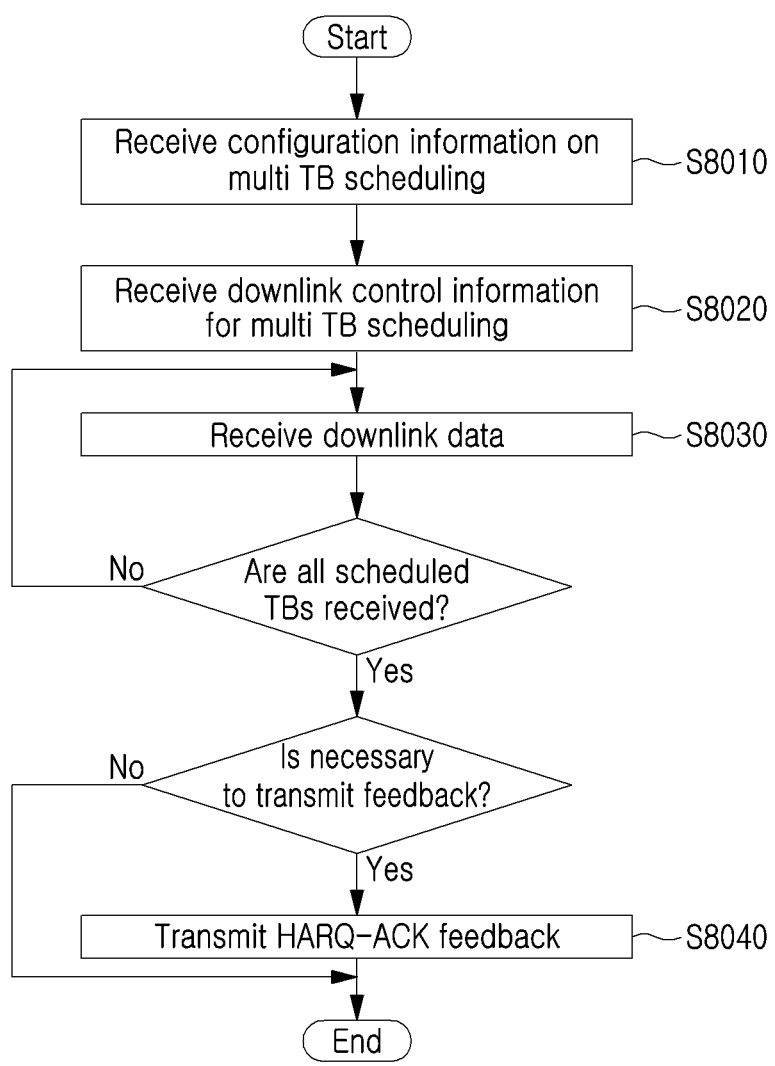

FIG. 7 and FIG. 8 are a flow chart showing an example of a terminal operation which performs the multi-TB scheduling of one or more physical channels/signals to which a method suggested in the present disclosure may be applied.

FIG. 7 shows an example of uplink transmission of a terminal and FIG. 8 shows an example of downlink reception of a terminal.

In reference to FIG. 7, a terminal may receive configuration information on multi-TB scheduling to transmit uplink data to a base station S7010 and receive DCI for multi-TB scheduling based on configuration information S7020.

Here, DCI may include scheduling information that a terminal needs for transmitting uplink data to a base station.

After that, a terminal may transmit uplink data which is based on scheduled TBs to a base station based on received DCI S7030.

In this case, a terminal may continuously transmit uplink data to a base station until all scheduled TBs are transmitted.

FIG. 8 shows an example of downlink reception of a terminal.

A terminal may receive configuration information on multi-TB scheduling to receive downlink data from a base station S8010 and receive DCI for multi-TB scheduling based on configuration information S8020.

After that, a terminal may receive downlink data which is based on scheduled TBs from a base station based on received DCI S8030.

In this case, a terminal may continuously receive downlink data from a base station until all scheduled TBs are received.

When all scheduled TBs are received, a terminal may transmit a HARQ-Ack feedback to a base station according to whether a feedback on received TBs is needed S8040.

Figure 9:
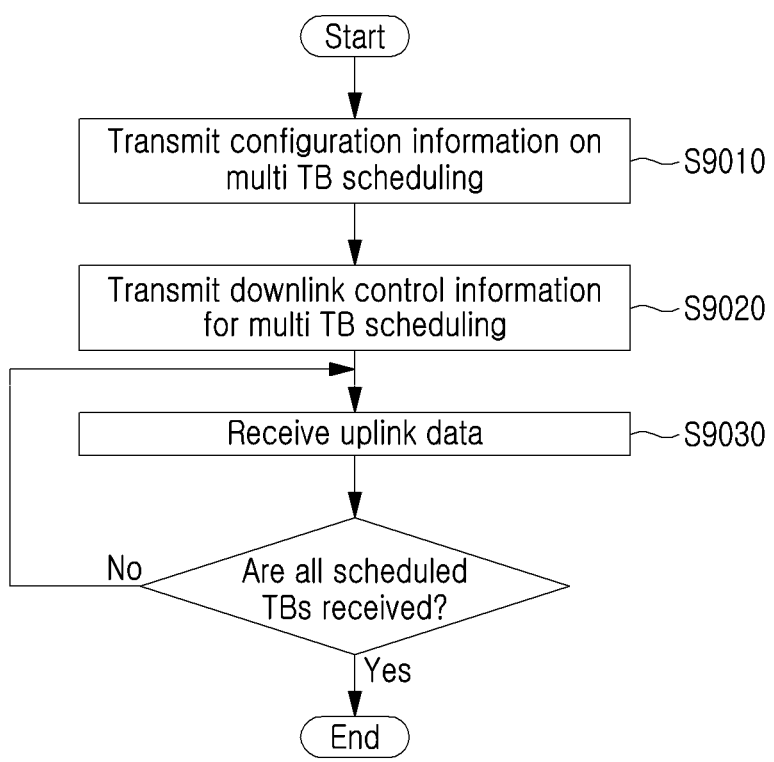
FIG. 9 and FIG. 10 are a flow chart showing an example of a base station operation which performs the multi-TB scheduling of one or more physical channels/signals to which a method suggested in the present disclosure may be applied.
Figure 10:
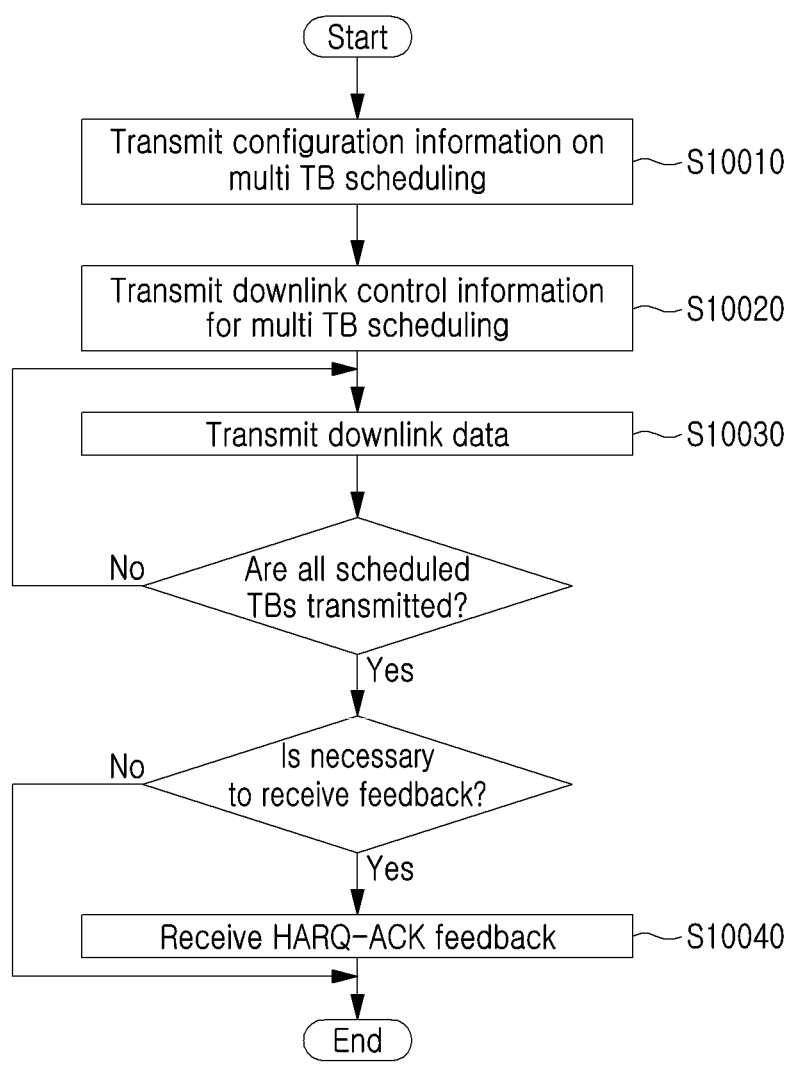

FIG. 9 and FIG. 10 are a flow chart showing an example of a base station operation which performs the multi-TB scheduling of one or more physical channels/signals to which a method suggested in the present disclosure may be applied.

A base station may transmit configuration information on multi-TB scheduling to receive downlink data to a terminal 59010 and the terminal may receive DCI for multi-TB scheduling based on configuration information S9020.

Here, DCI may include scheduling information that a terminal needs for transmitting uplink data to a base station.

After that, a base station may receive uplink data which is based on scheduled TBs from a terminal based on transmitted DCI S9030.

In this case, a base station may continuously receive uplink data from a terminal until all scheduled TBs are received.

FIG. 10 shows an example of downlink transmission of a base station.

A base station may transmit configuration information on multi-TB scheduling to transmit downlink data to a terminal S10010 and transmit DCI for multi-TB scheduling based on configuration information S10020.

After that, a base station may transmit downlink data which is based on scheduled TBs to a terminal based on received DCI S10030.

In this case, a base station may continuously transmit downlink data to a terminal until all scheduled TBs are transmitted.

When all scheduled TBs are transmitted, a base station may receive a HARQ-Ack feedback from a terminal according to whether a feedback on received TBs is needed S10040.

Figure 11:
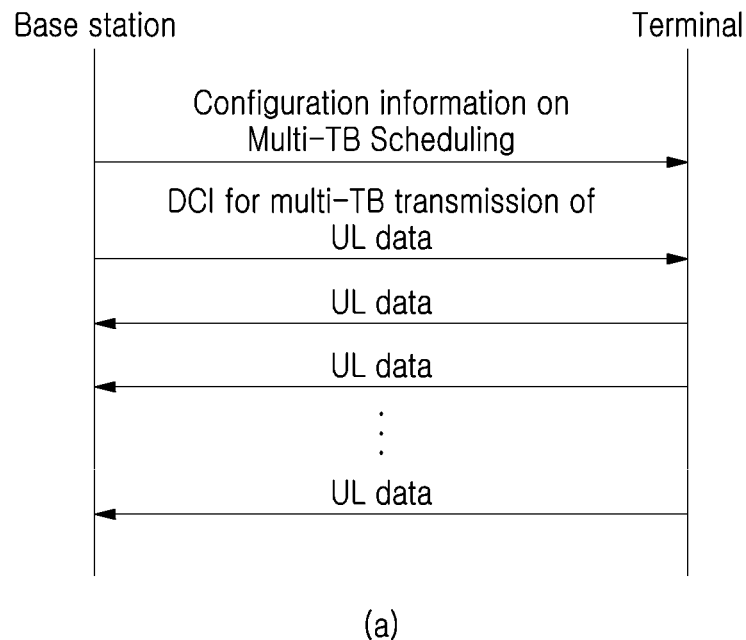
FIG. 11 is a flow chart showing an example of signaling between a base station and a terminal which perform the multi-TB scheduling of one or more physical channels/signals to which a method suggested in the present disclosure may be applied.
Figure 11:
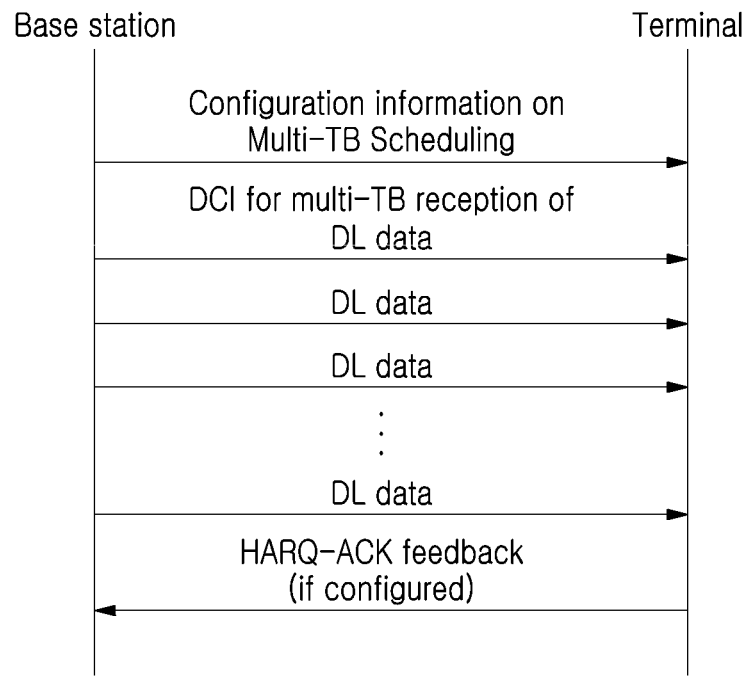

FIG. 11 is a flow chart showing an example of signaling between a base station and a terminal which perform the multi-TB scheduling of one or more physical channels/signals to which a method suggested in the present disclosure may be applied.

FIG. 11 shows an example of signaling for a method of transmitting and receiving uplink data and downlink data between a terminal and a base station described in FIGS. 7 to 10.

The FIG. 11(a) shows an example of a method transmitting and receiving uplink data between a terminal and a base station through multi-TB scheduling and the FIG. 11(b) shows an example of a method transmitting and receiving downlink data between a terminal and a base station through multi-TB scheduling.

As described in FIGS. 7 to 10, a detailed method will be omitted.

Hereinafter, multi-TB scheduling in NB-IoT on a single HARQ process suggested in the present disclosure will be described.

Multi-TB Scheduling of NB-IoT on a Single HARQ Process

First, multi-TB scheduling on downlink or uplink that retransmission is not necessary will be described.

For example, the transmission of SC-PTM (single cell point to multipoint (e.g., SC-MCCH (single cell-multicast control channel), SC-MTCH (single cell-multicast traffic channel) may correspond to downlink data transmission that retransmission is not necessary.

Hereinafter, it is described based on SC-PTM transmission for convenience of explanation in the present disclosure, but it is obvious that the present disclosure is not limited thereto and may be applied to other transmission methods that retransmission is not necessary.

When multi-TB scheduling is applied to SC-PTM, multi-TB scheduling may be used for SC-MTCH transmission and it may be monitored after a terminal obtains a carrier that a NPDCCH scheduling a NPDSCH carrying SC-MTCH through SC-MCCH is transmitted, and used G-RNTI information. In addition, SC-MCCM may be used for SC-MCCH transmission.

Figure 12:
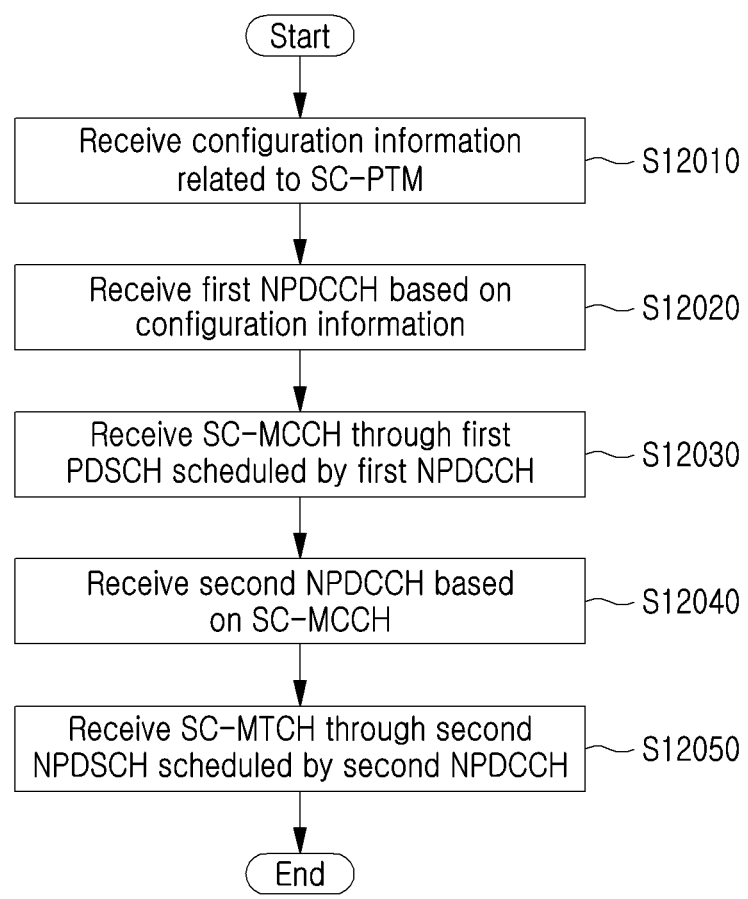
FIG. 12 is a flow chart showing an example of a terminal operation related to SC-PTM (Sing Cell Point to Multipoint) to which a method suggested in the present disclosure may be applied.

FIG. 12 is a flow chart showing an example of a terminal operation related to SC-PTM (Sing Cell Point to Multipoint) to which a method suggested in the present disclosure may be applied.

In reference to FIG. 12, for a terminal, when multi TBs are scheduled, scheduling information related to TBs may be transmitted through DCI.

Concretely, a terminal may receive configuration information (e.g., higher layer signaling) related to a SC-PTM procedure from a base station S12010.

When a configuration related to a SC-PTM procedure is pre-configurated, a step S12010 may be omitted.

After that, a terminal may receive (or monitor) the first NPDCCH in a search space configured based on configuration information transmitted from a base station. In this case, DCI for scheduling the first NPDSCH that SC-MCCH is carried may be transmitted through the corresponding first NPDCCH S12020.

After that, a terminal may receive SC-MCCH from a base station through the first NPDSCH scheduled by the first NPDCCH S12030.

A terminal may receive (or monitor) the second NPDCCH (in a configured search space) based on the received SC-MCCH S12040.

In this case, DCI for scheduling the second NPDSCH that SC-MTCH is carried may be transmitted through the corresponding second NPDCCH. In this case, scheduling information on multi TBs may be transmitted by using DCI for a legacy terminal or scheduling information on multi TBs may be transmitted by configuring separate DCI.

After that, a terminal may receive SC-MTCH from a base station through the second NPDSCH scheduled by the second NPDCCH S12050.

Figure 13:
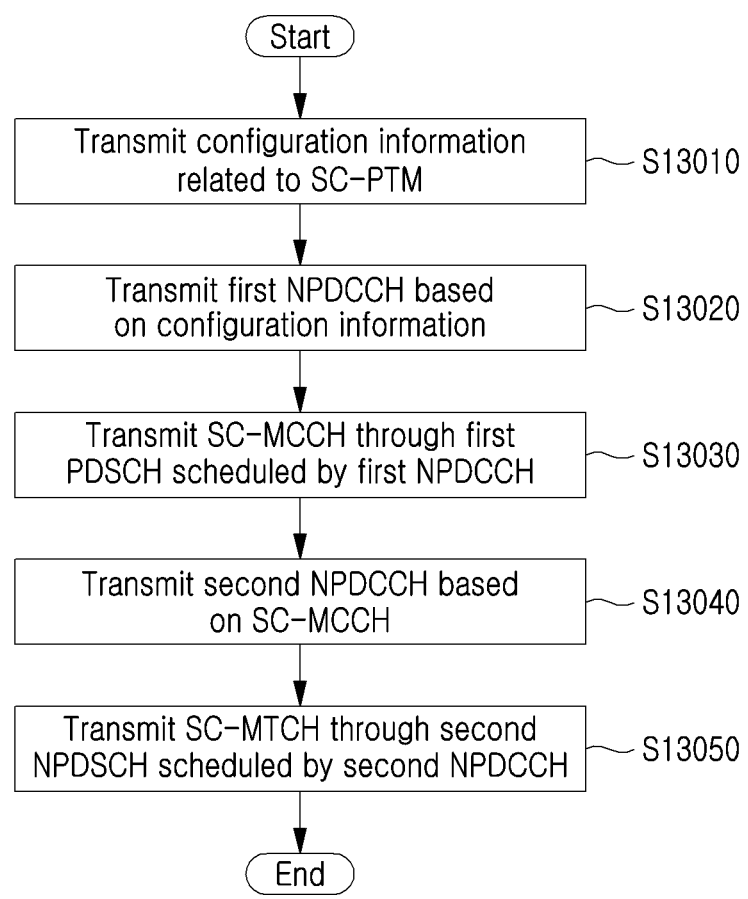
FIG. 13 is a flow chart showing an example of a base station operation related to a SC-PTM (Sing Cell Point to Multipoint) to which a method suggested in the present disclosure may be applied.

FIG. 13 is a flow chart showing an example of a base station operation related to a SC-PTM (Sing Cell Point to Multipoint) to which a method suggested in the present disclosure may be applied.

Concretely, a base station may transmit configuration information (e.g., higher layer signaling) related to a SC-PTM procedure to a terminal S13010.

When a configuration related to a SC-PTM procedure is pre-configured, a step S13010 may be omitted.

After that, a base station may transmit to a terminal DCI for scheduling the first NPDSCH that SC-MCCH is carried through the first NPDCCH S13020.

After that, a base station may transmit SC-MCCH to a terminal through the first NPDSCH scheduled by the first NPDCCH S13030.

A base station may transmit the second NPDCCH (in a configured search space) based on SC-MCCH S13040.

In this case, DCI for scheduling the second NPDSCH that SC-MTCH is transmitted through the corresponding second NPDCCH may be transmitted. After that, a base station may transmit SC-MTCH to a terminal through the second NPDSCH scheduled by the second NPDCCH S13050.

Hereinafter, multi-TB scheduling suggested in the present disclosure may be used for the transmission of SC-MCCH and/or the transmission of ST-MTCH.

Figure 14:
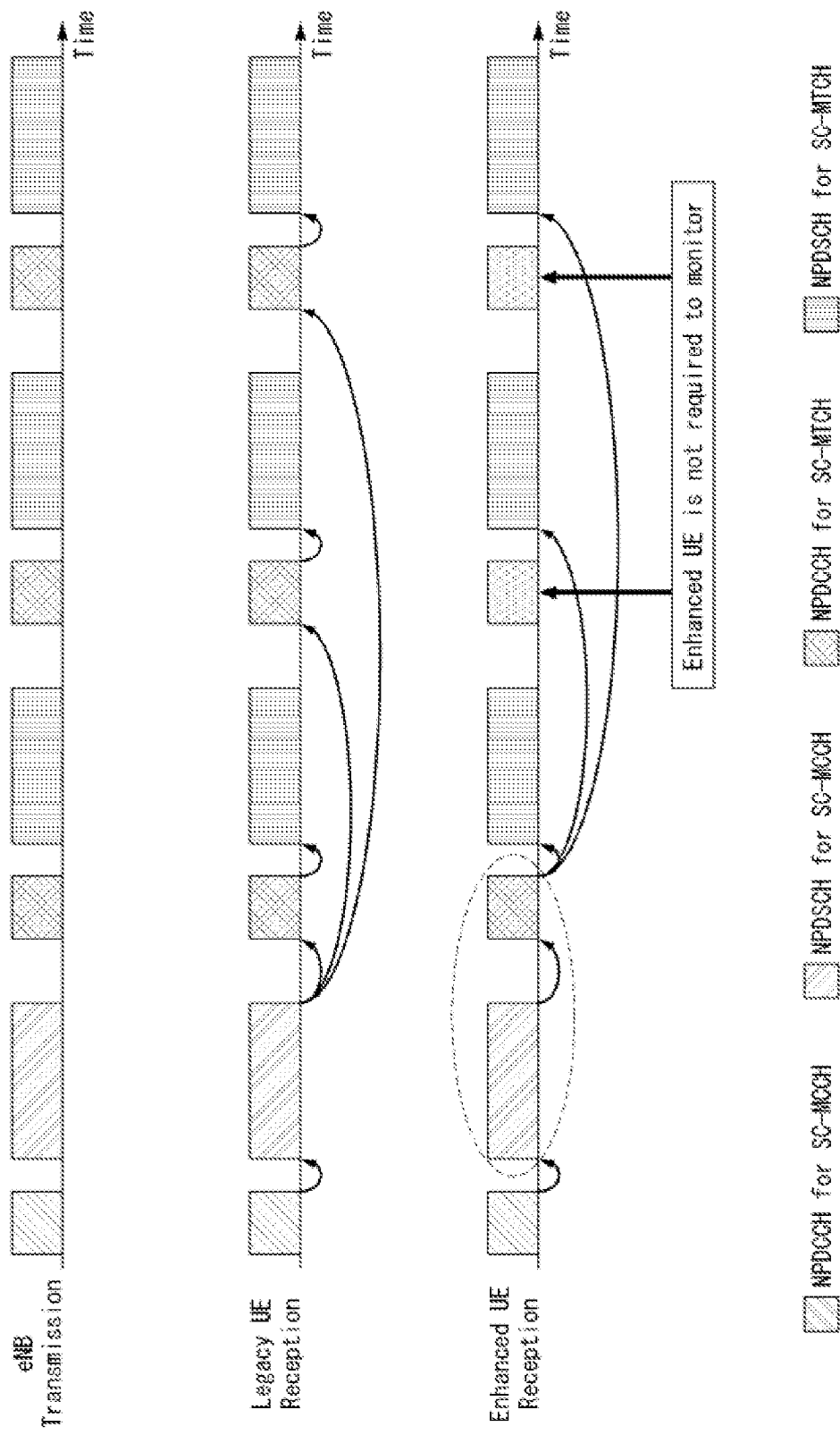
FIG. 14 is a diagram showing an example of multi-TB scheduling on a SC-MCCH (Single Cell Multicast Control Channel) suggested in the present disclosure.

Embodiment 1_Indicate Multi-TB Scheduling Information by Using Legacy DCI and SC-MCCH Payload FIG. 14 is a diagram showing an example of multi-TB scheduling on a SC-MCCH (Single Cell Multicast Control Channel) suggested in the present disclosure.

In reference to FIG. 14, a base station may transmit multi-TB scheduling and information related to scheduling to a terminal through a NPDSCH for transmitting the existing legacy DCI and SC-MCCH without new DCI configuration.

Concretely, a base station may transmit a NPDCCH (the first NPDCCH) for SC-MCCH to a terminal as shown in FIG. 14. In this case, a base station may transmit configuration information related to SC-PTM to a terminal before transmitting a NPDCCH.

After that, a base station may transmit SC-MCCH through a NPDSCH (the first PDSCH) scheduled by the first NPDCCH. In this case, a base station may include indication information representing whether multi TBs are scheduled in the first PDSCH.

An enhanced terminal may recognize by indication information that multi TBs are scheduled and may receive the second DCI through a NPDCCH (the second NPDCCH) for SC-MTCH which is transmitted subsequently.

A base station may transmit the second NPDCCH based on the first PDSCH and transmit SC-MTCH to a terminal through a NPDSCH (the second NPDSCH) scheduled by the second NPDCCH.

In this case, the second DCI may include scheduling information for receiving SC-MTCH through a NPDSCH (the second NPDSCH), and the second NPDCCH and the second NPDSCH may be repeatedly transmitted at a constant period until all scheduled multi TBs are transmitted.

In this case, a legacy terminal may not recognize indication information representing whether multi TBs are scheduled transmitted from a base station and scheduling information related to multi-TB scheduling in the second DCI transmitted through the second NPDCCH.

Accordingly, a legacy terminal should receive all NPDCCHs and NPDSCHs transmitted by a base station.

But, an enhanced terminal may recognize whether multi TBs are scheduled through indication information representing whether multi TBs are scheduled included in the first NPDSCH transmitted by a base station.

When multi TBs are scheduled, a terminal may receive the second DCI transmitted through the second NPDCCH and may receive the second NPDSCH transmitted subsequently through multi-TB scheduling information included in the second DCI.

In this case, scheduling information may include at least one of the number of actually-scheduled TBs, a scheduling delay for multi TBs and/or the number of repetitions for multi TBs.

The second NPDSCH may be transmitted repeatedly until all scheduled multi TBs are transmitted and scheduling information related to the second NPDSCH transmission may be the same.

An enhanced UE does not need to receive the second NPDCCH all the time before receiving the second NPDSCH. Accordingly, an enhanced UE recognizes whether multi TBs are scheduled through the first NPDSCH and when receiving scheduling information related to multi TB transmission through the second NPDCCH, it may receive the second NPDSCH which is repeatedly transmitted without receiving the second NPDCCH which is transmitted subsequently.

In other words, a terminal may receive the second NPDSCH which is repeatedly transmitted without monitoring the second NPDCCH which is transmitted subsequently because it may know scheduling information and whether multi TBs are scheduled through the first NPDSCH and the second NPDCCH.

In other words, an embodiment 1 may be configured to include the scheduling information of multi TBs per each SC-MTCH (e.g., per G-RNTI value) in a SC-MCCG payload. In this case, whether multi TBs are scheduled may explicitly indicate on/off in a 1-bit flag and implicitly indicate that a specific parameter value (e.g., G-RNTI) is configured as one of pre-configured values.

For example, a specific range of a G-RNTI value (e.g., FF00~FFF3) may be configured as G-RNTI indicating multi-TB scheduling, scheduling information of multi TBs related to it may be additionally transmitted to SC-MCCH and DCI (the second DCI) actually scheduling SC-MTCH may be transmitted as before.

In this case, as a legacy terminal may not recognize whether the corresponding G-RNTI value indicates multi- TB scheduling, it may monitor the first NPDCCH scheduling SC-MTCH according to the existing operation and receive SC-MTCH scheduled by the corresponding NPDCCH.

On the other hand, as an enhanced terminal may recognize that the corresponding G-RNTI value indicates whether multi TBs are scheduled, it may receive SC-MTCH scheduled by multi TBs by combining scheduling information of multi TBs received through SC-MTCCH and other information (e.g., MCS, resource allocation, the number of repetitions, etc.) received through legacy DCI.

In this case, scheduling information for scheduling multi TBs may be configured as follows. For the number of actually-scheduled TBs, the maximum number of TBs may be transmitted to a terminal through SIB in a semi-static way and a terminal may recognize the number of actually-scheduled TBs by different interpretation according to a transmitted value.

In addition, a scheduling delay for multi TBs may inform a terminal of only one value and a scheduling delay transmitted to a terminal may be configured to be used as a scheduling delay between all TBs (e.g., an interval from the last subframe in which a NPDSCH transmitting a precedent TB is transmitted to the first subframe in which a NPDSCH transmitting a subsequent TB is transmitted).

In addition, for the flexible scheduling of a base station, as many scheduling delay values as the number of actually-scheduled TBs may be independently configured and may be transmitted to a terminal.

In addition, the number of repetitions for multi TBs may be configured to transmit only one value to a terminal and to be used as the number of repetitions of all TBs, and for the flexible scheduling of a base station, the number of repetitions as many as the number of actually-scheduled TBs may be independently configured and may be transmitted to a terminal.

In this case, as shown in FIG. 14, a base station generates and transmits new DCI for a NPDSCH to legacy terminals, but scheduling information included in each DCI such as MSC, resource allocation, the number of repetitions, etc. may be scheduled the same as information included in DCI which is transmitted before.

An enhanced terminal may obtain indication information indicating whether multi TBs are scheduled through a SC-MCCH payload and may recognize whether multi TBs are scheduled and scheduling information for multi TBs transmission by receiving scheduling information transmitted through a NPDCCH for SC-MTCH.

An enhanced terminal may recognize that a NPDCCH for SC-MTCH transmitted subsequently includes the same scheduling information as a NPDCCH for SC-MTCH transmitted before.

Accordingly, an enhanced terminal may receive NPDSCHs for transmitting a scheduled multi TB without monitoring a NPDCCH on SC-MTCH transmitted subsequently.

Such a method may reduce a broadcasting load of a base station. In other words, even when a base station schedules SC-MTCH as a single TB for a legacy terminal, the base station may include additional information for an enhanced terminal in SC-MCCH and transmit it to the enhanced terminal, the enhanced terminal can recognize and receive it as multi-TB scheduling.

In addition, it is not necessary to receive a DCI field which separately generates an additional DCI format for multi-TB scheduling.

Figure 15:
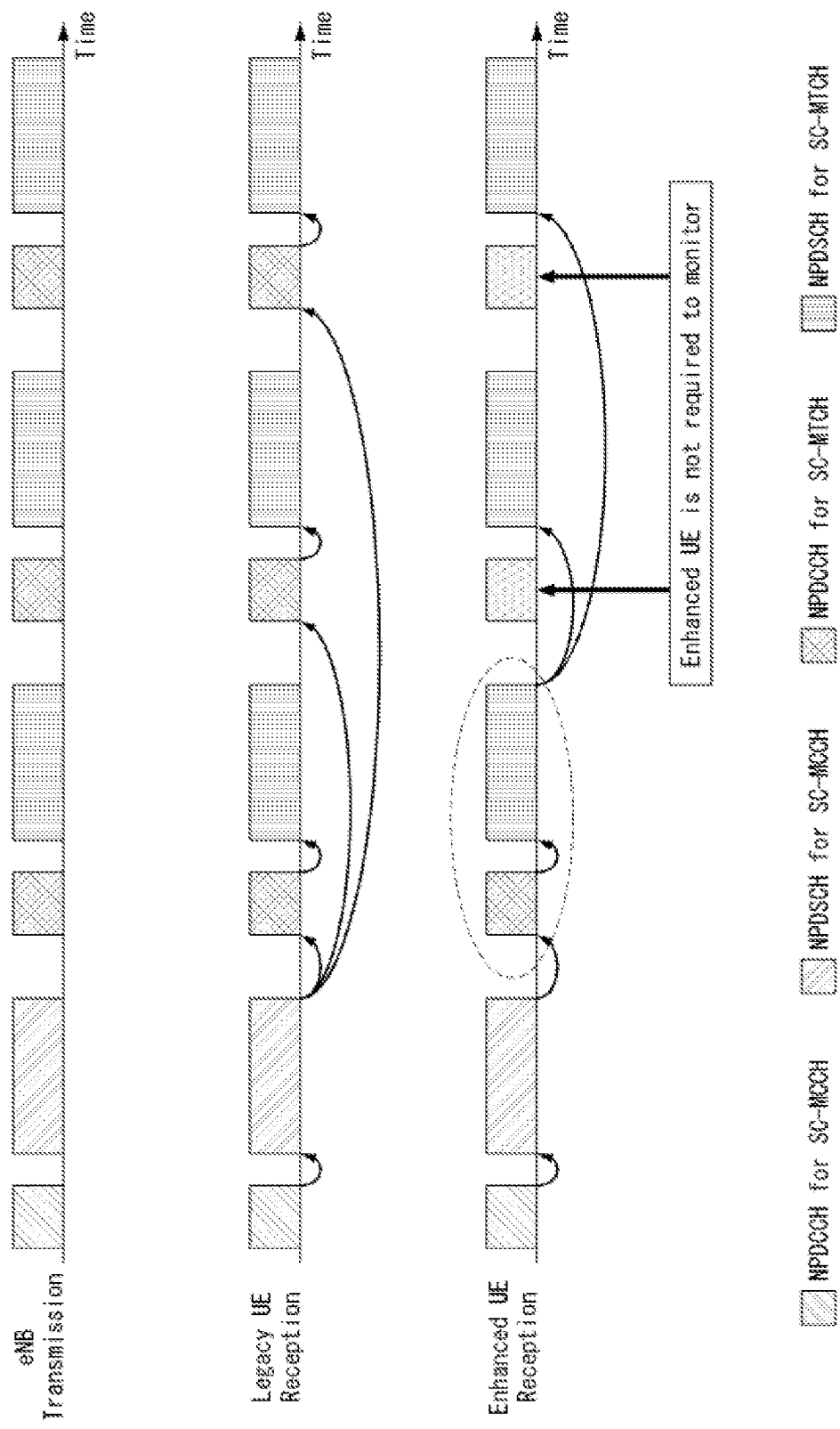
FIG. 15 is a diagram showing another example of multi-TB scheduling on a SC-MCCH (Single Cell Multicast Control Channel) suggested in the present disclosure.

Embodiment 1-1_Indicate Multi-TB Scheduling Information by Using Legacy DCI and SC-MCCH Payload FIG. 15 is a diagram showing another example of multi-TB scheduling on a SC-MCCH (Single Cell Multicast Control Channel) suggested in the present disclosure.

In reference to FIG. 15, unlike FIG. 14, indication information indicating whether multi TBs are scheduled may be included in the payload of SC-MTCH, not in the payload of SC-MCCH, and may be transmitted.

Concretely, as shown in FIG. 15, unlike FIG. 14, indication information representing whether multi TBs are scheduled may be transmitted through the payload of SC-MTCH, not through the payload of SC-MCCH.

An embodiment 1-1 is the same as a legacy terminal up to an operation that a terminal receives the second NPDSCH for transmitting SC-MTCH, but an enhanced terminal may recognize whether multi TBs are scheduled through indication information included in the SC-MTCH payload.

After that, a terminal may not monitor the second NPDCCH scheduling SC-MTCH which is subsequently transmitted based on scheduling information for transmitting multi TBs included in the second NPDCCH for SC-MTCH and indication information included in the second NPDSCH.

In this case, scheduling information may include whether there is a TB which will be consecutively transmitted subsequently, a scheduling delay to a subsequent TB, the number of repetitions of a subsequent TB, etc.

Scheduling information for scheduling of multi TBs may be configured as follows. Information on whether there is a TB to be transmitted after transmitting the second NPDSCH including indication information may be represented as a 1-bit field and the maximum number of scheduling TBs may be configured by SIB in a semi-static way.

When as many multi TBs as the maximum number of scheduling TBs are scheduled, a terminal may expect that information for a subsequent TB is no longer transmitted to the last TB.

In addition, a scheduling delay to a subsequent TB (e.g., from the last subframe in which a NPDSCH transmitting a precedent TB is transmitted to the first subframe in which a NPDSCH transmitting a subsequent TB is transmitted) may be given as an offset of a scheduling delay value which is obtained first or as a new value.

In this case, when there is no corresponding information, the same value as a scheduling delay value which is transmitted before may be used, and the number of repetitions of a subsequent TB may be given as an offset of a value of the number of repetitions which is obtained first or as a new value.

In other words, as shown in FIG. 15, a base station transmits new DCI to legacy terminals every time, but MCS, resource allocation, the number of repetitions, etc. which will be included in the corresponding DCI may be included in scheduling information and transmitted in the same manner as information included in DCI which is transmitted before.

As shown in FIG. 15, an enhanced terminal may not monitor a NPDCCH for SC-MTCH transmitted subsequently as it receives whether multi TBs are scheduled through the SC-MTCH payload and scheduling information.

Such a method may reduce broadcasting load of a base station. In other words, even when a base station schedules SC-MTCH as a single TB for a legacy terminal, the base station may include additional information for an enhanced terminal in SC-MCCH and transmit it to the enhanced terminal, and the enhanced terminal can recognize and receive it as multi-TB scheduling.

Embodiment 2_Indicate Multi-TB Scheduling Information Through Compact DCI/WUS (Wake Up Signal)

An embodiment 2 is an example of a method scheduling multi TBs through compact DCI (or, wake-up signal) instead of enhanced DCI for scheduling multi TBs.

In this case, compact DCI means a DCI using the payload smaller than a legacy DCI format (e.g., a DCI format N0, N1, N2).

When compact DCI is used, a base station benefits in terms of resource management because it is not necessary to largely allocate a search space due to the small DCI payload and a terminal has an advantage in terms of battery saving because it needs to monitor a search space only for a shorter time.

In addition, as a signal introduced to NB-IoT/eMTC, a wake-up signal was introduced to reduce energy which is consumed while monitoring a paging search space in terms of a terminal.

Basically, transmitting multi-TB scheduling information by using the payload of SC-MCCH or SC-MTCH is similar to the method 1, 1-1, but it may be configured to be transmitted between scheduled multi TBs by using compact DCI or a wake-up signal to configure MCS, resource allocation, the number of repetitions, etc. transmitted through legacy DCI more flexibly than the above-suggested methods.

In this case, compact DCI may be easily made by removing only what is unnecessary from a DCI format.

In addition, a search space for compact DCI may be newly configured and the corresponding information may be configured differently per TMGI through SIB or the SC-MCCH payload.

A RNTI value used in this case may be configured to use a G-RNTI value corresponding to the corresponding TMGI. When this method is used, independent MCS, resource allocation, the number of repetitions, etc. may be provided while performing multi-TB scheduling, so a resource may be effectively managed in terms of a base station.

Embodiment 3_Introduce New DCI for Multi-TB Scheduling

For multi-TB scheduling, a separate DCI format may be configured. Hereinafter, in the present disclosure, a new DCI format for multi-TB scheduling is referred to as enhanced DCI.

In other words, a separate DCI format for multi-TB scheduling except for a pre-configured DCI format may be configured and a base station may schedule multi TBs by transmitting the DCI of an enhanced DCI format to a terminal.

Concretely, a base station configures a separate DCI format for scheduling multi TBs and transmits enhanced DCI to a terminal through a NPDCCH when scheduling multi TBs.

When enhanced DCI is transmitted from a base station while monitoring DCI in a search space, an enhanced terminal may receive it to obtain scheduling information related to multi-TB scheduling and may transmit and receive multi TBs through received scheduling information.

In other words, SC-MTCH information that both a legacy terminal and an enhanced terminal may recognize and decode is basically included and transmitted to the SC-MCCH payload and SC-MTCH information that only an enhanced terminal may recognize and decode may be additionally included and transmitted.

In other words, a legacy terminal may not decode and recognize SC-MTCH information for an enhanced terminal although it receives the SC-MCCG payload.

In this case, SC-MTCH information that only an enhanced terminal may recognize and decode may be transmitted after information which is transmitted by being included in legacy SC-MTCH information (e.g., a scheduling carrier index, search space information for SC-RNTI, SC-MTCH, etc.) is configured as an independent value and enhanced terminals for receiving it may be configured to recognize DCI scheduling SC-MTCH as enhanced DCI and monitor the corresponding DCI.

When such a method is used, a terminal does not need to perform blind decoding for a different DCI size.

Scheduling information which may be transmitted through enhanced DCI (e.g., the number of scheduled TBs, a scheduling delay, etc.) may be configured in the following method.

Hereinafter, described methods are just divided for convenience of description, and they may be applied by substituting or mutually combining part of a configuration.

(1) The Number of Scheduling TBs
  (Method 1) The maximum number of multi TBs used for the multi-TB scheduling of each SC-MTCH through a system information block (SIB) (e.g., SIB 20) may be informed to a terminal and the number of actually-scheduled TBs may be transmitted to a terminal through enhanced DCI scheduling SC-MTCH.

In other words, a SIB may include the maximum number of scheduling TBs and enhanced DCI may include the number of actually-scheduling TBs.

Each SC-MTCH may be configured to follow the maximum number of one common multi TB to prevent the number of fields of enhanced DCI from increasing or each SC-MTCH may be configured to include the maximum number of independent multi TBs.

(Method 2): Each SC-MTCH may be configured to include the maximum number of multi TBs to be used for multi-TB scheduling in the SC-MCCG payload and the number of TBs which are actually scheduled through enhanced DCI actually scheduling SC-MTCH may be indicated to a terminal.

In this case, Each SC-MTCH may be configured to include the maximum number of one common multi TB or the maximum number of independent multi TBs per SC-MTCH to prevent the number of fields of enhanced DCI from increasing.

In this case, scheduling flexibility is higher than when the maximum number of scheduling TBs is indicated by a SIB.

(Method 3): The number of actually-scheduling TBs may be informed to a terminal through enhanced DCI. In this case, as a size of a DCI field increases to include the number of scheduling TBs, the maximum number of multi TBs which may be scheduled may be limited.

When such a method is used, a base station may flexibly configure the number of scheduling TBs.

(Method 4): Scheduling information for multi-TB scheduling may be transmitted to a terminal by using an explicit field or a specific parameter in the SC-MCCH payload, not enhanced DCI. In this case, the number of TBs actually scheduling SC-MTCH may be indicated per SC-MTCH by using an explicit field.

In this case, the maximum number of scheduling multi TBs is pre-configured in a SIB or SC-MCCH or may be defined by standards. In addition, as a specific parameter value (e.g., G-RNTI) is configured as one of pre-promised values, the number of specific TBs which are actually scheduled may be implicitly indicated to a terminal.

For example, at least one specific value of G-RNTI may indicate the number of specific TBs. (e.g., FFF0 may indicate 1 TB, FFF1 may indicate 2 TB, FFF2 may indicate 3 TB and FFF3 may indicate 4 TB.)

When receiving G-RNTI corresponding to the number of scheduling TBs from a base station, a terminal may recognize the number of actually-scheduled TBs and may also recognize that multi TBs are scheduled, by a G-RNTI value.

Such a method may reduce a DCI size because it is unnecessary to add a field separately showing the number of scheduling TBs to an enhanced DCI field.

(2) Scheduling Delay (Method 1): An actual scheduling delay value may be transmitted to a terminal through enhanced DCI. In this case, for a scheduling delay value, only one value may be transmitted to a terminal and a transmitted scheduling delay value may be used as a scheduling delay value between all TBs (e.g., from the last subframe that a NPDSCH transmitting a precedent TB is transmitted to the first subframe that a NPDSCH transmitting a subsequent TB is transmitted).

In addition, for the flexible scheduling of a base station, as many scheduling delay values as the number of actually-scheduled TBs may be independently transmitted to a terminal.

In this case, a scheduling delay value may be configured based on a general subframe or may be configured based on a valid subframe.

When a scheduling delay value is independently transmitted, a base station may indicate a scheduling delay to a terminal in a fully dynamic way.

(Method 2): Enhanced DCI may include both an actual scheduling delay value for TB transmission and an offset value (a scheduling delay offset value) for each scheduling delay value. In this case, a delay may be determined by a scheduling delay value transmitted through DCI up to a NPDSCH transmitting a TB which is transmitted first, and from a NPDSCH transmitting the second TB, a starting subframe of a NPDSCH may be determined by using a value obtained by using both a scheduling delay and a scheduling delay offset.

For example, when a scheduling delay is referred to as x and a scheduling delay offset is referred to as p, a starting subframe of a NPDSCH scheduling a N-th TB may be represented as n+X+(N−1)*P.

In this case, n may indicate the last subframe that a NPDCCH scheduling SC-MTCH is transmitted or may indicate the last subframe that a NPDSCH transmitting SC-MTCH which is transmitted right before is transmitted.

Those values may be configured based on a general subframe or may be configured based on a valid subframe.

A method 2 may make the length of enhanced DCI short and indicate a flexible scheduling delay.

(Method 3): A scheduling delay value may be configured to be transmitted by using a specific parameter or through an explicit field of the SC-MCCH payload, without being transmitted through enhanced DCI.

In this case, configurable scheduling delay values may follow a legacy value and a scheduling delay value may be indicated per SC-MTCH by using a new value.

In addition, as a specific parameter value (e.g., G-RNTI) is configured as one of pre-promised values, a base station may implicitly indicate an actual scheduling delay of a NPDSCH to a terminal.

For example, at least one specific value of G-RNTI may indicate a specific scheduling delay. (e.g., FFF0 may indicate 12 SFs, FFF1 may indicate 14 SFs, FFF2 may indicate 16 SFs and FFF3 may indicate 20 SFs.)

When receiving G-RNTI corresponding to a scheduling delay value from a base station, a terminal may recognize an actual scheduling delay through a G-RNTI value.

Such a method may reduce a DCI size because it is unnecessary to add a field separately showing a scheduling delay to an enhanced DCI field.

Like LTE LAA, information such as MCS, resource allocation, etc. may be commonly used.

In addition, when there is retransmission, a method on downlink or uplink may be additionally considered.

Embodiment 4_A Method of Transmitting Scheduling Information of Multi TBs Through Enhanced DCI and Starting Transmission/Reception of a Subsequent TB when Retransmission is Completed When a delay may be endured due to a characteristic of NB-IoT, scheduling information related to multi-TB scheduling may be transmitted through one enhanced DCI and when every retransmission of a HARQ process corresponding to a precedent TB is completed, initial transmission/reception corresponding to a subsequent TB may start.

In this case, UE which is multi TB-scheduled through enhanced DCI for preventing ambiguity with a base station when a terminal performs the initial transmission/reception of a subsequent TB may receive an indication on a transmission/reception time for a subsequent TB (e.g., a scheduling delay), resource allocation, or MCS, etc. through the corresponding compact DCI or wake up signal by monitoring and decoding compact DCI or a wake up signal in a situation where transmission/reception related to one TB is ended.

In a method 4, a terminal may receive RRC signaling in advance to monitor enhanced DCI or a search space for enhanced DCI may be independently configured through a SIB.

Embodiment 5_Separate NPDSCH Configuration for Multi TBs

Figure 16:
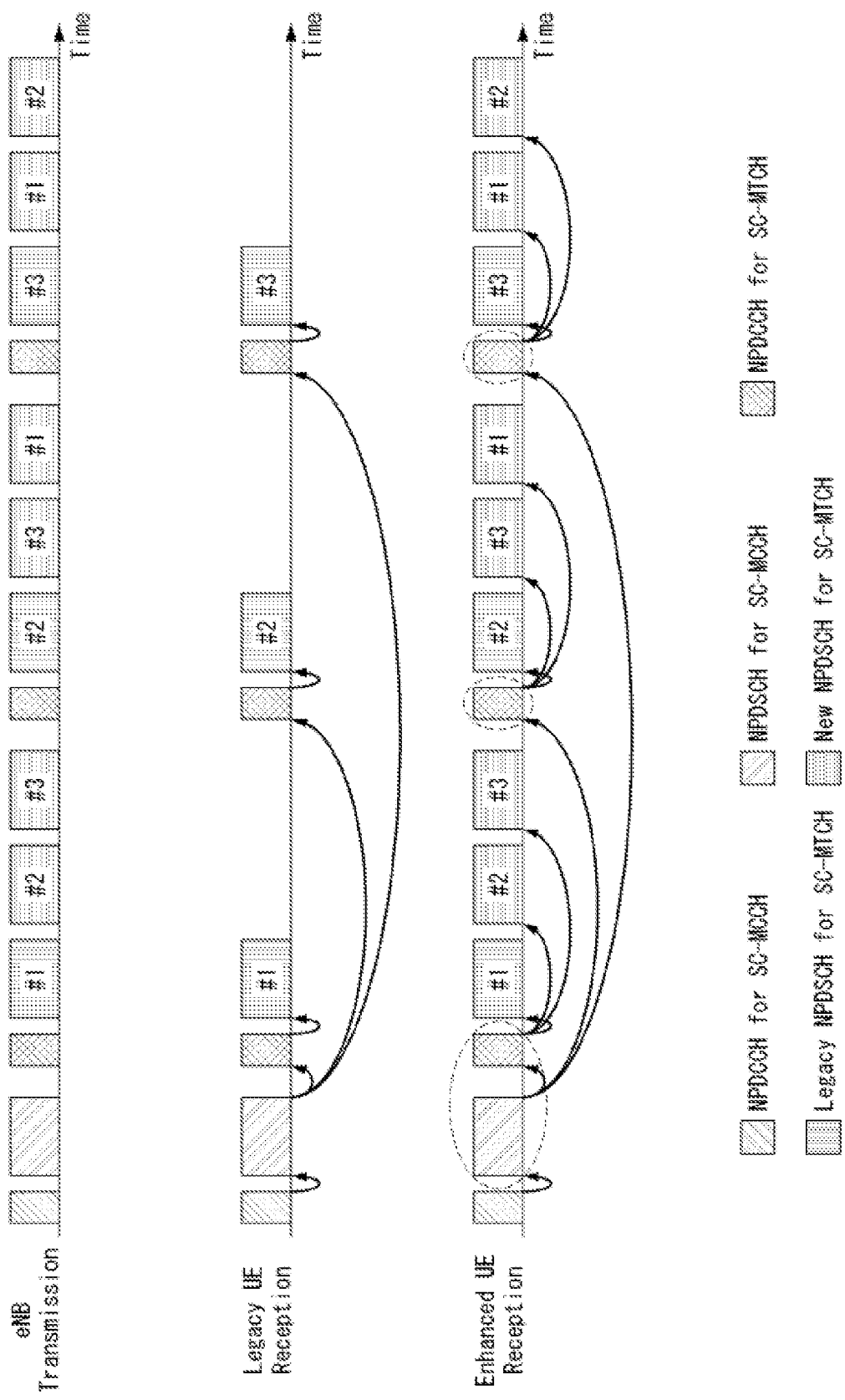
FIG. 16 is a diagram showing another example of multi-TB scheduling on a SC-MCCH (Single Cell Multicast Control Channel) suggested in the present disclosure.

FIG. 16 is a diagram showing another example of multi-TB scheduling on a SC-MCCH (Single Cell Multicast Control Channel) suggested in the present disclosure.

In reference to FIG. 16, at least one new NPDSCH for SC-MTCH may be generated in a legacy NPDSCH for SC-MTCH and an enhanced terminal may recognize a legacy NPDSCH and at least one new NPDSCH as multi TBs scheduling NPDSCH by using legacy DCI and the SC-MCCH payload without configuring enhanced DCI (e.g., DCI for multi-TB scheduling).

Concretely, contrary to a general legacy NPDSCH, when multi TBs are scheduled, a base station may transmit SC-MTCH to a terminal by generating at least one new NPDSCH for multi-TB scheduling except for a legacy NPDSCH.

As at least one new NPDSCH is a NPDSCH generated for multi-TB scheduling, a legacy terminal may not recognize and decode at least one new generated NPDSCH and only an enhanced terminal may recognize and decode at least one new generated NPDSCH.

In other words, only legacy DCI may be transmitted in a SC-MTCH NPDCCH search space and a new SC-MTCH NPDSCH (e.g., a new NPDSCH) for an enhanced terminal as well as a legacy SC-MTCH NPDSCH (e.g., a legacy NPDSCH) may be additionally configured and transmitted.

A base station may include scheduling information of a newly-configured SC-MTCH NPDSCH in the SC-MCCH payload and transmitted together so that an enhanced terminal can recognize with information included in the payload of DCI which is transmitted in a SC-MTCH NPDCCH search space.

In this case, indication information representing whether multi TBs are scheduled may be included in a NPDSCH for a SC-MCCH and transmitted.

A terminal may be configured to receive a legacy NPDSCH and a new NPDSCH and one or more new NPDSCH may be generated and transmitted.

In this case, according to a transmission time of a legacy NPDSCH and a new NPDSCH, scheduling information for multi-TB scheduling may be configured as follows.

First, when a new NPDSCH is transmitted at a later time than a legacy NPDSCH, a base station may transmit to a terminal a SF gap, a subframe interval from an ending time of a legacy SC-MTCH NPDSCH transmission to a starting time of a new SC-MTCH NPDSCH, and may additionally transmit RA, MCS, TBS difference, etc. of two NPSCHs to a terminal.

Second, when a new NPDSCH is transmitted at an earlier time than a legacy NPDSCH, a base station may transmit a scheduling delay value of a new SC-MTCH NPDSCH to a terminal and may additionally transmit RA, MCS, TBS difference, etc. between two NPSCHs to a terminal.

For the first case, as a new NPDSCH may be transmitted in a search space (e.g., type2A-CSS) for a legacy terminal, a legacy terminal may monitor CSS to find untransmitted DCI to increase power consumption.

Accordingly, a new NPDSCH may be transmitted at an earlier time than a legacy NPDSCH to reduce the power consumption of a legacy terminal.

Third, a transmission position of a new NPDSCH may be determined according to a value such as a specific parameter of a legacy NPDSCH (e.g., a scheduling delay, etc.) and a specific parameter of a new NPDSCH (e.g., RU, the number of repetitions, etc.).

In other words, when a scheduling delay enough to transmit a new NPDSCH is provided for a legacy NPDSCH, a new NPDSCH may be transmitted at an earlier time than a legacy NPDSCH.

Otherwise, a new NPDSCH may be transmitted at a later time than a legacy NPDSCH.

In other words, when a scheduling delay of a legacy NPDSCH is longer than a transmission time of a new NPDSCH, a collision is not generated although a new NPDSCH is transmitted at an earlier time than a legacy NPDSCH.

But, otherwise, a transmission time of a legacy NPDSCH returns even before a new NPDSCH is transmitted, so in this case, a legacy NPDSCH may be transmitted before a new NPDSCH.

When a scheduling delay of a legacy NPDSCH is not enough to transmit a new NPDSCH although a new NPDSCH is configured to be transmitted before a legacy NPDSCH by a base station through the SC-MCCH payload (e.g., by considering the number of SFs and a level of the number of repetitions), a new NPDSCH may be configured to be transmitted after the transmission of a legacy NPDSCH.

In this case, an enhanced terminal may recognize both a legacy SC-MTCH NPDSCH and a new SC-MTCH NPDSCH as multi-TB scheduled-NPDSCH and may receive both of them.

Because there is no need to define a separate carrier or a separate search space for one service, a base station may not transmit the same service information to a different place twice and may transmit scheduling information through the existing DCI.

But, because a new SC-MTCH NPDSCH should be additionally transmitted before or after a legacy SC-MTCH NPDSCH, a reception delay of legacy terminals may increase.

For example, as shown in FIG. 16, two new NPDSCHs are added after a legacy NPDSCH and a legacy NPDSCH may be transmitted by dividing the entire SC-MTCH information into three.

In other words, a legacy terminal may receive the entire SC-MTCH information only when receiving every legacy DCI and each legacy NPDSCH. But, an enhanced terminal may receive the entire SC-MTCH information by receiving new NPDSCHs transmitted after a legacy NPDSCH.

In other words, power consumption may be reduced when there are more benefits in a delay compared with a legacy terminal and there is no need to receive NPDSCHs subsequently because decoding is successfully completed. On the other hand, when decoding is not successfully completed, legacy DCI transmitted subsequently may be received one more time and after that, a legacy NPDSCH and a new NPDSCH may be received.

Embodiment 5-1

Figure 17:
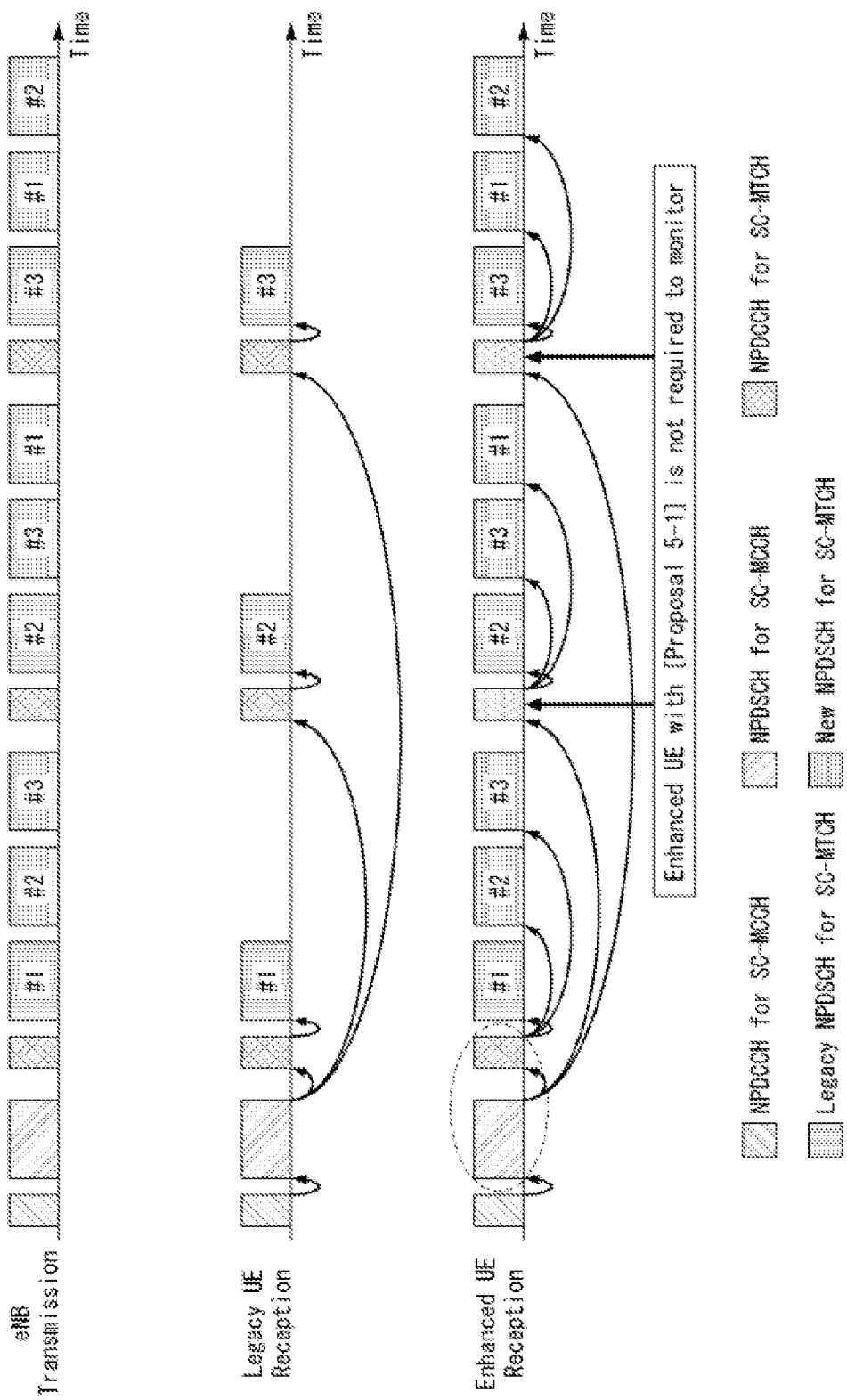
FIG. 17 is a diagram showing another example of multi-TB scheduling on a SC-MCCH (Single Cell Multicast Control Channel) suggested in the present disclosure.

FIG. 17 is a diagram showing another example of multi-TB scheduling on a SC-MCCH (Single Cell Multicast Control Channel) suggested in the present disclosure.

In reference to FIG. 17, unlike FIG. 16, after monitoring DCI for the scheduling of a legacy NPDSCH and a new NPDCH in a search space, a terminal may subsequently receive a legacy NPDSCH and a new NPDSCH without separate DCI search.

Concretely, a method described in FIG. 14 or FIG. 15 may be applied to an embodiment 5 described in FIG. 15.

In other words, an embodiment 5 is a method of recognizing a legacy NPDSCH and at least one new NPDSCH as multi TBs by using the SC-MCCH payload and one legacy DCI. In addition, a plurality of legacy NPDSCHs and a plurality of new NPDSCHs may be recognized as multi TBs by using the SC-MCCH payload and one legacy DCI as described in FIG. 14 or FIG. 15.

In other words, a base station includes indication information related to whether multi TBs are scheduled in a NPDSCH for SC-MCCH and transmits it, and includes scheduling information for multi-TB scheduling in the DCI of a NPDCCH for CS-MTCH and transmits it.

In this case, scheduling information may include the same information as described above.

After that, a base station may transmit at least one new NPDSCH and a legacy NPDSCH scheduled through DCI to a terminal and may repeatedly perform such an operation periodically.

For example, as shown in FIG. 17, a base station may transmit one legacy NPDSCH and two new NPDSCHs to a terminal after transmitting DCI for scheduling a legacy NPDSCH and a new NPDSCH to a terminal through a NPDCCH for SC-MTCH.

After that, a base station may repeatedly transmit one legacy NPDSCH and two new NPDSCHs to a terminal after re-transmitting DCI for scheduling a legacy NPDSCH and a new NPDSCH to a terminal through a NPDCCH for SC-MTCH until all scheduled multi TBs are transmitted.

In this case, DCI included in a NPDCCH for SC-MTCH transmitted from a base station may include the same or similar scheduling information. In other words, a repeatedly transmitted NPDSCH may be scheduled by one DCI.

In this case, when receiving DCI for scheduling a legacy NPDSCH and a new NPDSCH after recognizing whether multi TBs are scheduled through a NPDSCH for SC-MCCH, a terminal may receive a plurality of legacy NPDSCHs and a plurality of new NPDSCHs without receiving (or by skipping) DCI transmitted subsequently.

When such a method is used, the power consumption of an enhanced terminal may be reduced because a search space which should be monitored by an enhanced terminal decreases.

For example, as shown in FIG. 17, an enhanced terminal may receive DCI (the first DCI) for scheduling a NPDSCH for SC-MCCH through a NPDCCH for SC-MCCH. After that, a terminal may receive a NPDSCH for SC-MCCH based on the first DCI and recognize whether multi TBs are scheduled through indication information included in a NPDSCH when a method described in FIG. 14 is used.

But, when a method described in FIG. 15 is used, indication information is not included in a NPDSCH.

After that, an enhanced terminal may receive DCI (the second DCI) for scheduling a legacy NPDSCH and a new NPDSCH for SC-MCCH through a NPDCCH for SC-MCCH.

In this case, the second DCI may include scheduling information for scheduling a legacy NPDSCH and a new NPDSCH for SC-MCCH.

Because an enhanced terminal knows all information on new NPDSCHs and legacy NPDSCHs which will exist subsequently through the second DCI, it may immediately receive a subsequent NPDSCH and new NPDSCHs without receiving legacy DCI transmitted subsequently.

In this case, when a method described in FIG. 15 is used, indication information representing whether multi TBs are scheduled may be included in a legacy NPDSCH for SC-MTCH which is transmitted first and an enhanced terminal may recognize whether multi TBs are scheduled.

When such a method is used, the power consumption of a terminal may be reduced because a terminal does not need to monitor DCI in a specific search space.

In an embodiment 5 and an embodiment 5-1 described in FIG. 16 and FIG. 17, #1, #2, #3 NPDSCHs may include the same information regardless of a transmission position. But, this suggestion is not always limited to a method of repeatedly transmitting the same information and is not also limited to cycling.

As such, information and a relation between a legacy NPDSCH and new NPDSCHs may be indicated by the SC-MCCH payload. Furthermore, a structure that new NPDSCHs are not connected with a legacy NPDSDCH may be considered.

For example, when a legacy NPDSCH is #1, #2 and #3, respectively in FIG. 16 and FIG. 17, new NPDSCHs may be a NPDSCH with different information such as #4~#9.

Such a method may be used when information represented in less bits of the same information (e.g., low-definition broadcasting) is transmitted to a legacy NPDSCH and information represented in more bits of the same information (e.g., high-definition broadcasting) is transmitted to an enhanced NPDSCH.

Embodiment 6_A Method that a New NPDSCH is Independently Configured

A new NPDSCH for SC-MTCH exists independently from a legacy NPDSCH for SC-MTCH, and an enhanced terminal may recognize multi-TB scheduling NPDSCH by using legacy DCI and the SC-MCCH payload without enhanced DCI (e.g., DCI for multi-TB scheduling)

Concretely, in a SC-MTCH NPDCCH search space, only legacy DCI may be transmitted and a NPDSCH of new SC-MTCH for an enhanced terminal may be independently configured regardless of legacy SC-MTCH NPDSCH unlike an embodiment 5.

A base station may additionally include the scheduling information of a new SC-MTCH NPDSCH in the SC-MCCH payload and transmit it so that an enhanced terminal can decode and recognize it with information included in the payload of legacy DCI which will be transmitted to a SC-MTCH NPDCCH search space.

Additionally, a base station may indicate whether a legacy SC-MTCH NPDSCH is included in multi-TB scheduling NPDSCH by a specific method (e.g., a specific field of legacy DCI scheduling the SC-MCCH payload or a SC-MTCH NPDSCH or a reserved state, etc.)

When a legacy SC-MTCH NPDSCH is included in multi-TB scheduling NPDSCH, an enhanced terminal may recognize a legacy SC-MTCH NPDSCH and a new SC-MTCH NPDSCH as multi-TB scheduling NPDSCH and receive them as in an embodiment 5.

When a legacy SC-MTCH NPDSCH is included in multi-TB scheduling NPDSCH, a transmission time of a legacy NPDSCH and a new NPDSCH may be configured according to a specific rule as in an embodiment 5.

An embodiment 6 does not need to define a separate carrier or a separate search space for one service and does not need enhanced DCI. But, a base station needs to transmit the same service information more than once (e.g., what is for a legacy terminal and what is for an enhanced terminal should be transmitted, respectively)

In addition, a new SC-MTCH NPDSCH should be additionally transmitted before or after a legacy SC-MTCH NPDSCH.

Embodiment 7_A Method of Transmitting Separate Enhanced DCI for an Enhanced NPDSCH A legacy NPDSCH for SC-MTCH and a new NPDSCH for SC-MTCH exist and an enhanced terminal may recognize multi-TB scheduling NPDSCH by using legacy DCI, an enhanced DCI (e.g., DCI for multi-TB scheduling) and the SC-MCCH payload.

Concretely, an enhanced DCI for multi-TB scheduling as well as legacy DCI may be transmitted in a SC-MTCH NPDCCH search space. In this case, as scheduling information related to multi-TB scheduling which is not transmitted through legacy DCI may be included in enhanced DCI, the payload size of enhanced DCI may be smaller than or the same as that of legacy DCI.

In addition, a new SC-MTCH NPDSCH for an enhanced terminal may be configured in a legacy SC-MTCH NPDSCH and a base station may additionally transmit the scheduling information of a new SC-MTCH NPDSCH to the SC-MCCH payload and the payload of enhanced DCI so that an enhanced terminal can be decoded and recognized with information included in the payload of legacy DCI to be transmitted to a SC-MTCH NPDCCH search space.

In the SC-MCCH payload, a G-RNTI value for enhanced DCI may be additionally indicated with a G-RNTI value for legacy DCI on a specific service and only when a G-RNTI value for enhanced DCI is configured, an enhanced terminal may be configured to monitor enhanced DCI.

In this case, an enhanced terminal may receive legacy DCI and enhanced DCI by simultaneously monitoring them in the same search space and when a G-RNTI value for enhanced DCI is not configured, an enhanced terminal may also receive legacy DCI and perform a single TB scheduling operation by considering that a base station does not perform multi-TB scheduling.

Figure 21:
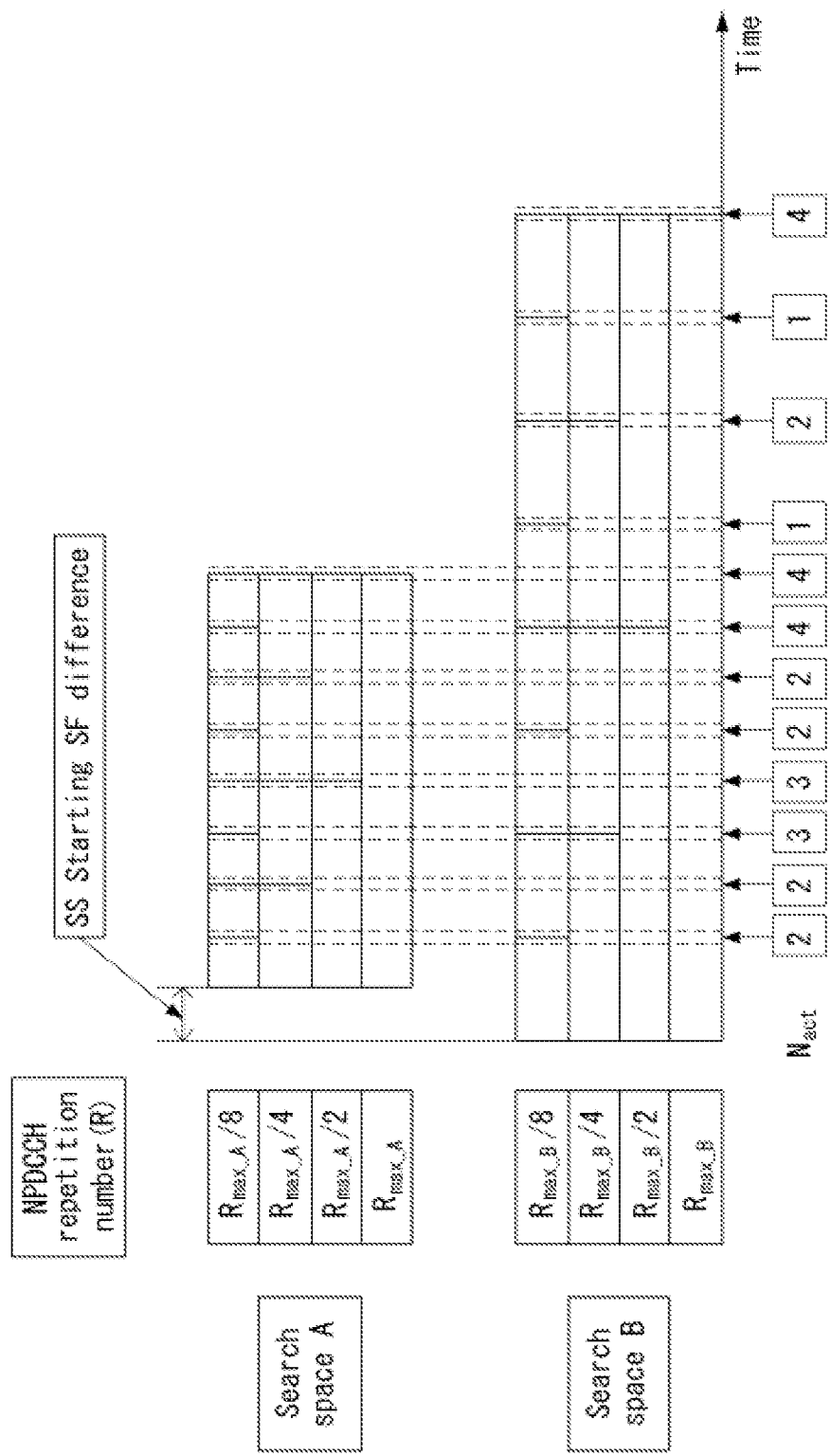
FIG. 21 is a diagram showing an example of a method configuring a search space for multi-TB scheduling to which a method suggested in the present disclosure may be applied.

In this case, a method of individually configuring a search space for multi-TB scheduling and a search space for single TB scheduling described in FIG. 21 may be applied.

Alternatively, a base station may explicitly indicate whether enhanced DCI is transmitted per service (e.g., indication information related to whether multi-TB scheduling is supported) and an enhanced terminal may receive both information transmitted to legacy DCI and information transmitted to enhanced DCI to know complete multi-TB scheduling information.

When legacy DCI is not detected, an enhanced terminal may determine that any DCI is not detected in the corresponding search space regardless of whether enhanced DCI is detected and when both legacy DCI and enhanced DCI are detected, an enhanced terminal may receive multi TBs scheduled NPDSCH by using information included in two DCI.

Unlike the method, an enhanced terminal does not always monitor two DCI and may start to monitor enhanced DCI when legacy DCI is detected while monitoring only legacy DCI.

In this case, enhanced DCI may be applied as the above-described compact DCI or WUS like signal and when a new search space where compact DCI is transmitted is additionally generated, only an enhanced terminal may monitor the corresponding search space to receive multi-TB scheduling information.

In this case, information related to a search space where compact DCI is transmitted may be transmitted through the SC-MCCG payload and as described in an embodiment 5, a transmission time of a legacy NPDSCH and a new NPDSCH may be configured according to a specific rule.

When a method of an embodiment 7 is used, there is no need to define a separate carrier for one service, so a base station may not transmit the same service information to a different place twice.

But, for flexibly transmitting multi scheduling information, enhanced DCI (or an WUS like signal, etc.) should be configured and a new SC-MTCH NPDSCH should be additionally transmitted before or after a legacy SC-MTCH NPDSCH.

Embodiment 8_A Method of Independently Configuring a New NPDSCH and Configuring Enhanced DCI for a New NPDSCH A new NPDSCH for SC-MTCH exists independently from a legacy NPDSCH for SC-MTCH and an enhanced terminal may recognize multi-TB scheduling NPDSCH by using enhanced DCI (e.g., DCI for multi-TB scheduling) and the SC-MCCH payload as well as legacy DCI.

Concretely, enhanced DCI for multi-TB scheduling as well as legacy DCI may be transmitted in a SC-MTCH NPDCCH search space. In this case, enhanced DCI may include scheduling information related to multi-TB scheduling which is not transmitted to legacy DCI (e.g., a scheduling delay between multi NPDSCHs, the number of TBs, a MCS index for multi TBs, etc.)

Accordingly, the payload size of enhanced DCI may be smaller than or the same as that of legacy DCI. In addition, a new SC-MTCH NPDSCH for an enhanced terminal may be independently configured regardless of a legacy SC-MTCH NPDSCH.

A base station may additionally transmit the scheduling information of a new SC-MTCH NPDSCH to the SC-MCCH payload and the enhanced DCI payload so that an enhanced terminal can decode and recognize it with information included in the payload of legacy DCI to be transmitted in a SC-MTCH NPDCCH search space.

There is a difference from an embodiment 7 in that a base station may independently configure a legacy SC-MTCH NPDSCH and an enhanced SC-MTCH NPDSCH.

Additionally, a base station may indicate whether a legacy SC-MTCH NPDSCH is included in multi-TB scheduling NPDSCH through a specific method (e.g., a specific field of legacy (or enhanced) DCI scheduling the SC-MCCH payload or a SC-MTCH NPDSCH or a reserved state)

When a legacy SC-MTCH NPDSCH is included in multi-TB scheduling NPDSCH, an enhanced terminal may recognize a legacy SC-MTCH NPDSCH and a new SC-MTCH NPDSCH as multi-TB scheduling NPDSCH and receive them as described in an embodiment 7.

When a legacy SC-MTCH NPDSCH is included in multi-TB scheduling NPDSCH, a transmission time of a legacy NPDSCH and a new NPDSCH may be configured according to a specific rule as described in an embodiment 5.

As such a method does not need to define a separate carrier for one service, a base station does not need to transmit the same service information to a different place twice. But, enhanced DCI (or an WUS like signal, etc.) for flexibly transmitting multi scheduling information may be necessary.

In addition, a new SC-MTCH NPDSCH should be additionally transmitted before or after a legacy SC-MTCH NPDSCH.

As another embodiment of the present disclosure, the following collision handling may be additionally applied to embodiments 5 to 8. In other words, when a collision between a SC-MTCH NPDCCH search space and a new NPDSCH is generated (e.g., all or part, including a processing time), a priority for which operation a terminal will perform first should be determined.

First, when a base station configures a new NPDSCH to collide with a SC-MTCH NPDCCH search space, a terminal may monitor a SC-MTCH NPDCCH search space by considering that it is impossible to transmit a new NPDSCH.

In other words, monitoring a SC-MTCH NPDCCH search space may have a higher priority over receiving a new NPDSCH.

In this case, a SC-MTCH NPDCCH search space may be always monitored and the flexible scheduling of a SC-MTCH NPDSCH performed by a base station may not be missed.

Second, when a base station configures a new NPDSCH to collide with a SC-MTCH NPDCCH search space, a terminal may receive a new NPDSCH without monitoring a SC-MTCH NPDCCH search space.

In other words, receiving a new NPDSCH may have a higher priority over monitoring a SC-MTCH NPDCCH search space.

In this case, it may be desirable that an enhanced terminal receives a new NPDSCH because when a base station indicates multi-TB scheduling to an enhanced terminal, a terminal may determine that it is to transmit a new NPDSCH. On the other hand, as a terminal which does not know information that the corresponding new NPDSCH is transmitted may not detect DCI although it monitors a search space, it should monitor a subsequent search space.

Embodiment 9_A Method for Re-Searching DCI when Searching DCI is Missed

Figure 18:
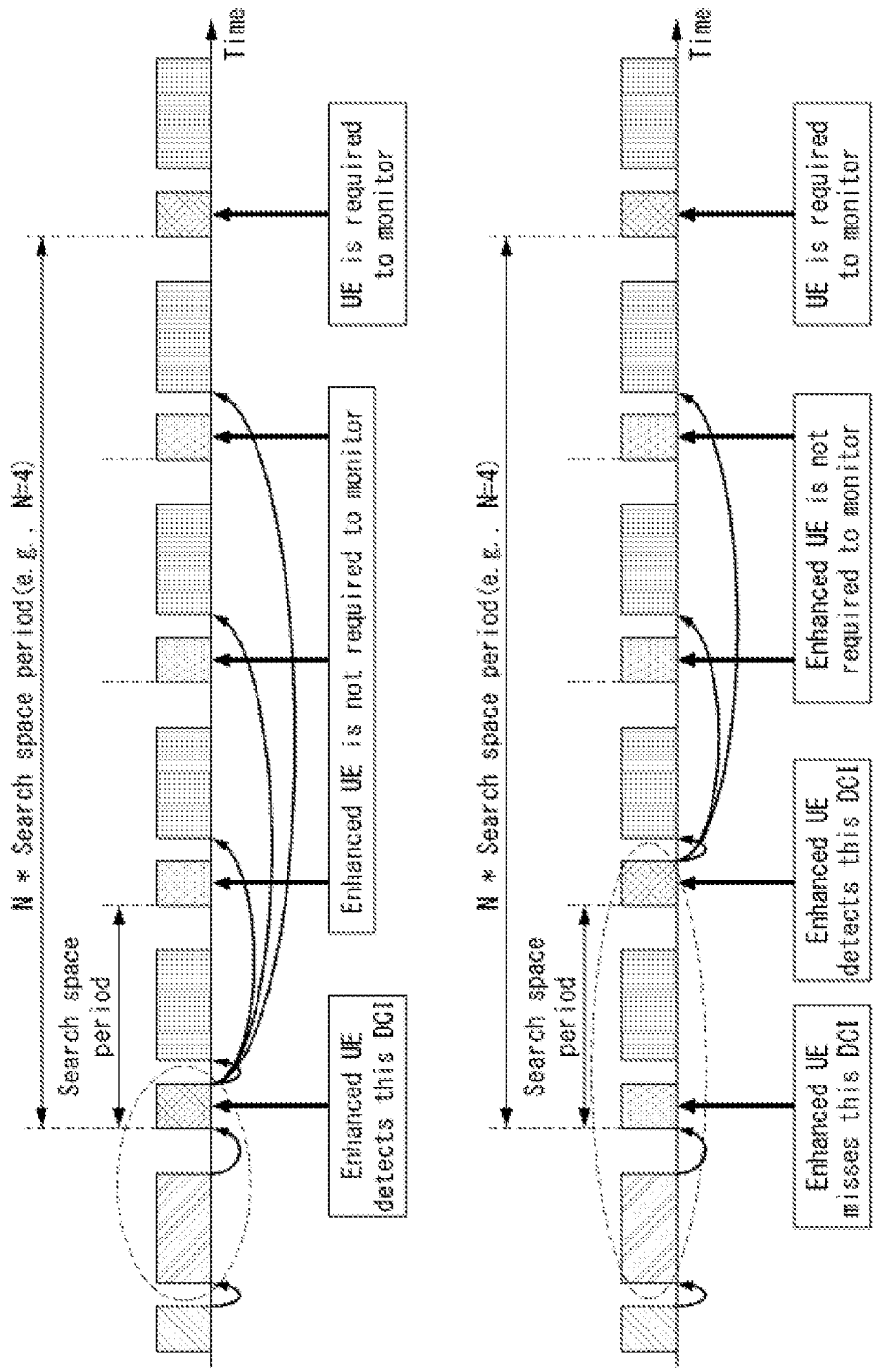
FIG. 18 is a diagram showing another example of multi-TB scheduling on a SC-MCCH (Single Cell Multicast Control Channel) suggested in the present disclosure.

FIG. 18 is a diagram showing another example of multi-TB scheduling on a SC-MCCH (Single Cell Multicast Control Channel) suggested in the present disclosure.

For a method described in embodiments 1 to 8, a terminal may not perform reception by missing DCI for scheduling a NPDSCH for multi-TB transmission in embodiments in which an enhanced terminal may know that NPDSCHs transmitted subsequently through the SC-MCCH payload or the SC-MTCH payload and legacy DCI (e.g., DCI for scheduling SC-MTCH) are multi-TB scheduling.

In this case, as shown in FIG. 18, a terminal may receive again DCI transmitted in a search space after missed DCI to recognize scheduling information for multi-TB scheduling. In this case, period information (or number information) representing the number of NPDSCHs for SC-MTCH which may be received by a terminal without DCI monitoring after receiving DCI once may be included in DCI and transmitted to a terminal.

For example, when period information is configured by a value obtained by multiplying a search space period by the number of NPDSCHs which may be received after receiving the first DCI as shown in FIG. 18, a terminal may re-search DCI for TB scheduling in a search space after a time indicated by period information.

In this case, when a terminal does not perform search by missing the first DCI as shown in FIG. 18(b), a terminal may monitor and receive DCI in a subsequent search space and may receive a NPDSCH for multi TB transmission even without searching DCI until a time indicated by period information.

Concretely, an enhanced terminal may be determined to skip legacy DCI which is transmitted subsequently through the SC-MCCH payload or SC-MTCH payload and legacy DCI.

In this case, a terminal may be configured to necessarily monitor legacy DCI at every period of multi-TB scheduling refresh, period information configured by a base station.

When it is assumed that a period of a search space where the corresponding legacy DCI may be transmitted is T, a terminal should necessarily monitor legacy DCI in a search space which exists every T*N times.

In this case, when a search space which exists first based on 'a specific time' is represented as the first search space, legacy DCI may be configured to be always monitored in the N*n+1-th (n=0, 1, 2, . . . ) search space.

In this case, 'a specific time' may be SFN or HSFN or may be a modification period or a period of a search space where DCI scheduling SC-MCCH is transmitted. When legacy DCI is missed in the corresponding search space, a terminal may monitor legacy DCI at a position of a subsequent search space.

In this method, after searching legacy DCI in a specific search space, a terminal may implicitly know how many multi TBs will be scheduled and a terminal may know in advance where the last NPDSCH ends.

After that, a terminal may be configured to monitor legacy DCI again from a subsequent search space.

As shown in FIG. 18, when a base station configures N as 4, an enhanced terminal should always monitor legacy DCI in a 4n+1-th (n=0, 1, 2, search space after receiving SC-MCCH.

The FIG. 18(a) shows a case in which an enhanced terminal succeeds in searching DCI which is positioned first after receiving SC-MCCH. Accordingly, an enhanced terminal may not receive legacy DCI for a total of 3 times after searching the corresponding legacy DCI.

The 18(b) shows a case in which an enhanced terminal misses the first legacy DCI and fails to receive it after receiving SC-MCCH. Due to a failure in receiving DCI, an enhanced terminal monitors legacy DCI again in a subsequent search space and in this case, when succeeding in searching the corresponding DCI, a terminal may subsequently receive a NPDSCH even without receiving legacy DCI for a total of 2 times.

Additionally, an embodiment 9 may be configured by a base station by N-times of a search space period of a legacy DCI, but may be applied to a situation in which a base station indicates SFN or HSFN as a reference or a specific timing window and may be also applied to situation indicated in a scheme related to a period of a search space where DCI scheduling SC-MCCH is transmitted.

A case in which a method of an embodiment 9 is defined based on an absolute time such as SFN or HSFN may be as follows.

A base station may configure a terminal to monitor a search space all the time where legacy DCI which exists after a radio frame greater than or the same as specific SFN may be transmitted and may configure a terminal to skip search spaces after legacy DCI is decoded.

In this case, specific SFN may be given by a combination of a pre-promised equation such as SFN mode k=0 (e.g., for k=64, SNF=0, 64, 128, 192, . . . ) and a number configured by a base station or a base station may directly configure a specific SFN set to a terminal.

Alternatively, it is possible to skip the monitoring of other search spaces in the corresponding timing window when legacy DCI is successfully decoded just once while monitoring a search space in the time order during a 'specific timing window'

A 'specific timing window' may be represented as SFN or HSFN based on an absolute time or may be represented by a multiple of a period of a search space where the corresponding legacy DCI may be searched.

For example, a base station may indicate k SFNs as a 'specific timing window' by starting from SFN 0 and when a base station indicates K as 64, each timing window from SFN 0 to SFN 63, from SFN 64 to SFN 127, etc. may be configured as in the above-suggested example and the same operation as mentioned above may be performed.

Additionally, an operation for skipping DCI may be off according to the following rule after a DCI skip is applied to a terminal.

First, a base station may explicitly give an indication for OFF of an operation for skipping DCI to a terminal by adding a separate indicator (e.g., a DCI skipping off indicator) for OFF of an operation for skipping DCI to the SC-MTCH payload.

In addition, an operation for skipping DCI may be configured to be off when a NPDSCH transmitting SC-MTCH has a specific resource shape (e.g., when the number of repetitions of a NPDSCH is greater than or smaller than a threshold value which is designated by a base station or is pre-promised).

Alternatively, when a period of a search space that DCI scheduling SC-MTCH detected by SC-MCCH may be searched is greater than a threshold value which is configured by a base station or is pre-promised, an operation for skipping DCI may be configured to be turned off.

In this case, when an operation for skipping DCI is turned off, it may mean that a terminal should monitor a search space where legacy DCI (e.g., DCI scheduling SC-MTCH) may be transmitted.

In addition, among the above embodiments, in a method in which an enhanced terminal may know that NPDSCHs transmitted subsequently through the SC-MCCH payload or the SC-MTCH payload and legacy DCI (e.g., DCI scheduling SC-MTCH) are multi-TB scheduling, a base station may inform a terminal of the minimum number of times (e.g., RMIN) that a NPDSCH (e.g., a NPDSCDH transmitting SC-MTCH) scheduled by multi TBs will be repeatedly transmitted through the SC-MCCH payload or the SC-MTCH payload.

In this case, a base station may variably configure the number of repetitions of NPDSCHs every time by using legacy DCI, but an enhanced terminal may skip the corresponding legacy DCI, so the actual number of repetitions of NPDSCHs may be received based on a value known by DCI which is searched first.

But, when the number of repetitions known by DCI which is searched first is a very great value and other NPDSCHs are repeatedly transmitted at a smaller value than the corresponding number of repetitions, an enhanced terminal recognizes that a NPDSCH is transmitted in a region which is not transmitted by a base station and decodes unnecessary values at an invalid position.

Accordingly, when a base station informs a terminal of the defined RMIN in advance, a terminal may know the minimum number of repeat transmissions of NPDSCHs that multi TBs are scheduled.

Accordingly, a terminal may be configured to receive and decode as many NPDSCHs as the corresponding RMINs and in this case, when the number of repetitions of NPDSCHs included in legacy DCI which is additionally searched is greater than RMIN, the corresponding number of repetitions may be determined to be applied to only a NPDSCH scheduled by the corresponding DCI and may be configured not to be applied as the number of repetitions of other NPDSCHs.

Additionally, in a method in which an enhanced terminal may know that NPDSCHs transmitted subsequently are multi-TB scheduling through the SC-MCCH payload or the SC-MTCH payload and legacy DCI (e.g., DCI scheduling SC-MTCH), a base station may inform a terminal of the number of repetitions which is not used or which may be used by legacy DCI (e.g., DCI scheduling SC-MTCH) through the SC-MCCH payload or the SC-MTCH payload.

In this case, when enhanced terminals monitor a search space where legacy DCI is transmitted, the number of NPDCCH candidates which should perform blind decoding may be reduced.

For example, when the RMAX of the corresponding search space transmitted through a SIB is 16, a terminal should detect DCI by performing blind decoding for a total of 15 NPDCCH candidates composed of 1 NPDCCH candidate corresponding to the number of repetitions 16, 2 NPDCCH candidates corresponding to the number of repetitions 8, 4 NPDCCH candidates corresponding to the number of repetitions 4 and 8 NPDCCH candidates corresponding to the number of repetitions 2 in the corresponding search space.

In this situation, when a base station informs a terminal through the SC-MCCH Payload or the SC-MTCH payload that RMAX/8 (e.g., 16/8=2) among the number of repetitions of the corresponding NPDCCH is not used, an enhanced terminal just needs to perform blind decoding only for 7 NPDCCH candidates excluding 8 of the existing 15 NPDCCH candidates, so power consumption of a terminal may be reduced and advantages may be obtained in terms of buffer management.

When it is informed through the SC-MCCH Payload or the SC-MTCH payload that only RMAX/2 (e.g., 16/2=8) among the number of repetitions of the corresponding NPDCCH is used, an enhanced terminal just needs to perform blind decoding only for 2 NPDCCH candidates with the number of repetitions 8 among the existing 15 NPDCCH candidates.

In addition, when a base station informs an enhanced UE that DCI skipping is allowed that each legacy DCI scheduling NPDSCHs bound by multi-TB scheduling is the same, a terminal may search legacy DCI as if it searches a known signal without performing blind decoding for DCI in a subsequent search space through the corresponding information. In this case, a battery life of a terminal may increase.

Multi-TB Scheduling of NB-IoT on Two HARQ Processes

Hereinafter, a method of scheduling multi TBs when two HARQ processes are supported will be described. For two HARQ processes, they will be described by being divided into two cases because multi-TB scheduling allocates only a grant in the same direction (e.g., uplink or downlink) and allocates with a grant in a different direction.

First, an operation of a terminal and a base station related to two HARQ processes will be described.

Figure 19:
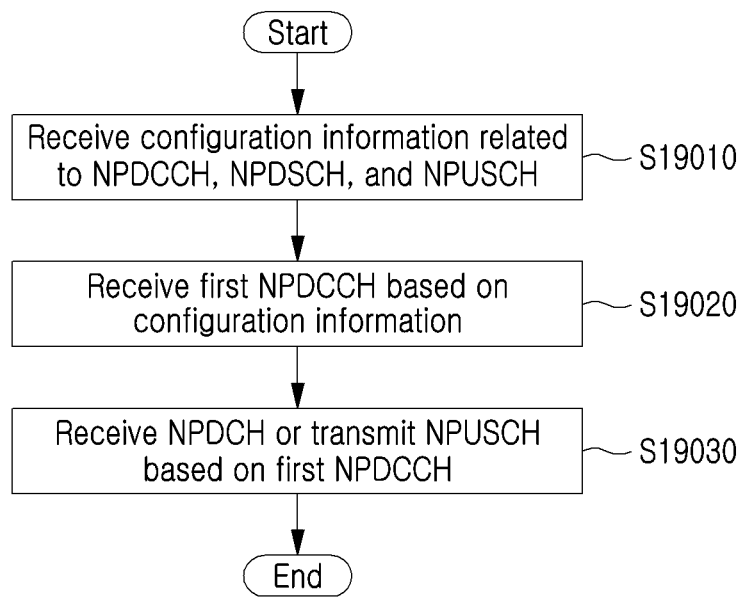
FIG. 19 is a flow chart showing an example of a terminal operation related to unicast to which a method suggested in the present disclosure may be applied.

FIG. 19 is a flow chart showing an example of a terminal operation related to unicast to which a method suggested in the present disclosure may be applied.

First, a terminal may receive configuration information related to the procedure of a NPDCCH, a NPDSCH and/or a NPUSCH from a base station through higher layer signaling, etc. S19010. In this case, a step S19010 may be omitted when a configuration related to the procedure of a NPDCCH, a NPDSCH and/or a NPUSCH is pre-defined (e.g., fix).

A terminal may receive (or monitor) the first NPDCCH in a search space configured based on configuration information. In this case, a terminal may receive a DL grant scheduling a NPDSCH or an UL grant scheduling a NPUSCH from a base station through the corresponding first NPDCCH S19020.

A terminal may receive a NPDSCH or transmit a NPUSCH according to information indicated by a DL grant or an UL grant allocated by a base station S19030.

Figure 20:
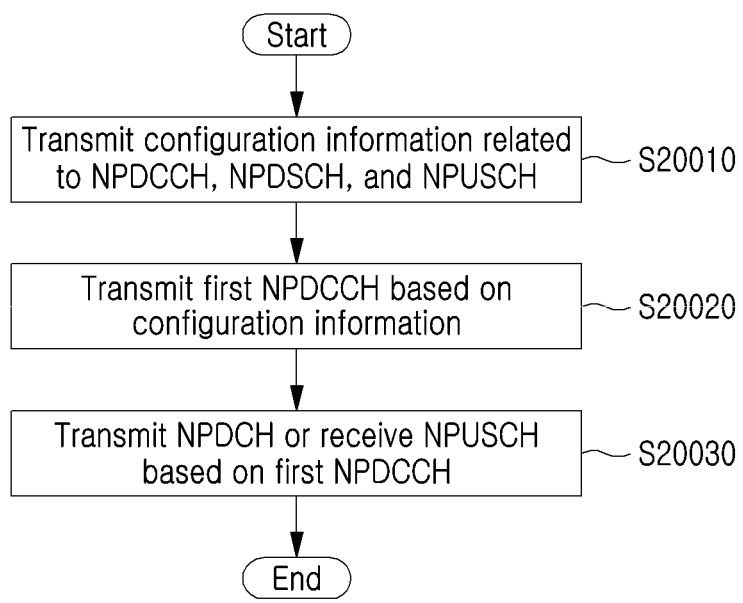
FIG. 20 is a flow chart showing an example of a base station operation related to unicast to which a method suggested by the present disclosure may be applied.

FIG. 20 is a flow chart showing an example of a base station operation related to unicast to which a method suggested by the present disclosure may be applied.

First, a base station may transmit configuration information related to the procedure of a NPDCCH, a NPDSCH and/or a NPUSCH to a terminal through higher layer signaling, etc. S20010. In this case, a step S20010 may be omitted when a configuration related to the procedure of a NPDCCH, a NPDSCH and/or a NPUSCH is pre-defined (e.g., fix).

A base station may transmit the first NPDCCH in a search space configured based on configuration information. In this case, a base station may transmit a DL grant scheduling a NPDSCH or an UL grant scheduling a NPUSCH to a terminal through the corresponding first NPDCCH S20020.

A base station may transmit a NPDSCH or receive a NPUSCH according to information indicated by a DL grant or an UL grant S20030.

In reference to the same procedures described in the above-mentioned FIG. 19 and FIG. 20, multi-TB scheduling suggested in the present disclosure may be used for or applied to transmission/reception of a NPDSCH/NPUSCH.

Hereinafter, multi TBs scheduling method on the following two cases will be described.

Case 1: NPDSCHs, NPUSCHs
Case 2: NPDSCH+NPUSCH, NPUSCH+NPDSCH

Embodiment 10_for Case 1, Multi-TB Scheduling Method

First, a method of scheduling multi TBs transmitting data in the same direction will be described. First, a HARQ process number, resource allocation, MCS, a scheduling delay, etc., may be configured to share a common value between NPDSCHs (or NPUSCHs) scheduling multi TBs.

In addition, the following parameters may be flexibly configured for effective multi-TB scheduling.

(1) Maximum Number of Scheduling TB

The maximum number of scheduling TBs considering two HARQ processes may be 2. When it becomes 2, a terminal already knows that multi TBs (e.g., 2 TBs) is transmitted through enhanced DCI, so it is unnecessary to separately inform information through DCI.

But, a case in which the maximum number of scheduling TBs is equal to or greater than 3 (e.g., a case in which a terminal receives three or more NPSCHs based on enhanced DCI) may be considered. For example, when the maximum number of scheduling TBs is T (T is a positive integer greater than 2), a base station and a terminal may perform a HARQ process through a HARQ process number that the first NPDSCH and the second NPDSCH are indicated by DCI.

The third NPDSCH may be received through a HARQ process number used by the first NPDSCH after a scheduling delay (or, a scheduling delay which is pre-promised by RRC or SIB) indicated through DCI from a time when all HARQ processes of the first NPDSCH end.

The fourth NPDSCH may be also received through a HARQ process number used by the second NPDSCH after a scheduling delay (or, a scheduling delay which is pre-promised by RRC or SIB) indicated through DCI from a time when all HARQ processes of the second NPDSCH end.

For such a method, as the HARQ process number of every odd-numbered NPDSCH is the same and the HARQ process number of every even-numbered NPDSCH is the same, data may be transmitted and received without timing ambiguity between a terminal and a base station.

Unlike the above method, the HARQ process number of the third NPDSCH may be transmitted by using a HARQ process number whose HARQ process ends earlier, the first NPDSCH or the second NPDSCH.

When this method is used, resource utilization is improved to increase a system data rate.

(2) MCS

When two or more TBs are scheduled through enhanced DCI, it is desirable that at least a target MCL of the corresponding multi TBs is the same or similar, so multi TBs may have a similar code rate and repetition level.

Accordingly, as one MCS value and $N_{SF}$ (e.g., the number of subframes necessary for TB in Repetition=1) are indicated by enhanced DCI, the first TB may be interpreted as an indicated value and as only $N_{SF}$ is indicated from the second TB, MCS may be selected to have the same value as a code rate made by $N_{SF}$ and MCS used for a precedent TB.

Alternatively, as only a MCS value is indicated from the second TB, $N_{SF}$ may be selected to have the same value as a code rate made by $N_{SF}$ and MCS used for a precedent TB.

When configured as above, MCS and $N_{SF}$ are just indicated once for the first TB and from a subsequent TB, only MCS or NSF is just indicated.

(3) Scheduling Delay

When two or more TBs are scheduled by enhanced DCI, a method of indicating a scheduling delay with enhanced DCI may be largely divided into the following methods.

(Method 1): A base station may transmit an actual scheduling delay value to a terminal through enhanced DCI. In this case, a scheduling delay value may transmit only one value to a terminal and a transmitted scheduling delay value may be used as a scheduling delay between all TBs (e.g., an interval from the last subframe that a NPDSCH transmitting a precedent TB is transmitted to the first subframe that a NPDSCH transmitting a subsequent TB is transmitted).

For the flexible scheduling of a base station, a base station may independently transmit as many scheduling delay values as the actual number of scheduling TBs to a terminal. In this case, when all scheduling delay values are independently transmitted through enhanced DCI, the number of scheduling TBs may increases and the corresponding field may also increase together.

Accordingly, there values may be configured to be determined based on a general subframe or may be configured to be determined based on a valid subframe. Compared with a method equally used between all TBs with one value, a method of independently transmitting per each TB may transmit a scheduling delay to a terminal.

(Method 2): An actual scheduling delay value and a scheduling delay offset may be transmitted together through enhanced DCI. In this case, a position of a NPDSCH may be determined according to an indicated scheduling delay value up to a NPDSCH transmitting the first TB, and a terminal may determine a starting subframe of a NPDSCH according to a value calculated by using a scheduling delay value and a scheduling delay offset value at the same time by transmitting a scheduling delay and a scheduling delay offset together from a NPDSCH transmitting the second TB.

For example, when a scheduling delay is referred to as x and a scheduling delay offset is referred to as p, a starting subframe of a NPDSCH scheduling a N-th TB may be represented as n+X+(N−1)*P.

In this case, n may indicate the last subframe that a NPDCCH scheduling multi TBs is transmitted or may indicate the last subframe that a NPDCCH transmitted right before is transmitted. These values may be configured to be determined based on a general subframe or may be configured to be determined based on a valid subframe.

Such a method may reduce the length of enhanced DCI and may indicate some dynamic scheduling delay.

Embodiment 11_for Case 2, Multi-TB Scheduling Method

Next, a method of scheduling multi TBs transmitting data in the opposite direction will be described. First, a HARQ process number, resource allocation, MCS, a scheduling delay, etc., may be configured to share a common value between a NPDSCH and a NPUSCH scheduling multi TBs.

For effective multi-TB scheduling, parameters mentioned in the Case 1 of an embodiment 10 may be similarly configured also in the Case 2 of an embodiment 11. Additionally, it is also considered that a NPDSCH and a NPUSCH are interlaced in a TDD situation and a terminal and a base station may perform an additional operation such as grant mixing, UCI piggyback, etc.

Embodiment 11-1_Method in which NPUSCH Transmission is Scheduled First

When multi-TB scheduling is scheduled to additionally receive a NPDSCH while NPUSCH transmission is performed first, retransmission grant of a NPUSCH transmitted before by a terminal may be transmitted through a NPDSCH.

When multi-TB scheduling is scheduled to additionally receive a NPDSCH while NPUSCH transmission is performed first, a base station may perform transmission by including a retransmission UL grant for a NPUSCH transmitted before by a terminal in NPDSCH data scheduled subsequently.

In this case, a terminal should transmit a NPUSCH corresponding to the corresponding retransmission UL grant and may be configured to transmit ACK/NACK together corresponding to NPDSCH data which is scheduled first.

When such a method is used, a search space that a terminal does not need to monitor when receiving the corresponding retransmission UL grant through a NPDSCH is generated, so power consumption of a terminal may be reduced.

Embodiment 11-2_A Case in which a UL Grant or a DL Grant Indicating to Perform the Following is Included in Part of a NPDSCH When a UL grant or a DL grant is included in a NPDSCH and is transmitted without using enhanced DCI scheduling multi TBs, a terminal may transmit and receive a subsequent NPUSCH or NPDSCH.

An embodiment 11-2 may correspond to a case in which a UL grant or a DL grant indicating to perform the following is included in part of the corresponding NPDSCH after receiving a DL grant through legacy DCI.

When receiving such a UL grant or DL grant, a terminal may transmit a NPUSCH or receive a NPDSCH through a subframe after a scheduling delay included in a UL/DL grant from an ending time of a NPDSCH which is received before (or, from a time when the corresponding HARQ process ends).

Such a UL/DL grant may include all scheduling information included in legacy DCI.

An embodiment 11-2 may perform multi-TB scheduling without enhanced DCI, and when the corresponding UL/DL grant is received through a NPDSCH, a search space that a terminal does not need to monitor is generated, so power consumption of a terminal may be reduced.

For example, a terminal which received a DL grant through the first NPDCCH receives a NPDSCH therefor. Actual data is included in the corresponding NPDSCH, but a UL grant or a DL grant may be also included.

When a UL grant is included, a terminal may transmit a NPUSCH in a resource scheduled by the corresponding UL grant and may transmit ACK/NACK together for NPDSCH data which is received before.

When a DL grant is included, a terminal may transmit ACK/NACK for NPDSCH data which is received before to a base station through a NPUSCH which is already scheduled while receiving a NPDSCH corresponding to the corresponding DL grant.

New Search Space for Multi-TB Scheduling

FIG. 21 is a diagram showing an example of a method configuring a search space for multi-TB scheduling to which a method suggested in the present disclosure may be applied.

When multi-TB scheduling is applied, a new search space may be configured to search DCI for multi-TB scheduling. In this case, an operation of a terminal related to unicast is the same as an operation described in FIG. 19 and an operation of a base station may be the same as an operation described in FIG. 20.

In other words, a search space for scheduling a single TB (the first search space) and a search space for scheduling multi TBs (the second search space) may be individually configured and a base station may individually transmit DCI for scheduling multi TBs (the second DCI) and DCI for scheduling a single TB (the first DCI) to a terminal through a NPDCCH in a different search space.

A terminal may monitor the first search space to receive (or detect) the first DCI and receive the first DCI by performing blind decoding for at least one NPDCCH which is transmitted in the first search space.

In addition, a terminal may also monitor the second search space to receive (or detect) the second DCI and receive the second DCI by performing blind decoding for at least one NPDCCH which is transmitted in the second search space.

In this case, a terminal may detect DCI by performing blind decoding for the number of NPDCCHs for which a terminal may perform blind decoding.

Hereinafter, a method of configuring a search space for multi-TB scheduling will be described.

Embodiment 12_A Method in which DCI for Single TB Scheduling is Transmitted to the Existing Search Space and DCI for Multi-TB Scheduling is Transmitted to a New Search Space When DCI for single TB scheduling (the first DCI) is transmitted in the existing UE specific search space (USS) and DCI for multi-TB scheduling (the second DCI) is transmitted to a new USS, the payload size of the first DCI may be the same as that of the second DCI.

In other words, the payload size of the first DCI may be configured to be the same as that of the second DCI by adding a specific indicator with a 1-bit size (e.g., a multi-TB scheduling indicator), etc. to the existing DCI format N0, N1 and performing zero padding for N0 or N1 with the shorter payload.

In this case, a specific indicator represents whether multi TBs are scheduled by DCI. In other words, a specific indicator may be information related to multi-TB scheduling caused by DCI.

For example, when a value of a specific indicator is 1 (e.g., scheduling of multi TBs), a DCI format N0/N1 indication flag may be configured to be differently recognized by a terminal.

In other words, when multi TBs is scheduled and a value of a specific indicator represents the scheduling of multi TBs, it represents that the same uplink direction (e.g., NPUSCH+NPUSCH) is scheduled when a N0/N1 indication flag is 0 and it represents that the same downlink direction (e.g., NPDSCH+NPDSCH) is scheduled when a N0/N1 indication flag is 1.

In other words, an enhanced terminal may detect DCI for the scheduling of NPDSCHs or NPUSCHs among DCI for single TB scheduling and DCI for multi-TB scheduling through one blind decoding in a legacy USS.

In this case, an additional blind decoding operation may not be required.

A multi-TB scheduling indicator field, etc. may perform multi-TB scheduling, may be configured by a RRC connection procedure and may be reinterpreted by the existing DCI format N1/NO indicator flag.

Additionally, DCI for the scheduling of NPDSCH+NPUSCH or NPUSCH+NPDSCH among multi-TB scheduling may not be transmitted in a USS (e.g., a terminal specific search space Type-A, etc.) which will be newly configured.

In this case, compared with the payload size of DCI for the scheduling of NPUSCHs or NPUSCH among multi-TB scheduling, the payload size of DCI for the scheduling of NPDSCH+NPUSCH or NPUSCH+NPDSCH may be differently configured.

For example, the payload size of DCI for the scheduling of NPDSCH+NPUSCH or NPUSCH+NPDSCH may be configured to be larger than the payload size of a DCI for the scheduling of NPDSCHs or NPUSCHs among multi-TB scheduling.

In other words, a DCI field (e.g., a resource allocation field, a MCS field, etc.) which may not be shared by a NPDSCH and a NPUSCH may exist and accordingly, an additional DCI field may be necessary.

In other words, when the payload size of the above-described multi-TB scheduling DCI is configured to be the same as that of a shorter one through zero padding in DCI, a coding rate caused by a zero padding overhead decreases and it may degrade NPDCCH reception performance.

Accordingly, a base station may determine information for USS Type-A which is newly applied and independently transmit it to a terminal which is indicated to receive NPDSCH+NPDSCH or NPUSCH+NPUSCH scheduling through higher layer signaling.

In this case, the above-mentioned higher layer signaling may be obtained in a process of entering a connected mode or may be configured by using the payload of a NPDSCH which is scheduled by DCI and transmitted with SC-PtM.

A legacy USS and an USS type-A may be scheduled by a base station independently each other, but it may be desirable to be TDM, and when a legacy USS and an USS type-A collide on a time axis, the following method may be defined or configured by a base station.

(Method 1): When all or part of legacy USSs and new USSs (e.g., an USS type-A) are overlapped (or collide) on a time axis, an USS Type-1 may be preferentially monitored.

(Method 2): When all or part of legacy USSs and USS type-As (e.g., an USS type-A) are overlapped to collide on a time axis, a legacy USS may be preferentially monitored.

(Method 3): A search space to be independently monitored may be determined by a specific parameter. Typically, a specific parameter may determine whether monitoring is performed according to a CE level or a Rmax value of a specific search space.

(Method 4): Only one search space of two may be monitored at a specific time in a flexible or semi-static way. For example, for being dynamic, other DCI may be monitored through an USS type-A when a terminal monitoring a legacy USS identifies a specific indicator in a DCI field.

Additionally, when being flexibly configured (e.g., included in a NPDSCH scheduled by DCI), a search space to be monitored by higher layer signaling may be configured. On the other hand, as a semi-static method, when a terminal monitoring a legacy USS becomes a specific period which is generated at a certain period, it may be configured to monitor an USS type-A.

Additionally, when a search space to be monitored is determined by a semi-static configuration, it may be configured in a process of an initial access (e.g., MIB/SIB, etc.), may be configured by the SC-MCCH of SC-PtM or may be configured by the RAR of a NPDCCH ordered NRRACH.

Typically, a case may be generated in which only an USS-type-A should be always monitored without monitoring a legacy USS according to a specific situation (e.g., fully overlapping and priority rule, etc.)

Accordingly, although DCI may give a multi indication for a NPDSCH and/or a NPUSCH, a method which may schedule only one of a NPDSCH or a NPUSCH is actually needed.

LTE LAA uses a combination of higher layer signaling and a DCI field value by representing the number of scheduling subframes. A method similar to it may be also introduced in NB-IoT and single TB scheduling may be indicated by introducing an explicit DCI field.

In addition, single TB scheduling may be represented by a combination of a specific value of specific fields of the corresponding DCI.

Additionally, when only one search space of two is flexibly configured to be monitored at a specific time among the above-mentioned methods, a concept of a timer (e.g., a monitoring expired timer) may be necessary.

In other words, a concept of a timer may be necessary in the following cases.

When a terminal misses DCI indicating a change in a search space which is transmitted from a base station and should be monitored When the corresponding DCI is received and a search space to be monitored is changed, but DCI may not be received continuously because a form of a changed search space is not suitable for a monitoring environment When it is determined that it is no longer necessary to monitor the corresponding search space after receiving the corresponding DCI and receiving DCI through a changed search space When trying to change a search space which was monitored previously without an additional overhead (e.g., higher-layer signaling)

For example, the corresponding timer may be configured to monitor a search space which is indicated only for a specific time period (e.g., x ms) from a time configured by a base station through DCI or a timer may be configured to expire after a specific number of search spaces are generated from a time configured by a base station through DCI.

Alternatively, while monitoring a specific number of search spaces and/or a search space changed for a specific time period from a time which is configured to change a search space to be monitored through DCI by a base station, a terminal may receive DCI through the corresponding search space.

In this case, a terminal may be immediately configured to monitor the existing search space after transmitting/receiving data indicated by the corresponding DCI. In other words, after a timer expires and/or when DCI is received in a changed search space, it may be configured to return to a search space which was monitored previously.

Typically, for avoiding ambiguity between a terminal and a base station, the above-mentioned "DCI indicating a change in a search space to be monitored" may have a form of reporting to a base station that timer information was accurately received in an A/N channel after being transmitted in a form of a DCI format N1.

Additionally, it may be configured to be fallback to a legacy USS when the number of times that multi-TB scheduling DCI indicates single-TB scheduling as much as the pre-promised specific number of times is generated.

In this case, when only a single-TB is scheduled, the above-mentioned fallback operation may be configured to be performed only when transmission/reception is performed well to a feedback for the corresponding channel (e.g., ACK/NACK).

A prioritization rule which takes priority over a specific search space in the above-described method 1 and method 2 may be selected among the following methods.

(Method 1): When a specific search space is preferentially monitored, it may be configured not to monitor all remaining search space candidates.

As a method 1 is the simplest method, it is an operation monitoring only a search space with a higher priority of two. In other words, when a base station configures USS type-A information for the corresponding terminal, it itself may be interpreted to transmit NPDSCH+NPUSCH or NPUSCH+NPDSCH scheduling DCI.

But, as a search space with a lower priority needs to be monitored in a specific case, there may be a problem in terms of scheduling optimization. To resolve such a problem, when a specific grant is received, it may be additionally configured not to monitor a specific search space until an operation indicated by the corresponding grant ends.

For example, when a specific terminal is indicated a single TB UL grant in a legacy USS, it may be configured to monitor a legacy USS for the specific number (the pre-promised or the pre-configured number) of USSs because the corresponding NPUSCH retransmission grant is transmitted to a legacy USS.

(Method 2): A proposed method according to the order on a time axis of all or two colliding search spaces may be arranged as follows.

(Method 2-1): When a priority to monitor a subsequent search space on a time axis is lower than a priority to monitor a precedent search space on a time axis:

All precedent search space candidates on a time axis are monitored, and when a grant is detected in the corresponding search space, a NPUSCH and/or NPDSCH transmission and reception operation may be configured to be performed according to the corresponding grant.

In this case, a single HARQ terminal may not monitor other subsequent search spaces and two HARQ terminals may monitor a specific period of other search spaces. On the other hand, when a grant is not detected in the corresponding search space, non-colliding search space candidates among subsequent search space candidates may be monitored.

(Method 2-2) When a priority to monitor a subsequent search space on a time axis is higher than a priority to monitor a precedent search space on a time axis:

Non-colliding search space candidates among precedent search space candidates on a time axis may be monitored, and when a grant is detected in the corresponding search space candidates, a NPUSCH/NPDSCH transmission and reception operation may be configured to be performed according to the corresponding grant.

In this case, a single HARQ UE may not monitor other subsequent search spaces and two HARQ UEs may monitor a specific period of other search spaces. On the other hand, when a grant is not detected in the corresponding search space, all subsequent search space candidates may be configured to be monitored.

Among the above-described methods, for guaranteeing a decoding time of a precedent search space, in case of a subsequent search space, a terminal does not need to monitor a search space included in a x subframe duration from the last subframe of a precedent search space. In this case, a x subframe may become a 4 subframe.

In this case, although it is configured to monitor a new search space (e.g., an USS type-A) for multi-TB scheduling, it may be configured to monitor the existing search space (e.g., a legacy USS) in a specific case.

For example, although a specific terminal is configured to monitor an USS type-A, the corresponding terminal may monitor a legacy USS when a base station transmits RLC ACK/NACK through a search space in a RRC release process.

When a method of an embodiment 12 is used, a new search space is used only for multi-TB scheduling in a different direction (e.g., DL, UL), there is an advantage in terms of resource management of a base station. A terminal also does not need to perform monitoring in a new search space, so power consumption of a terminal may be reduced.

Embodiment 13_A Method of Transmitting Only DCI for Single TB Scheduling in a Legacy USS In an embodiment 13, only DCI for single TB scheduling may be transmitted to the existing USS and DCI for NPDSCHs or NPUSCHs scheduling and DCI for NPDSCH+NPUSCH or NPUSCH+NPDSCH scheduling may be transmitted to a separate USS (e.g., a terminal specific search space Type-A).

Unlike an embodiment 12, in an embodiment 13, only DCI for single TB scheduling may be transmitted in a legacy USS. Accordingly, DCI for single TB scheduling does not need an additional field in legacy DCI. In other words, it means that DCI for single TB scheduling does not change a definition of legacy DCI regardless of whether multi-TB scheduling is possible.

Additionally, DCI for multi-TB scheduling may be transmitted in a separate USS (e.g., a UE specific search space Type-A) different from an USS for transmitting DCI for single TB scheduling.

In this case, the payload size of DCI for the scheduling of NPDSCHs or NPUSCHs may be smaller than that of DCI for the scheduling of NPDSCH+NPUSCH or NPUSCH+NPDSCH. Accordingly, the payload size of DCI may be equally configured by performing zero padding for the payload of DCI for the scheduling of NPDSCHs or NPUSCHs.

In this case, whether NPDSCHs/NPUSCHs are scheduled or whether NPDSCH+NPUSCH or NPUSCH+NPDSCH are scheduled may be transmitted by using 1-bit specific indication information (e.g., a 1 bit DCI flag (e.g., the same or different direction indicator flag).

For example, when the corresponding flag is 0, it means that NPDSCHs or NPUSCHs are scheduled and when the corresponding flag is 1, it means that NPDSCH+NPUSCH or NPUSCH+NPDSCH are scheduled.

In addition, also in this case, a DCI format N0/N1 indicator flag may be configured to be recognized differently. In this case, when the above-mentioned same or different direction indicator flag value is 0 (e.g., when NPDSCHs or NPUSCHs are scheduled), whether it is NPDSCH+NPDSCH or NPUSCH+NPUSCH may be determined according to a N0/N1 indicator flag value. For example, when a N0/N1 indicator flag is 0, it may be determined to be NPUSCH+NPUSCH and when a N0/N1 indicator flag is 1, it may be determined to be NPDSCH+NPDSCH.

Additionally, when the above-mentioned same or different direction indicator flag value is 1 (e.g., when NPDSCH+NPUSCH or NPUSCH+NPDSCH are scheduled), whether it is NPDSCH+NPUSCH or NPUSCH+NPDSCH may be determined according to a N0/N1 indicator flag value.

For example, when a N0/N1 indicator flag is 0, it may be determined to be NPUSCH+NPDSCH and when a N0/N1 indicator flag is 1, it may be determined to be NPDSCH+NPUSCH. In addition, information for a newly applied USS Type-A may be determined by a base station and may be independently transmitted to a terminal which will be indicated to receive multi-TB scheduling through higher-layer signaling.

Additionally, a capability for multi-NPUSCHs/NPDSCHs and a capability for NPDSCH+NPUSCH may exist independently also in a terminal.

Concretely, a legacy USS and an USS Type-A may be independently scheduled by a base station, but it may be desirable to be TDM, and when a legacy USS and an USS type-A collide on a time axis, an USS type-A may be preferentially monitored.

In other words, when a legacy USS and an USS type-A collide on a time axis, it may be configured not to monitor all legacy USSs. When a base station transmits USS type-A information to the corresponding terminal, it itself may be interpreted to transmit multi-TB scheduling DCI.

Also, the a search space priority rule described in an embodiment 12 may be applied.

In addition, when multi-TB scheduling DCI is transmitted to a USS Type-A and legacy DCI is transmitted to a legacy USS, a Rmax value of an USS Type-A may be configured to be greater than Rmax of a legacy USS.

In other words, when a Rmax value of a legacy USS is Rmax_legacy and a Rmax value of an USS Type-A is Rmax_new, it may be defined as Rmax_new=Rmax_legacy*L. (In this case, L is a natural number greater than or the same as 2, e.g., a square number of 2)

In this case, a value of L may be determined by a value proportional to a ratio between the payload size of single-TB DCI and the payload size of multi-TB DCI.

Both a DCI format A and a DCI format B with a different payload size (e.g., single-TB scheduling DCI and multi-TB scheduling DCI) may be configured for a specific terminal.

In this case, when all or part of different search spaces where each DCI may be transmitted are overlapped on a time axis, the scheduling flexibility of a base station may be improved by making the most of a blind decoding (BD) capability of a terminal.

In this case, when being completely overlapped on a frequency axis, a case in which different search spaces exist in the same PRB may be considered.

Concretely, when a NB-IoT terminal has a capability to simultaneously perform BD for the maximum Nmax of NPDCCH candidates (e.g., 4), the number of NPDCCH candidates that at least one of the payload size of DCI, the number of repetitions of NPDCCHs (e.g., a value of R), and/or a CCE aggregation level is differently configured may be Nact for a plurality of NPDCCH candidates that the last transmitted resource (e.g., a subframe or a symbol) is configured to be the same or equal at a specific time.

For Nmax≥Nact, a terminal may operate to perform BD for all corresponding Nact NPDCCH candidates, but for Nmax<Nact, a terminal may perform BD only for one specific DCI format of a DCI format A and a DCI format B or may preferentially perform BD for a specific DCI format of two DCI formats and perform BD as much as possible for the other DCI format.

In this case, an applicable priority rule of the above-mentioned embodiment 12 may be applied.

For example, as shown in FIG. 21, a search space A where a DCI format A may be transmitted and a search space B where a DCI format B may be transmitted may be configured by a base station and Rmax_B, a Rmax value of a search space B, may be configured to be greater than Rmax_A, a Rmax value of a search space A (e.g., Rmax_B=2*Rmax_A, A CCE level is the same)

Nact at a specific time is represented in FIG. 21, and because a Nact value at a specific time is always smaller than or the same as Nmax (e.g., Nmax=4), a terminal may always perform monitoring and BD for all search space candidates (or, candidate NPDCCHs) which exist in the corresponding two different search spaces according to the above-described method.

In this case, a different result may come out according to a starting subframe (starting SF) difference in a different search space, and as shown in FIG. 21, a configuration of a search space where a terminal always performs monitoring and BD for all search space candidates (candidate NPDCCHs) in a different search space may improve scheduling flexibility of a base station.

While methods described in embodiments 12 and 13 described a terminal specific search space as an example, it is obvious that it may be applied to a case in which a common search space is used.

For example, as the same search space as a Type1B-NPDCCH common search space for multi-TB scheduling is additionally configured in a Type1A-NPDCCH common search space that DCI scheduling SC-MCCH PDSCH is transmitted or the search space as a Type2B-NPDCCH common search space for multi-TB scheduling is additionally introduced in a Type2A-NPDCCH common search space that DCI scheduling SC-MTCH PDSCH is transmitted, methods described in embodiments 12 and 13 may be applied.

Multi-TB Scheduling with Different DCI Payload Size

When the payload size of DCI for single TB scheduling is different from that of DCI for multi-TB scheduling, multi-TB scheduling may be activated/deactivated through DCI without configuring an additional search space.

In other words, when the payload size of DCI for single TB scheduling is different from that of DCI for multi-TB scheduling, multi TBs may be scheduled without introducing an additional search space and without increasing terminal BD by adding a 1-bit for indicating the activation of DCI for multi-TB scheduling to DCI for single TB scheduling and by adding a 1-bit for indicating the deactivation of multi-TB scheduling to DCI for multi-TB scheduling.

Hereinafter, an operation of a terminal will be described.

Figure 22:
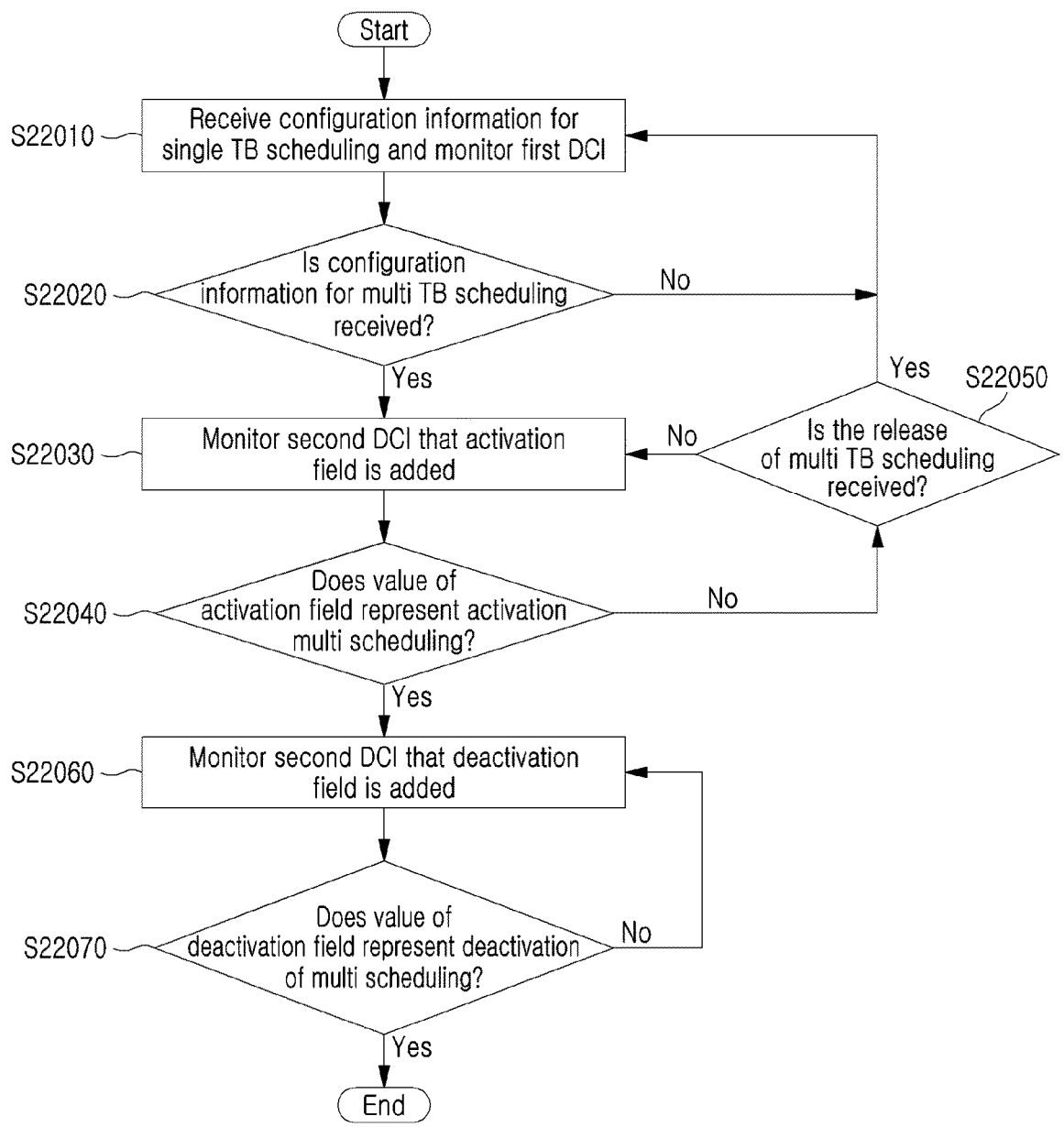
FIG. 22 is a flow chart showing an example of a terminal operation on multi-TB scheduling to which a method limited in the present disclosure may be applied.

FIG. 22 is a flow chart showing an example of a terminal operation on multi-TB scheduling to which a method limited in the present disclosure may be applied.

A terminal may receive configuration information for single TB scheduling and/or configuration information for multi-TB scheduling from a base station through higher layer signaling, etc. and a terminal may monitor the first DCI (e.g., single-TB scheduling DCI) which is predefined for single TB scheduling in a search space S22010.

When a terminal receives configuration information related to multiple TB scheduling from a base station, a terminal may monitor the second DCI (e.g., single-TB scheduling DCI that an activation field is added) that a specific field representing whether the multi scheduling is activated is included in the first DCI in the search space S22020 and S22030.

According to a value represented by a specific field, a terminal may monitor the second DCI or the third DCI (e.g., multi-TB scheduling DCI) which is predefined for multi-TB scheduling in a subsequent search space S22040 and S22060.

For example, when a specific field represents the activation of multi-TB scheduling, a terminal may monitor the third DCI in a subsequent search space. But, when a specific field does not represent the activation of multi-TB scheduling, a terminal determines whether to receive the release of multi-TB scheduling from a base station S22050.

When receiving the release of multi scheduling, a terminal may return to a step S22010 and receive configuration information for single TB scheduling and/or configuration information for multi-TB scheduling from a base station through higher layer signaling, etc. and a terminal may monitor the first DCI (e.g., single-TB scheduling DCI) which is predefined for single TB scheduling in a search space.

But, when a terminal does not receive the release of multi-TB scheduling, a terminal may return to a step S21030 and monitor the second DCI in a search space.

In this case, the third DCI may include a 1-bit field representing whether multi-TB scheduling is deactivated.

When a value of the 1-bit field is 0, a value not representing the deactivation of multi scheduling, a terminal may monitor the third DCI in a search space subsequent to a search space where the third DCI is received and when a value of the 1-bit field is 1, a value representing the deactivation of multi-TB scheduling, a terminal may monitor the second DCI S22070.

Hereinafter, an operation of a base station will be described.

Figure 23:
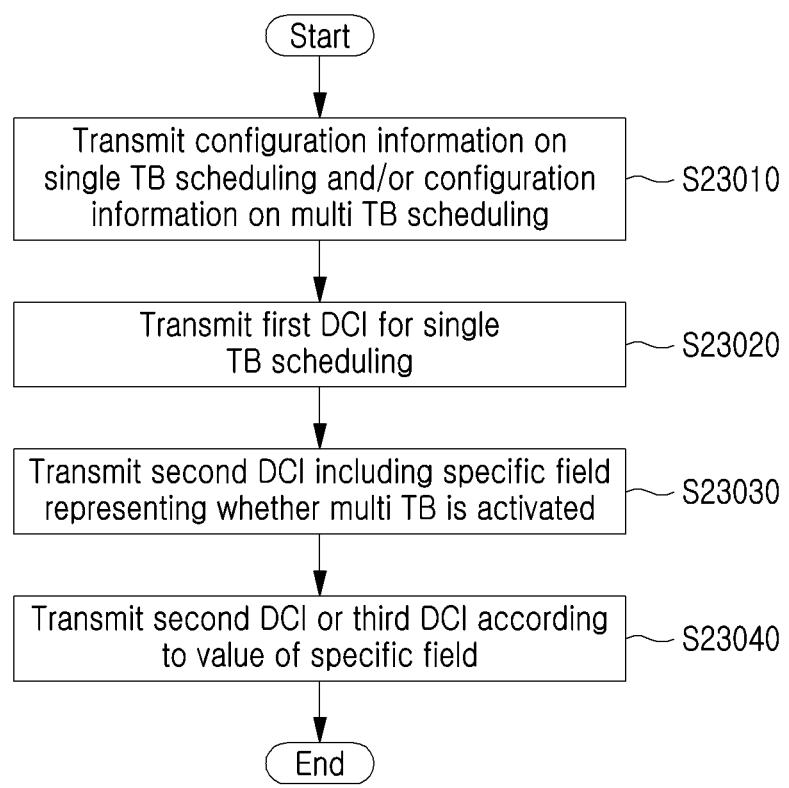
FIG. 23 is a flow chart showing an example of a base station operation on multi-TB scheduling to which a method limited in the present disclosure may be applied.

FIG. 23 is a flow chart showing an example of a base station operation on multi-TB scheduling to which a method limited in the present disclosure may be applied.

A base station may transmit configuration information for single TB scheduling and/or configuration information for multi-TB scheduling to a terminal S23010.

A base station may transmit the first DCI (e.g., single-TB scheduling DCI) which is predefined for single TB scheduling in a search space S23020.

When a base station transmits configuration information related to multiple TB scheduling to a terminal, a base station may transmit the second DCI (e.g., single-TB scheduling DCI that an activation field is added) that a specific field representing whether the multi scheduling is activated is included in the first DCI in a search space S23020.

According to a value represented by a specific field, a base station may transmit the second DCI or the third DCI (e.g., multi-TB scheduling DCI) which is predefined for multi-TB scheduling in a subsequent search space.

In this case, the third DCI may include a 1-bit field representing whether multi-TB scheduling is deactivated. When a value of the 1-bit field is 0, a value not representing the deactivation of multi-TB scheduling, a base station may transmit the third DCI in a search space subsequent to a search space where the third DCI is received and when a value of the 1-bit field is 1, a value representing the deactivation of multi-TB scheduling, a base station may transmit the second DCI S23030.

Although the size of DCI for single TB scheduling is different from that of DCI for multi-TB scheduling, multi-TB scheduling may be activated or deactivated by using such a method without an additional search space or blind decoding of a terminal.

But, when a terminal does not properly receive DCI transmitted by a base station in using the corresponding method, the discrepancy of a DCI size between a terminal and a base station may be generated.

When such a problem is generated, a terminal may not monitor a search space continuously and system performance is degraded. Accordingly, in this case, a problem may be resolved by the following method.

Embodiment 14

After the activation of multi-TB scheduling is indicated through DCI for single TB scheduling, it is possible to accurately define a timing that a search space comes which should monitor DCI for multi-TB scheduling (Inversely, the same principle is applied to a timing that a search space comes which should monitor DCI for single TB scheduling after the deactivation of multi-TB scheduling is indicated through DCI for multi-TB scheduling)

In this case, a terminal and a base station may confirm that a NPDSCH, a NPUSCH, etc. are transmitted and received between a terminal and a base station and DCI is not missed in the corresponding transmission and reception process.

For example, when a value of an activation field indicating the activation of multi-TB scheduling to single TB scheduling DCI is 1 (e.g., when a base station gives a command to start monitoring for multi-TB scheduling) and DCI for the corresponding single TB scheduling indicates a DL grant, the present disclosure may be performed by the following method.

(1) First, the transmission and retransmission of ACK/NACK for a HARQ process ID indicated by the corresponding DL grant are completed and a base station may indicate to a terminal through new single TB scheduling DCI that the corresponding HARQ process ID is for new data purpose.

In this case, a terminal may monitor multi-TB scheduling DCI in a subsequent search space.

(2) Second, when NACK is transmitted after receiving a NPDSCH for the corresponding DL grant and a NDI for the same HARQ process ID (e.g., a new data indicator) is transmitted in a non-toggle state, or when ACK is transmitted after receiving a NPDSCH for the corresponding DL grant and a NDI for the same HARQ process ID is transmitted in a toggle state, a terminal may monitor DCI for multi-TB scheduling in a search space which exists after transmitting A/N corresponding to DCI subsequently transmitted with the corresponding NDI.

In this case, DCI indicating that the corresponding HARQ process ID is new data may be also missed with DCI that an activation field for the activation of multi-TB scheduling is indicated as 1. Accordingly, as a base station may also confirm only after responding to it and searching DTX at least with DM-RS of a HARQ feedback, a terminal may monitor a search space after transmitting A/N for DCI transmitted with the corresponding NDI.

In (1) and (2) methods, by considering a processing delay of a terminal with low complexity, as many gaps as processing delays may be added at an exact time when DCI monitoring for multi-TB scheduling is actually applied.

As another example of the present disclosure, when a value of an activation field for activating multi-TB scheduling in the DCI for single TB scheduling is 1 (e.g., when a base station commands a terminal to start monitoring for multi-TB scheduling) and the corresponding single TB scheduling DCI indicates a UL grant, the corresponding method will be described with a concrete example as follows.

(1) First, when all retransmissions for a HARQ process ID indicated by the corresponding UL grant are completed and a base station indicates through new single TB scheduling DCI that the corresponding HARQ process ID is for new data purpose, a terminal may monitor multi-TB scheduling DCI in a subsequent search space.

(2) Second, after the corresponding HARQ process ID (regardless of whether a NDI is toggled) is re-scheduled after transmitting a NPUSCH for the corresponding UL grant (regardless of whether a NDI is toggled or not), a terminal may monitor multi-TB scheduling DCI in a search space which exists after transmitting a NPUSCH scheduled by new single TB scheduling DCI.

In (1) and (2) methods, by considering a processing delay of a terminal with low complexity, as many gaps as processing delays may be added at an exact time when DCI monitoring for multi-TB scheduling is actually applied.

When such an exact timing is defined, a terminal and a base station may confirm that one or more NPDSCHs, NPUSCHs, etc. are transmitted and received between a terminal and a base station and DCI is not missed in the corresponding transmission and reception process until monitoring is performed by changing a DCI format after receiving an indication for activation or deactivation from a base station.

Embodiment 15

Some candidates of a specific UE specific search space (e.g., USS) may be always configured for single TB scheduling. In other words, at least k (k is a positive integer greater than or the same as 1) NPDCCH candidates may be used for single TB scheduling in a USS which exists after receiving configuration information related to multi-TB scheduling by a base station through RRC signaling.

In addition, NPDCCH candidates which remain after subtracting k from the total number of NPDCCH candidates may be configured for multi-TB scheduling.

When a NPDCCH is configured as above, the above-described problem may be resolved because a fallback operation may be always performed without increasing the blind decoding operation of a terminal although a terminal misses DCI transmitted by a base station.

But, a candidate in the existing search space should be divided.

Embodiment 15-1

As a single search space is divided in an embodiment 15, reception performance of a terminal may be degraded. Accordingly, an embodiment 15-1 suggests a method of keeping the reception performance of a terminal.

Concretely, a specific terminal specific search space (e.g., a USS) may be defined as a purpose for single TB scheduling and residual USSs may be used for multi-TB scheduling.

In other words, after a terminal receives configuration information related to multi-TB scheduling through RRC signaling from a base station, an existing USS may be divided into a USS for single TB scheduling and a USS for multi-TB scheduling according to whether the corresponding USS is odd-numbered or even-numbered by counting from a starting point of a hyper frame.

When such a configuration is performed, a fallback operation may be always performed without increasing the blind decoding operation of a terminal although a terminal misses DCI transmitted by a base station.

As such, whether detecting a subsequent USS is performed may be determined according to scheduling indicated by a precedent USS in a situation where a USS for single TB scheduling and a USS for multi-TB scheduling are divided.

In other words, when multi-TB scheduling DCI is detected through a specific USS, a terminal may omit NPDCCH/MPDCCH monitoring in subsequent USSs and an omitted duration may include a duration that ACK/NACK of a scheduled multi TB is entirely completed.

Additionally, even when single TB scheduling DCI is detected through a specific USS, a terminal may omit NPDCCH/MPDCCH monitoring and an omitted duration may include a duration that ACK/NACK of a scheduled single TB is entirely completed.

Embodiment 16

Instead of transmitting both DCI for multi-TB scheduling and DCI for single TB scheduling to the existing single search space, the existing CSS may be used. In other words, a search space for a DCI fall back operation may be designated as a CSS.

In other words, for a terminal, a USS which exists after receiving configuration information related to multi-TB scheduling through RRC signaling from a base station may be used as a search space for transmitting multi-TB scheduling DCI and a CSS may be used as a search space for transmitting single TB scheduling DCI.

In this case, a CSS used for a fall back operation may be one of type-1 CSS and type-2 CSS (for a CE mode A of eMTC, type-0 CSS may be also considered). When type-2 CSS is used as a search space for a fall back operation, a base station may indicate single TB scheduling by using DCI format N0 or N1 as it is because the corresponding search space has a structure similar to a USS and NPDCCH candidate and a DCI format also uses a DCI format N1 to fit the payload size with unicast all the time.

For a CE mode B of eMTC, the same method may be applied to the above-mentioned type-2 CSS by using a DCI format 6-0/1B. Additionally, for a CE mode A of eMTC, the corresponding CSS may be used for a fall back operation because there is type-0 CSS which is always monitored.

Single TB scheduling using a DCI format 6-0/1A may be used for type-0 CSS and multi-TB scheduling may be used through a USS.

On the other hand, when type-1 CSS is used as a fall back operation, other method may be applied to the corresponding search space because a DCI format which is not used for unicast transmission (e.g., a DCI format N2) is used.

In other words, a base station may command a terminal to receive single TB scheduling DCI in a USS by introducing a L bit DCI field (e.g., L=1) to a DCI format N2 scrambled by a terminal specific RNTI (UE specific-RNTI, e.g., C-RNTI) value.

A base station may command a terminal to perform a fallback operation through the corresponding field. As the payload size of DCI is matched by a method such as zero padding to minimize effects on a legacy operation when such a method is used, it may be distinguished from DCI indicating others without increasing a blind decoding operation.

Also for eMTC, as mentioned above, when type-1 CSS is used as a fall back operation, a DCI format N2 of the above-mentioned method may be changed into a DCI format 6-2 and may be applied.

Embodiments 1 to 16 described a method for scheduling multi TBs which may be applied to a NB-IoT system.

A method suggested in the present disclosure is basically based on DL/DL, but the essence of the present disclosure may not be changed although it is changed into UL/UL or DL/DL or UL/DL. In addition, when being changed into UL, a NPUSCH may be applied instead of a NPDSCH, NPUSCH transmission may be applied instead of NPDSCH reception and a DCI format N0 may be applied instead of a DCI format N1.

In addition, a method described in embodiments 1 to 16 may be applied to eMTC. In this case, a DCI format N0/N1 may be changed into a DCI format 6-0A,B/6-1A,B and may be applied and a NPDSCH/NPUSCH may be changed into a PDSCH/PUSCH and may be applied.

It is obvious that the names of other search spaces may be also changed and applied according to a defined name in eMTC. In addition, as eight or more HARQ processes of eMTC may be supported, a method described in embodiments 1 to 14 may be applied although a scheduling direction is irregularly changed such as DL/UL/UL/DL/UL, etc. without ending at DL/UL or UL/DL.

When methods of the above-suggested methods are introduced, it is obvious that a terminal has a different payload size of DCI monitored according to an indication of a base station.

Figure 24:
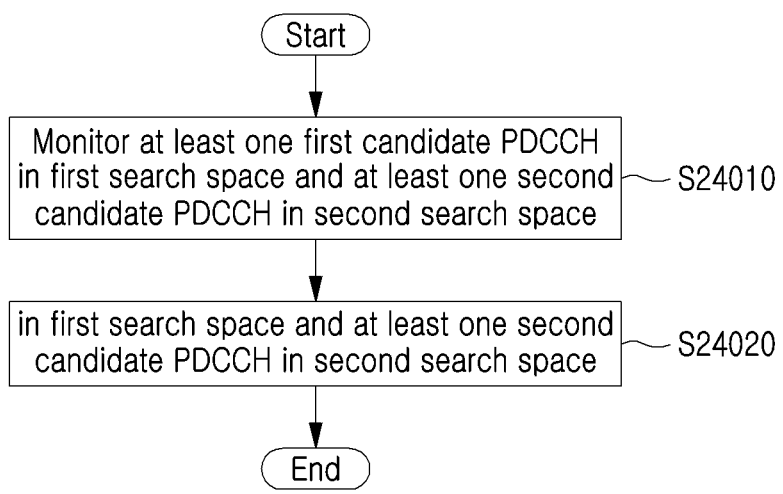
FIG. 24 is a flow chart showing an example of a terminal operation for receiving downlink data through multi-TB scheduling to which a method suggested in the present disclosure may be applied.

FIG. 24 is a flow chart showing an example of a terminal operation for receiving downlink data through multi-TB scheduling to which a method suggested in the present disclosure may be applied.

In reference to FIG. 24, a terminal may monitor and receive DCI for single TB scheduling and DCI for multi-TB scheduling in a different search space.

Concretely, a terminal may monitor at least one first candidate PDCCH in the first search space and at least one second candidate PDCCH in the second search space S25010.

The first search space is a search space for monitoring DCI for single TB scheduling and the second search space is a search space for monitoring DCI for multi-TB scheduling.

The first search space and the second search space may be overlapped in whole or in part on a time axis and a terminal may monitor the first candidate PDCCH and at least one second candidate PDCCH according to the maximum number of PDCCHs which may be monitored by blind decoding.

After that, a terminal may search the first DCI in at least one first candidate PDCCH and the second DCI in at least one second candidate PDCCH S24020.

In this case, the sum of the number of at least one first candidate PDCCH and the number of at least one second candidate PDCCH may be the same as or smaller than a specific number and the specific number is the maximum number of PDCCHs that the above-described terminal may monitor by blind decoding.

In such a method, a terminal may individually search DCI for single TB scheduling and DCI for multi-TB scheduling in a different search space.

Figure 26:
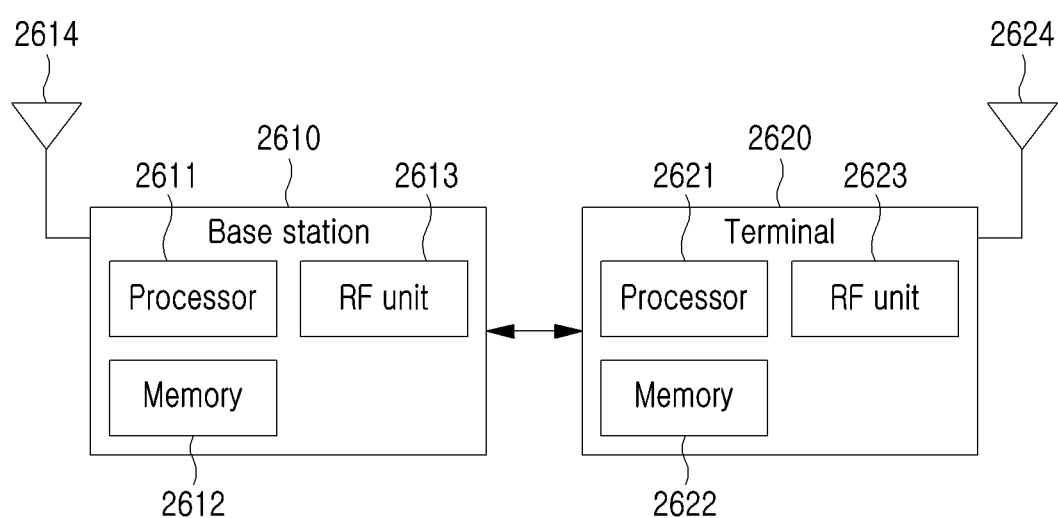
FIG. 26 illustrates a block diagram of a radio communication device to which methods suggested in the present disclosure may be applied.
Figure 27:
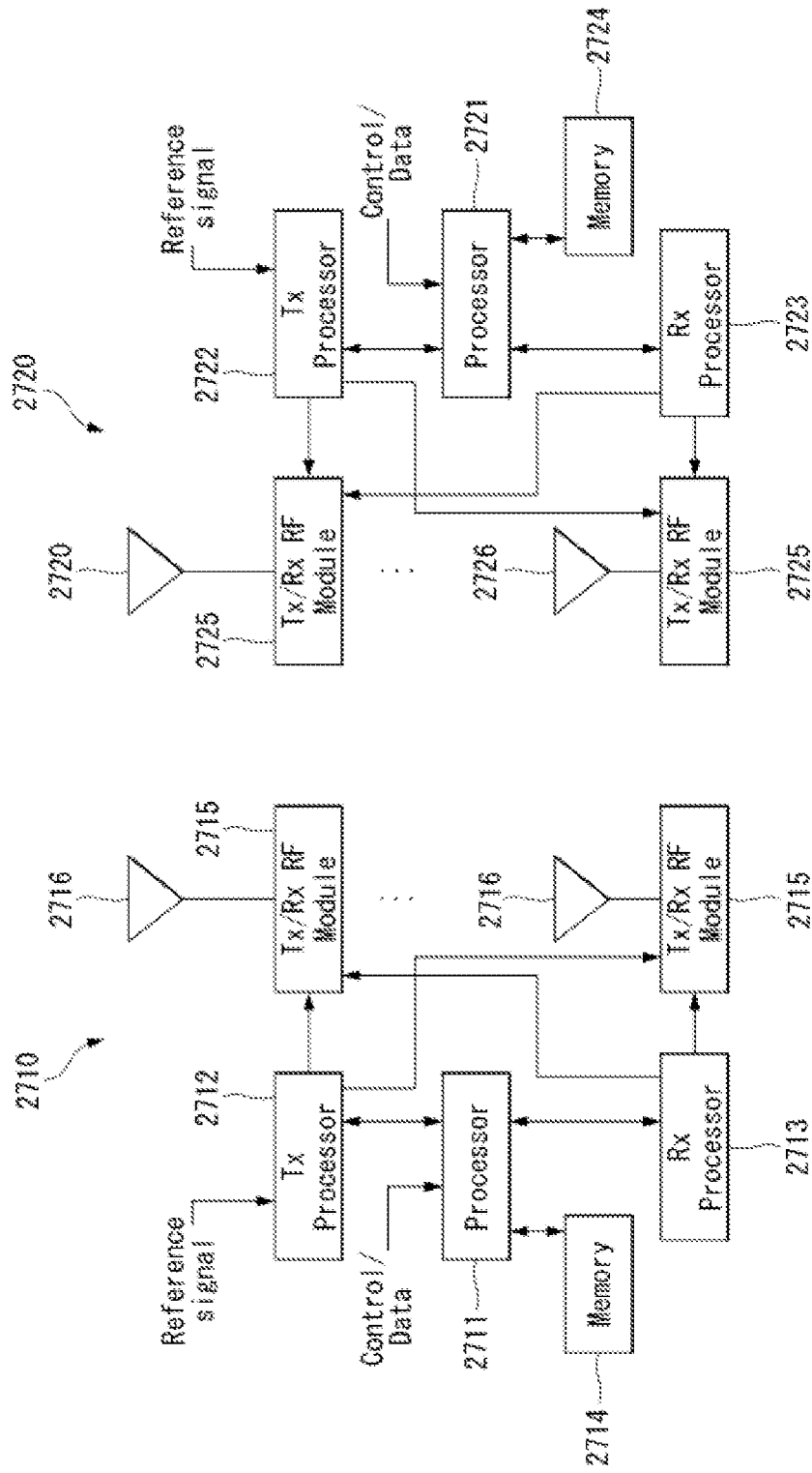
FIG. 27 is another example of a block diagram of a radio communication device to which methods suggested in the present disclosure may be applied.

In this connection, the above-described terminal operation may be concretely implemented by terminal devices 2620 and 2720 shown in FIG. 26 and FIG. 27 of this description. For example, the above-described terminal operation may be performed by processors 2621 and 2721 and/or RF units (or modules) 2623 and 2725.

Concretely, processors 2621 and 2721 may be controlled to monitor at least one first candidate PDCCH in the first search space and at least one second candidate PDCCH in the second search space through RF units (or modules) 2623 and 2725.

The first search space is a search space for monitoring DCI for single TB scheduling and the second search space is a search space for monitoring DCI for multi-TB scheduling.

The first search space and the second search space may be overlapped in whole or in part on a time axis and a terminal may monitor the first candidate PDCCH and at least one second candidate PDCCH according to the maximum number of PDCCHs which may be monitored by blind decoding.

After that, processors 2621 and 2721 may be controlled to search the first DCI in at least one first candidate PDCCH and the second DCI in at least one second candidate PDCCH through RF units (or modules) 2623 and 2725.

In this case, the sum of the number of at least one first candidate PDCCH and the number of at least one second candidate PDCCH may be the same as or smaller than a specific number and the specific number is the maximum number of PDCCHs that the above-described terminal may monitor by blind decoding.

Figure 25:
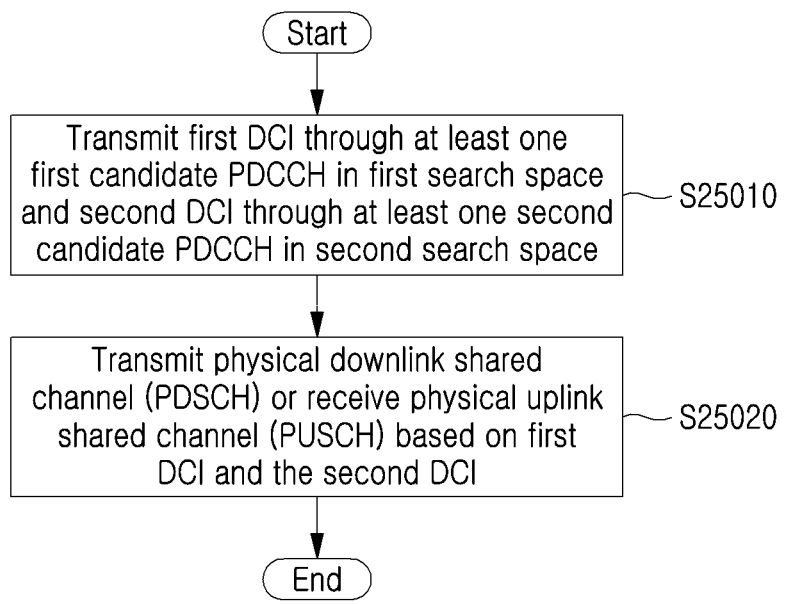
FIG. 25 is a flow chart showing an example of a base station operation for transmitting downlink data through multi-TB scheduling to which a method suggested in the present disclosure may be applied.

FIG. 25 is a flow chart showing an example of a base station operation for transmitting downlink data through multi-TB scheduling to which a method suggested in the present disclosure may be applied.

In reference to FIG. 25, a base station may transmit DCI for single TB scheduling and DCI for multi-TB scheduling in a different search space.

Concretely, a base station may transmit the first DCI through at least one first candidate PDCCH in the first search space and the second DCI through at least one second candidate PDCCH in the second search space S24010.

The first search space is a search space for transmitting DCI for single TB scheduling and the second search space is a search space for transmitting DCI for multi-TB scheduling.

After that, a base station may transmit a physical downlink shared channel (PDSCH) or may receive a physical uplink shared channel (PUSCH) based on the first DCI and the second DCI S24020.

In this case, the first search space and the second search space may be overlapped in whole or in part on a time axis and the terminal may monitor candidate PDCCHs equal to or less than the specific number among at least one first candidate PDCCH and at least one second candidate PDCCH.

In such a method, a base station may individually transmit DCI for single TB scheduling and DCI for multi-TB scheduling in a different search space.

In this connection, the above-described base station operation may be concretely implemented by base station devices 2610 and 2710 shown in FIG. 26 and FIG. 27 of this description. For example, the above-described terminal operation may be performed by processors 2611 and 2711 and/or RF units (or modules) 2613 and 2715.

Concretely, processors 2611 and 2711 may be controlled to transmit the first DCI through at least one first candidate PDCCH in the first search space and the second DCI through at least one second candidate PDCCH in the second search space through RF units (or modules) 2613 and 2715.

The first search space is a search space for transmitting DCI for single TB scheduling and the second search space is a search space for transmitting DCI for multi-TB scheduling.

After that, processors 2611 and 2711 may transmit a physical downlink shared channel (PDSCH) or may receive a physical uplink shared channel (PUSCH) based on the first DCI and the second DCI through RF units (or modules) 2613 and 2715.

In this case, the first search space and the second search space may be overlapped in whole or in part on a time axis and the terminal may monitor candidate PDCCHs equal to or less than a specific number among at least one first candidate PDCCH and at least one second candidate PDCCH.

In FIGS. 7 to 25 and embodiments 1 to 16 of the present disclosure, an NB-IoT was described as an example, but it is obvious that the present disclosure may be also applied to other fields (e.g., MTC) without being limited thereto.

General Device that the Present Disclosure May be Applied

FIG. 26 illustrates a block diagram of a radio communication device to which methods suggested in the present disclosure may be applied.

In reference to FIG. 26, a radio communication system includes a base station 2610 and a plurality of terminals 2620 positioned in a region of a base station.

The base station and terminal may be represented as a radio device, respectively.

A base station 2610 includes a processor 2611, a memory 2512 and a radio frequency (RF) module 2613. A processor 2611 implements a function, a process and/or a method previously suggested in embodiments 1 to 14. Radio interface protocol layers may be implemented by a processor. A memory is connected to a processor to store a variety of information for operating a processor. A RF module is connected to a processor to transmit and/or receive a radio signal.

A terminal includes a processor 2621, a memory 2622 and a RF module 2623.

A Processor implements a function, a process and/or a method previously suggested in embodiments 1 to 16. Radio interface protocol layers may be implemented by a processor. A memory is connected to a processor to store a variety of information for operating a processor. A RF module 2623 is connected to a processor to transmit and/or receive a radio signal.

Memories 2612 and 2622 may be inside or outside processors 2611 and 2621 and may be connected to a processor in a well-known various means.

In addition, a base station and/or a terminal may have one single antenna or multiple antenna.

FIG. 27 is another example of a block diagram of a radio communication device to which methods suggested in the present disclosure may be applied.

In reference to FIG. 27, a radio communication system includes a base station 2710 and a plurality of terminals 2720 positioned in a region of a base station. A base station may be represented as a transmission device and a terminal may be represented as a reception device, and vice versa. A base station and a terminal include processors 2711 and 2721, memories 2714 and 2724, one or more Tx/Rx radio frequency (RF) modules 2715 and 2725, Tx processors 2712 and 2722, Rx processors 2713 and 2723 and antennas 2716 and 2726. A processor implements the above-described function, process and/or method. In more detail, an upper layer packet from a core network is provided for a processor 2711 in a DL (a communication from a base station to a terminal). A processor implements a function of a L2 layer. In a DL, a processor provides radio resource allocation and multiplexing between a logical channel and a transmission channel for a terminal 2720 and takes charge of signaling to a terminal. A transmission (TX) processor 2712 implements a variety of signal processing functions for a L1 layer (e.g., a physical layer). A signal processing function facilitates forward error correction (FEC) in a terminal and includes coding and interleaving. An encoded and modulated symbol is partitioned into parallel streams, and each stream is mapped to an OFDM subcarrier, is multiplexed with a reference signal (RS) in a time and/or frequency domain and is combined together by using Inverse Fast Fourier Transform (IFFT) to generate a physical channel which transmits a time domain OFDMA symbol stream. An OFDM stream is spatially precoded to generate a multiple spatial stream. Each spatial stream may be provided for a different antenna 2716 in each Tx/Rx module (or a transmitter-receiver 2715). Each Tx/Rx module may modulate a RF carrier in each spatial stream for transmission. In a terminal, each Tx/Rx module (or a transmitter-receiver 2725) receives a signal through each antenna 2726 of each Tx/Rx module. Each Tx/Rx module reconstructs information modulated by a RF carrier to provide it for a reception (RX) processor 2723. A RX processor implements a variety of signal processing functions of a layer 1. A RX processor may perform a spatial processing for information to reconstruct an arbitrary spatial stream heading for a terminal. When a plurality of spatial streams head for a terminal, they may be combined into a single OFDMA symbol stream by a plurality of RX processors. A RX processor transforms an OFDMA symbol stream from a time domain to a frequency domain by using Fast Fourier Transform (FFT). A frequency domain signal includes an individual OFDMA symbol stream for each subcarrier of an OFDM signal. Symbols and a reference signal in each subcarrier are reconstructed and demodulated by determining the most probable signal arrangement points transmitted by a base station. Such soft decisions may be based on channel estimated values. Soft decisions are decoded and deinterleaved to reconstruct data and a control signal transmitted by a base station in a physical channel. The corresponding data and control signal are provided for a processor 2721.

An UL (a communication from a terminal to a base station) is processed in a base station 2710 by a method similar to that described in a terminal 2720 in relation to a function of a receiver. Each Tx/Rx module 2725 receives a signal through each antenna 2726. Each Tx/Rx module provides a RF carrier and information for a RX processor 2723. A processor 2721 may be related to a memory 2724 which stores a program code and data. A memory may be referred to as a computer readable medium.

In this description, a radio device may be a base station, a network node, a transmission terminal, a reception terminal, a radio device, a radio communication device, a vehicle, a self-driving car, a drone (Unmanned Aerial Vehicle, UAV), an AI (Artificial Intelligence) module, a robot, an AR (Augmented Reality) device, a VR (Virtual Reality) device, a MTC device, a IoT device, a medical device, a FinTech device (or a financial device), a security device, a climate/environment device or other devices related to the 4th industrial revolution field or a 5G service. For example, a drone may be an unmanned flight vehicle which is aviated by a radio control signal. For example, as a device which does not need direct a person's direct intervention or manipulation, a MTC device and a IoT device may be a smart meter, a vending machine, a thermometer, a smart bulb, a door lock, all kinds of sensors, etc. For example, as a device used to test, substitute or modify a device, a structure or a function used to diagnose, cure, reduce, treat or prevent a disease, a medical device may be equipment for treatment, an operating device, a (external) diagnostic device, a hearing aid, a device for a medical procedure, etc. For example, as a device installed to prevent a danger which might occur and keep safety, a security device may be a camera, a CCTV, a black box, etc. For example, as a device which may provide a financial service such as mobile payment, etc., a FinTech device may be a payment device, POS (point of Sales), etc. For example, a climate/environment device may refer to a device which monitors and predicts a climate/environment.

In this description, a terminal may include a mobile phone, a smart phone, a laptop computer, a digital broadcasting terminal, a FDA (personal digital assistants), a PMP (portable multimedia player), a navigation, a slate PC, a tablet PC, an ultrabook, an wearable device (e.g., a watch-type terminal (smartwatch), a glass-type terminal (smart glass), HMD (head mounted display)), a fordable device, etc. For example, as a head-mounted display device, HMD may be used to implement VR or AR.

The above-described embodiments are configured by combining the components and characteristics of the present disclosure in a predetermined shape. Each component or characteristic should be considered to be selective unless otherwise explicitly specified. Each component or characteristic may be performed in a shape not combined with other components or characteristics. In addition, it is possible to configure an embodiment of the present disclosure by combining some components and/or characteristics. The order of operations described in the embodiments of the present disclosure may be changed. Some configurations or characteristics of any embodiment may be included in other embodiments or may be substituted with a corresponding configuration or characteristic in other embodiments. In the scope of claims, it is obvious that an embodiment may be configured by combining claims not in an explicit quoting relation or may be included as a new claim by amendment after application.

An embodiment according to the present disclosure may be implemented by various means, e.g., a hardware, a firmware, a software or by their combination, etc. For implementation by a hardware, an embodiment of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, micro controllers, microprocessors, etc.

For implementation by a firmware or a software, an embodiment of the present disclosure may be implemented in a shape of a module, a procedure, a function, etc. performing the above-described functions or operations. A software code may be stored in a memory and executed by a processor. The memory is positioned inside or outside the processor and may exchange data with the processor by various means which are already notified.

It is obvious for a person skilled in the art that the present disclosure may be implemented in a different specific shape in a range not beyond essential characteristics of the present disclosure. Accordingly, the above-described detailed description should not be limitedly interpreted in every aspect and should be considered to be exemplary. A range of the present disclosure should be determined by the reasonable interpretation of an attached claim and all changes within the equivalent range of the present disclosure are included in a range of the present disclosure.

INDUSTRIAL AVAILABILITY

The present disclosure gave an explanation based on an example applied to a 3GPP LTE/LTE-A/NR system, but it is possible to apply to various radio communication systems except for a 3GPP LTE/LTE-A/NR system.

What is claimed is:

1. A method of receiving, by a terminal, a physical downlink shared channel (PDSCH) in a wireless communication system, the method comprising:
   identifying configuration information related to a multicast traffic channel, based on a multicast control channel;
   receiving, from a base station, downlink control information (DCI) scheduling multi transport blocks (TBs) for the multicast traffic channel; and
   receiving, from the base station, the PDSCH for the multi TBs based on the DCI,
   wherein based on that the configuration information includes information on a scheduling gap for the multi TBs, the scheduling gap is applied between a subframe for a first TB and a subframe for a second TB which is consecutive with the first TB in the multi TBs.

2. The method of claim 1, wherein the information on the scheduling gap is configured as a single value applied for the multi TBs.

3. The method of claim 1, wherein the scheduling gap indicates an interval from a last subframe in which a previous TB is transmitted to a first subframe in which a subsequent TB is transmitted.

4. The method of claim 1, wherein the DCI includes information on a number of repetitions for the multi TBs, and
   wherein the number of repetitions is equally applied to each of the multi TB s.

5. A terminal for receiving a physical downlink shared channel (PDSCH) in a wireless communication system, the terminal comprising:
   a transceiver configured to transmit and receive a radio signal; and
   a processor configured to control the transceiver;
   wherein the processor is configured to:
   identify configuration information related to a multicast traffic channel, based on a multicast control channel;

receive, from a base station, downlink control information (DCI) for scheduling multi transport blocks (TBs) for the multicast traffic channel; and receiving, from the base station, the PDSCH for the multi TBs based on the DCI, wherein based on that the configuration information includes information on a scheduling gap for the multi TBs the scheduling gap is applied between a subframe for a first TB and a subframe for a second TB which is consecutive with the first TB in the multi TBs.

6. The terminal of claim 5, wherein the information on the scheduling gap is configured as a single value applied for the multi TBs.

7. The terminal of claim 5, wherein the scheduling gap indicates an interval from a last subframe in which a previous TB is transmitted to a first subframe in which a subsequent TB is transmitted.

8. The terminal of claim 5, wherein the DCI includes information on a number of repetitions for the multi TBs, and wherein the number of repetitions is equally applied to each of the multi TBs.

\* \* \* \* \*